US008155964B2

(12) United States Patent
Hirose et al.

(10) Patent No.: US 8,155,964 B2
(45) Date of Patent: Apr. 10, 2012

(54) VOICE QUALITY EDIT DEVICE AND VOICE QUALITY EDIT METHOD

(75) Inventors: Yoshifumi Hirose, Kyoto (JP); Takahiro Kamai, Kyoto (JP)

(73) Assignee: Panasonic Corporation, Osaka (JP)

( * ) Notice: Subject to any disclaimer, the term of this patent is extended or adjusted under 35 U.S.C. 154(b) by 596 days.

(21) Appl. No.: 12/438,642

(22) PCT Filed: Jun. 4, 2008

(86) PCT No.: PCT/JP2008/001407

§ 371 (c)(1), (2), (4) Date: Feb. 24, 2009

(87) PCT Pub. No.: WO2008/149547

PCT Pub. Date: Nov. 12, 2008

(65) Prior Publication Data

US 2010/0250257 A1 Sep. 30, 2010

(30) Foreign Application Priority Data

Jun. 6, 2007 (JP) ................................ 2007-151022

(51) Int. Cl.
*G10L 13/08* (2006.01)
*G10L 11/00* (2006.01)
*G10L 21/06* (2006.01)
*G10L 21/00* (2006.01)
*G06F 3/16* (2006.01)

(52) U.S. Cl. ........ 704/260; 704/270; 704/276; 704/278; 715/727

(58) Field of Classification Search ........................ None
See application file for complete search history.

(56) References Cited

U.S. PATENT DOCUMENTS 5,850,629 A * 12/1998 Holm et al. .................. 704/260
(Continued)

FOREIGN PATENT DOCUMENTS

JP 06-130921 5/1994
(Continued)

OTHER PUBLICATIONS

International Search Report issued Sep. 9, 2008 in the International (PCT) Application No, JP/2008/001407.
Takahiro Ohtsuka et al., "Robust ARX-Based Speech Analysis Method Taking Voicing Source Pulse Train Into Account," The Journal of the Acoustical Society of Japan, Vo. 58, No. 7, (2002), pp. 386-397 (with Partial English Translation).

(Continued)

*Primary Examiner* — Brian Albertalli
(74) *Attorney, Agent, or Firm* — Wenderoth, Lind & Ponack, L.L.P.

(57) ABSTRACT

This invention includes: a voice quality feature database (101) holding voice quality features; a speaker attribute database (106) holding, for each voice quality feature, an identifier enabling a user to expect a voice quality of the voice quality feature; a weight setting unit (103) setting a weight for each acoustic feature of a voice quality; a scaling unit (105) calculating display coordinates of each voice quality feature based on the acoustic features in the voice quality feature and the weights set by the weight setting unit (103); a display unit (107) displaying the identifier of each voice quality feature on the calculated display coordinates; a position input unit (108) receiving designated coordinates; and a voice quality mix unit (110) (i) calculating a distance between (1) the received designated coordinates and (2) the display coordinates of each of a part or all of the voice quality features, and (ii) mixing the acoustic features of the part or all of the voice quality features together based on a ratio between the calculated distances in order to generate a new voice quality feature.

14 Claims, 36 Drawing Sheets

U.S. PATENT DOCUMENTS

| | | | | |
|---|---|---|---|---|
| 7,099,828 | B2 * | 8/2006 | Kobal et al. | 704/270 |
| 7,315,820 | B1 * | 1/2008 | Munns | 704/260 |
| 7,571,099 | B2 * | 8/2009 | Saito et al. | 704/268 |
| 8,036,899 | B2 * | 10/2011 | Sobol-Shikler | 704/270 |
| 2005/0075875 | A1 | 4/2005 | Shozakai et al. | |
| 2008/0167875 | A1 * | 7/2008 | Bakis et al. | 704/258 |
| 2009/0234652 | A1 * | 9/2009 | Kato et al. | 704/260 |

FOREIGN PATENT DOCUMENTS

| | | |
|---|---|---|
| JP | 2001-5477 | 1/2001 |
| JP | 2003-242164 | 8/2003 |
| JP | 2005-249835 | 9/2005 |
| JP | 2006-276493 | 10/2006 |
| WO | 2005/034086 | 4/2005 |

OTHER PUBLICATIONS

Taro Togawa et al., "HMM-Based Speech Synthesis Corresponding to Character's Shapes," The 2004 Spring Meeting of the Acoustical Society of Japan, vol. 1, Spring 2004, Mar. 17, 2004, 1-7-24, pp. 259-260 (with Partial English Translation).

Hiroshi Hamada et al., "Speech Controller with GUI for a Text-To-Speech Synthesizer and its Application in Designing an Interface for Keyword Emphasis," Journal of Information Processing Society of Japan, Dec. 15, 1993, vol. 934, No. 12, pp. 2569-2577 (with Partial English Translation).

* cited by examiner

FIG. 12

| | | | | | | |
|---|---|---|---|---|---|---|
| 0 | $d_{1,2}$ | $d_{1,3}$ | $d_{1,4}$ | $\cdots\cdots$ | $d_{1,k-1}$ | $d_{1,k}$ |
| $d_{2,1}$ | 0 | $d_{2,3}$ | $d_{2,4}$ | $\cdots\cdots$ | $d_{2,k-1}$ | $d_{2,k}$ |
| $d_{3,1}$ | $d_{3,2}$ | 0 | $d_{3,4}$ | $\cdots\cdots$ | $d_{3,k-1}$ | $d_{3,k}$ |
| $d_{4,1}$ | $d_{4,2}$ | $d_{4,3}$ | 0 | $\cdots\cdots$ | $d_{4,k-1}$ | $d_{4,k}$ |
| $\vdots$ | $\vdots$ | $\vdots$ | $\vdots$ | $\ddots$ | $\vdots$ | $\vdots$ |
| $d_{k,1}$ | $d_{k,2}$ | $d_{k,3}$ | $d_{k,4}$ | $\cdots\cdots$ | $d_{k,k-1}$ | 0 |

FIG. 35

| User ID | Known Voice Quality ID |
|---|---|
| User 1 | Voice Quality 1<br>Voice Quality 2 |
| User 2 | Voice Quality 1<br>Voice Quality 3<br>Voice Quality 5 |
| ⋮ | ⋮ |

VOICE QUALITY EDIT DEVICE AND VOICE QUALITY EDIT METHOD

TECHNICAL FIELD

The present invention relates to devices and methods for editing voice quality of a voice.

BACKGROUND ART

In recent years, development of speech synthesis technologies has allowed synthetic speeches to have significantly high sound quality.

However, conventional applications of synthetic speeches are mainly reading of news texts by broadcaster-like voice, for example.

In the meanwhile, in services of mobile telephones and the like, a speech having a feature (a synthetic speech having a high individuality reproduction, or a synthetic speech with prosody/voice quality having features such as high school girl delivery or Japanese Western dialect) has begun to be distributed as one content. For example, service of using a message spoken by a famous person instead of a ring-tone is provided. In order to increase entertainments in communication between individuals as the above example, a desire for generating a speech having a feature and presenting the generated speech to a listener will be increased in the future.

A method of synthesizing a speech is broadly classified into the following two methods: a waveform connection speech synthesis method of selecting appropriate speech elements from prepared speech element databases and connecting the selected speech elements to synthesize a speech; and an analytic-synthetic speech synthesis method of analyzing a speech and synthesizing a speech based on a parameter generated by the analysis.

In consideration of varying voice quality of a synthetic speech as mentioned previously, the waveform connection speech synthesis method needs to have speech element databases corresponding to necessary kinds of voice qualities and connect the speech elements while switching among the speech element databases. This requires a significant cost to generate synthetic speeches having various voice qualities.

On the other hand, the analytic-synthetic speech synthesis method can convert a voice quality of a synthetic speech to another by converting an analyzed speech parameter.

There is also a method of converting voice quality using a speaker adaptation technology. In this method, voice quality conversion is achieved by preparing voice features of other speakers and adapting the features to analyzed voice parameters.

In order to change a voice quality of voice, it is necessary to make a user designate, using some kind of method, a desired voice quality to which the original voice is to be converted. An example of the methods of designating the desired voice quality is that the user designates the desired voice quality using a plurality of sense-axis sliders as shown in FIG. 1. However, it is difficult for a user who does not have enough background knowledge of phonetics speech to designate the desired voice quality by adjusting such sliders. This is because the user has difficulty in verbalizing the desired voice quality by sense words. For example, in an example of FIG. 1, the user needs to adjust each slider axis expecting the desired voice quality, for instance, expecting "about 30 years old, very feminine, but rather gloomy and emotionless, . . . ", but the adjustment is difficult for those who do not have enough background knowledge of phonetics. In addition, it is also difficult to expect the voice quality indicated by states of the sliders.

In the meanwhile, when voices of unfamiliar voice quality are heard, it is common in everyday life to express such voices by the following way. When a user listens to voices of unfamiliar voice quality, the user usually expresses the unfamiliar voice quality using a specific personal name the user knows, for example, expressing "similar to Mr./Ms. X's voice, but a bit like Mr./Ms. Y's voice" where X and Y are individuals the user actually knows. From the above, it is considered that the user can intuitively designate a desired voice quality by combining voice qualities of specific individuals (namely, voice qualities of individuals having certain features).

If the user edits voice quality by combining specific individual voice qualities previously held in a system as described above, a method of presenting the held voice qualities in an easily understandable manner is vital. Therefore, the voice quality conversion based on a speaker adaptation technology is performed using voice features of edited voices, thereby generating a synthetic speech having the user's desired voice quality.

Here, a method of presenting a user with sound information registered in a database and making the user select one of them is disclosed in Patent Reference 1. Patent Reference 1 discloses a method of making a user select a sound effect which the user desires from various sound effects. In the method of Patent Reference 1, the registered sound effects are arranged on an acoustical space based on acoustic features and sense information, and icons each associated with a corresponding acoustic feature of the sound effect are presented.

FIG. 2 is a block diagram of a structure of an acoustic browsing device disclosed in Patent Reference 1.

The acoustic browsing device includes an acoustic data storage unit 1, an acoustical space coordinate data generation unit 2, an acoustical space coordinate data storage unit 3, an icon image generation unit 4, an acoustic data display unit 5, an acoustical space coordinate receiving unit 6, a stereophony reproduction processing unit 7, and an acoustic data reproduction unit 8.

The acoustic data storage unit 1 stores a set of: acoustic data itself; an icon image to be used in displaying the acoustic data on a screen; and an acoustic feature of the acoustic data. The acoustical space coordinate data generation unit 2 generates coordinate data of the acoustic data on an acoustical space to be displayed on the screen, based on the acoustic feature stored in the acoustic data storage unit 1. That is, the acoustical space coordinate data generation unit 2 calculates a position where the acoustic data is to be displayed on the acoustical space.

The icon image to be displayed on the screen is generated by the icon image generation unit 4 based on the acoustic feature. In more detail, the icon image is generated based on spectrum distribution and sense parameter of the sound effect.

In Patent Reference 1, such arrangement of respective sound effects on a space makes it easy for the user to designate a desired sound effect. However, the coordinates presenting the sound effects are determined by the acoustical space coordinate data generation unit 2 and therefore the determined coordinates are standardized. This means that the acoustical space does not always match the user's sense.

On the other hand, in the fields of data display processing systems, a method of modifying an importance degree of information depending on a user's input is disclosed in Patent Reference 2. The data display processing system disclosed in Patent Reference 2 changes a display size of information held in the system depending on an importance degree of the information, in order to display the information. The data display processing system receives a modified importance degree from a user, and then modifies, based on modified information, a weight to be used to calculate the importance degree.

FIG. 3 is a block diagram of a structure of the data display processing system of Patent Reference 2. As shown in FIG. 3, an edit processing unit 11 is a processing unit that performs edit processing for a set of data elements each of which is a unit of data having meaning to be displayed. An edit data storage unit 14 is a storage device in which documents and illustration data to be edited and displayed are stored. A weighting factor storage unit 15 is a storage device in which predetermined plural weighting factors to be used in combining basic importance degree functions are stored. An importance degree calculation unit 16 is a processing unit that calculates an importance degree of each data element to be displayed, applying a function generated by combining the basic importance degree functions based on the weighting factor. A weighting draw processing unit 17 is a processing unit that decides a display size or display permission/prohibition of each of data elements according to the calculated importance degrees of the data elements, then performs display layout of the data elements, and eventually generates display data. A display control unit 18 controls the display device 20 to display the display data generated by the weighting draw processing unit 17. The edit processing unit 11 includes a weighting factor change unit 12 that changes, based on an input from an input device 19, the weighting factor associated with a corresponding basic importance degree factor stored in the weighting factor storage unit 15. The data display processing system also includes a machine-learning processing unit 13. The machine-learning processing unit 13 automatically changes the weighting factor stored in the weighting factor storage unit 15 by learning, based on operation information which is notified from the edit processing unit 11 and includes display size change and the like instructed by a user. Depending on the importance degrees of the data elements, the weighting draw processing unit 17 performs visible weighting draw processing, binary size weighting draw processing, or proportion size weighting draw processing, or a combination of any of the weighting draw processing.

Patent Reference 1: Japanese Unexamined Patent Application Publication No. 2001-5477

Patent Reference 2: Japanese Unexamined Patent Application Publication No. 6-130921

DISCLOSURE OF INVENTION

Problems that Invention is to Solve

However, if the technology of Patent Reference 2 is used to edit voice quality, there is a problem of how a voice quality space matching sense of a user is created and a problem of how a desired voice quality designated by the user is generated.

That is, although in Patent Reference 2 an importance degree of each data can be adjusted, it is difficult to use the same technology to speech. For data, an importance degree can be decided based on sense of values of an individual as a single index. For speech, however, such single index is not enough to edit a voice feature to satisfy individual's desire.

This problem is explained in more detail below. For example, it is assumed that one index is to be set for speech. Here, an axis indicating a pitch of voice is assumed to be selected as the index. In this situation, even if the user can change the pitch of voice, there are a limitless number of voice qualities having the same pitch. Therefore, it is difficult to edit voice quality based on only one index. In the meanwhile, as disclosed in Patent Reference 2, it is possible to quantify each voice according to sense of values of an individual by selecting a comprehensive index such as a importance degree or a favorability rating. However, there are also a limitless number of voice qualities having the same importance.

This problem is an essential problem that a voice quality cannot be approximated to a desired voice quality until why a user senses an set index important and why a user senses a higher favorability rating are adequately examined. In order to solve the above essential problem, a plurality of parameters as shown in FIG. 1 should be adjusted. However, such adjustment requires a user to have technical knowledge of phonetics.

In the meanwhile, in the presentation method of Patent Reference 1, a user can select a voice from a presented voice quality space. However, there is a problem that merely switching of methods for structuring a voice quality space to match sense of a user causes a deviation between (i) a desired voice quality which the user expects to obtain at a position slightly shifted from a voice selected on the voice quality space and (ii) a voice quality which the system actually generates. This is because there is no means for associating (i) the space structured base on the sensory scale with (ii) the space of internal parameters held in the system.

In Patent Reference 1, a voice is presented as an icon image generated based on an acoustic feature. Therefore, there is a problem that technical knowledge of phonetics is necessary to edit voice quality.

The present invention overcomes the above-described problems. It is an object of the present invention to provide a voice quality edit device by which a user who does not have technical knowledge of phonetics can easily edit voice quality.

Means to Solve the Problems

In accordance with an aspect of the present invention for achieving the object, there is provided a voice quality edit device that generates a new voice quality feature by editing a part or all of voice quality features each consisting of acoustic features regarding a corresponding voice quality, the voice quality edit device including: a voice quality feature database holding the voice quality features; a speaker attribute database holding, for each of the voice quality features held in the voice quality feature database, an identifier enabling a user to expect a voice quality of a corresponding voice quality feature; a weight setting unit configured to set a weight for each of the acoustic features of a corresponding voice quality; a display coordinate calculation unit configured to calculate display coordinates of each of the voice quality features held in the voice quality feature database, based on (i) the acoustic features of a corresponding voice quality feature and (ii) the weights set for the acoustic features by the weight setting unit; a display unit configured to display, for each of the voice quality features held in the voice quality feature database, the identifier held in the speaker attribute database on the display coordinates calculated by the display coordinate calculation unit; a position input unit configured to receive designated coordinates; and a voice quality mix unit configured to (i) calculate a distance between (1) the designated coordinates received by the position input unit and (2) the display coordinates of each of a part or all of the voice quality features held in the voice quality feature database, and (ii) mix the acoustic features of the part or all of the voice quality features together based on a ratio between the calculated distances in order to generate a new voice quality feature.

With the above structure, the identifier displayed by the display unit enables a user to expect a voice quality associated with the identifier. Thereby, the user can expect the voice quality by seeing the displayed identifier. As a result, even a user who does not have technical knowledge of phonetics can easily edit voice quality (voice quality feature). In addition, with the above structure, the displayed coordinates of each voice quality feature are calculated based on the weights set by the weight setting unit. Thereby, the identifiers associated with the respective voice quality features can be displayed on the display coordinates matching sense of a user regarding distances among the voice quality features.

It is preferable that the speaker attribute database holds, for each of the voice quality features held in the voice quality feature database, (i) at least one of a face image, a portrait, and a name of a speaker of a voice having the voice quality of the corresponding voice quality feature, or (ii) at least one of an image and a name of a character uttering a voice having the voice quality of the corresponding voice quality feature, and that the display unit is configured to display on the display coordinates calculated by the display coordinate calculation unit, for each of the voice quality features held in the voice quality feature database, (i) the at least one of the face image, the portrait, and the name of the speaker or (ii) the at least one of the image and the name of the character, which are held in the speaker attribute database.

With the above structure, the user can directly expect a voice quality when seeing a displayed face image or the like regarding the voice quality.

It is further preferable that the voice quality edit device further includes a user information management database holding identification information of a voice quality feature of a voice quality which the user knows, wherein the display unit is configured to display, for each of the voice quality features which are held in the voice quality feature database and have respective pieces of the identification information held in the user information management database, the identifier held in the speaker attribute database on the display coordinates calculated by the display coordinate calculation unit.

With the above structure, all voice quality features associated with respective identifiers displayed by the display unit are regarding voice qualities which the user has already known. Thereby, the user can expect the voice qualities by seeing the displayed identifiers. As a result, even a user who does not have technical knowledge of phonetics can easily edit voice quality features, which results in reduction in a load required for the user to edit the voice quality features.

It is still further preferable that the voice quality edit device further includes: an individual characteristic input unit configured to receive a designated sex or age of the user; and a user information management database holding, for each sex or age of users, identification information of a voice quality feature of a voice quality which is supposed to be known by the users, wherein the display unit is configured to display, for each of the voice quality features which are held in the voice quality feature database and have respective pieces of identification information held in the user information management database and associated with the designated sex or age received by the individual characteristic input unit, the identifier held in the speaker attribute database on the display coordinates calculated by the display coordinate calculation unit.

With the above structure, when the user merely input a sex or an age of the user, it is possible to prevent from displaying identifiers associated with voice qualities which the user would not know. As a result, a load on the user editing voice quality can be reduced.

In accordance with another aspect of the present invention, there is provided a voice quality edit system that generates a new voice quality feature by editing a part or all of voice quality features each consisting of acoustic features regarding a corresponding voice quality, the voice quality edit system including a first terminal, a second terminal, and a server, which are connected to one another via a network, each of the first terminal and the second terminal includes: a voice quality feature database holding the voice quality features; a speaker attribute database holding, for each of the voice quality features held in the voice quality feature database, an identifier enabling a user to expect a voice quality of a corresponding voice quality feature; a weight setting unit configured to set a weight for each of the acoustic features of a corresponding voice quality and send the weight to the server; an inter-voice-quality distance calculation unit configured to (i) extract an arbitrary pair of voice quality features from the voice quality features held in the voice quality feature database, (ii) weight the acoustic features of each of the voice quality features in the extracted arbitrary pair, using the respective weights held in the server, and (iii) calculate a distance between the voice quality features in the extracted arbitrary pair after the weighting; a scaling unit configured to calculate plural sets of the display coordinates of the voice quality features held in the voice quality feature database based on the distances calculated by the inter-voice-quality distance calculation unit using a plurality of the arbitrary pairs; a display unit configured to display, for each of the voice quality features held in the voice quality feature database, the identifier held in the speaker attribute database on a corresponding set of the display coordinates in the plural sets calculated by the scaling unit; a position input unit configured to receive designated coordinates; and a voice quality mix unit configured to (i) calculate a distance between (1) the designated coordinates received by the position input unit and (2) the display coordinates of each of a part or all of the voice quality features held in the voice quality feature database, and (ii) mix the acoustic features of the part or all of the voice quality features together based on a ratio between the calculated distances in order to generate a new voice quality feature, and the server includes a weight storage unit configured to hold the weight sent from any of the first terminal and the second terminal.

With the above structure, the first terminal and the second terminal can share the weight managed in the server. Thereby, when the first and second terminals hold the same voice quality feature, an identifier of the voice quality feature can be displayed on the same display coordinates. As a result, the first and second terminals can perform the same voice quality edit processing. In addition, the setting of the weight does not need to be performed by each of the terminals. This can considerably reduce a load required to set the weight, much more than the situation where the weight is set by each of the terminals.

It should be noted that the present invention can be implemented not only as the voice quality edit device including the above characteristic units, but also as: a voice quality edit method including steps performed by the characteristic units of the voice quality edit device: a program causing a computer to execute the characteristic steps of the voice quality edit method; and the like. Of course, the program can be distributed by a recording medium such as a Compact Disc-Read Only Memory (CD-ROM) or by a transmission medium such as the Internet Effects of the Invention The voice quality edit device according to the present invention allows a user who does not have technical knowledge of phonetics to easily edit voice quality.

Further, adjustment of the weight by the weight setting unit enables the inter-voice-quality distance calculation unit to calculate inter-voice-quality distances reflecting sense of distances (in other words, differences) among the voice quality features which a user perceives. Furthermore, based on the sense of distances, the scaling unit calculates display coordinates of an identifier of each voice quality feature. Thereby, the display unit can display a voice quality space matching sense of the user. Still further, this voice quality space is a distance space matching the sense of the user. Therefore, it is possible to expect a voice quality feature located between displayed voice quality features easier than the situation where the voice quality features are displayed using a predetermined distance scale. As a result, the user can easily designate coordinates of a desired voice quality feature using the position input unit.

Still further, when the voice quality mix unit mixes voice quality features (pieces of voice quality feature information) together, nearby voice quality candidates are selected on the voice quality space generated based on the weights, and thereby a mixing ratio for mixing the selected voice quality candidates can be decided based on inter-quality-voice distances among them on the voice quality space. That is, the decided mixing ratio can correspond to a mixing ratio which a user expects for mixing these candidates. In addition, a voice quality feature corresponding to the coordinates designated by the user is generated according to weights (a piece of weight information) which are set by the user using the weight setting unit and stored in the weight storage unit. Thereby, it is possible to synthesize a voice quality corresponding to a position on the voice quality space generated by the voice quality edit device to match expectation of the user.

In other words, the weight serves as intermediary to match the voice quality space generated by the voice quality edit device with the voice quality space expected by a user. Therefore, the user can designate and generate a desired voice quality only by designating coordinates on the voice quality space presented by the voice quality edit device.

BRIEF DESCRIPTION OF DRAWINGS

FIG. 12 is a diagram showing a data structure of a distance matrix calculated by an inter-voice-quality distance calculation unit.

FIG. 35 is a table showing an example of a data structure of information managed by a user information management database 501.

NUMERICAL REFERENCES

Figure 1:
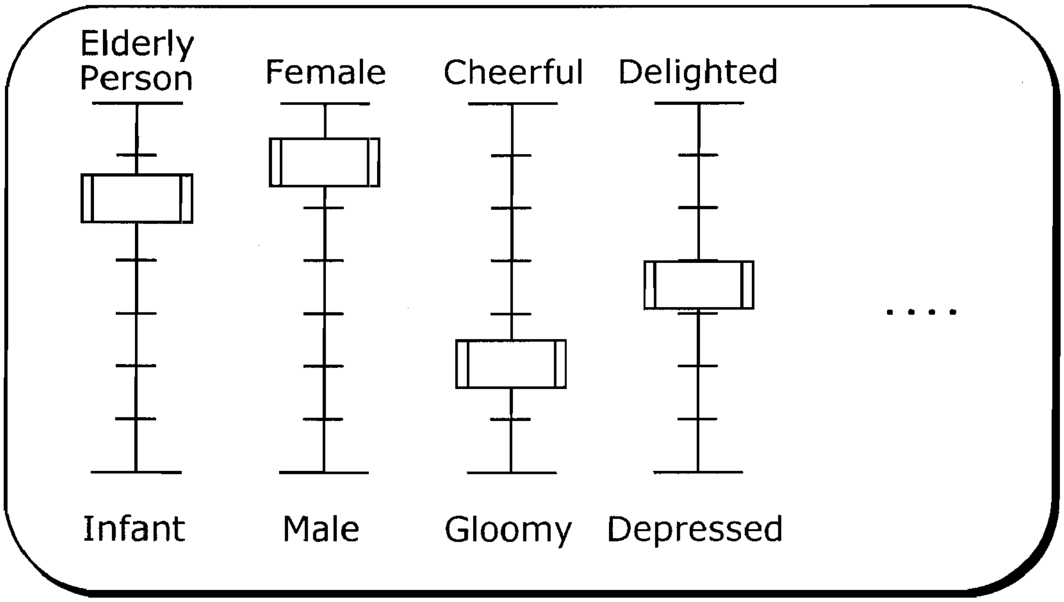
FIG. 1 is a diagram showing an example of a voice quality edit interface.
Figure 2:
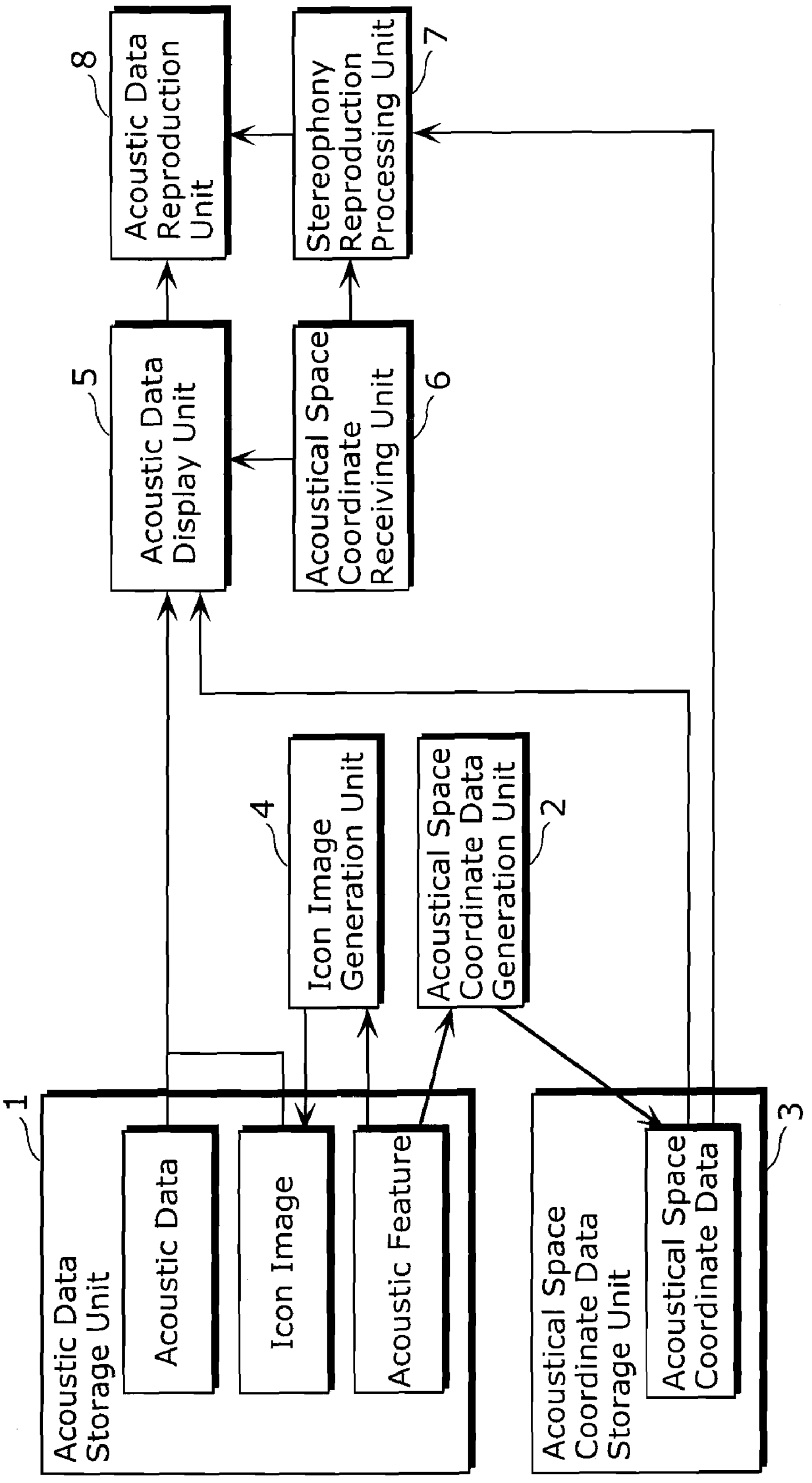
FIG. 2 is a block diagram showing a structure of an acoustic browsing device disclosed in Patent Reference 1.
Figure 3:
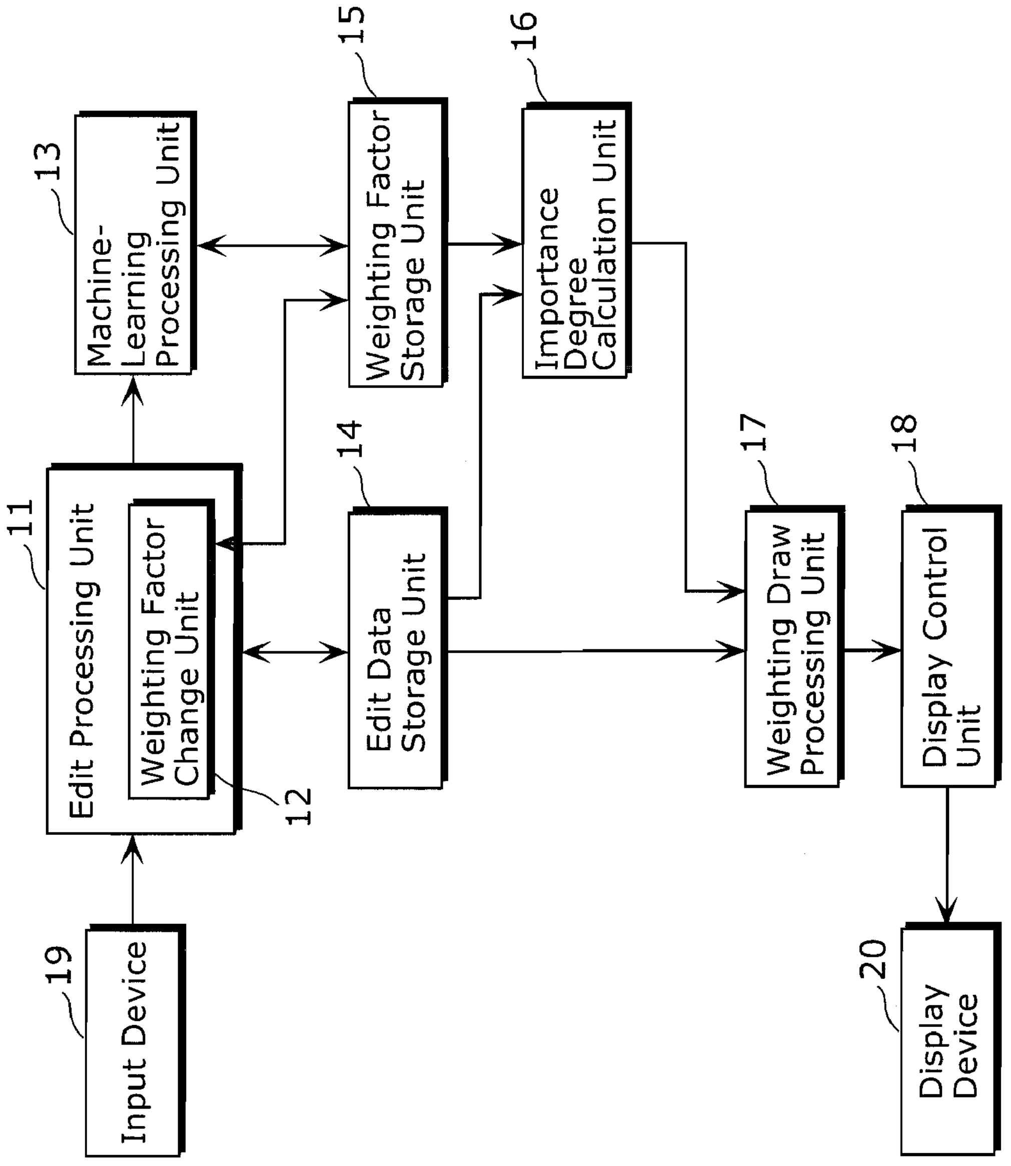
FIG. 3 is a block diagram showing a structure of a data display device disclosed in Patent Reference 2.

101 voice quality feature database
102 inter-voice-quality distance calculation unit
103 weight setting unit
104 input unit
105 scaling unit
106 speaker attribute database
107 display unit
108 position input unit
109 weight storage unit
110 voice quality mix unit
201 nearby voice quality candidate selection unit
202 mixing ratio calculation unit
203 feature mix unit
301 vowel stable section extraction unit
302 voice quality feature calculation unit
401 weight database
402 weight selection unit
403 representative voice quality database
404 voice quality presentation unit
405, 407 weight calculation unit
406 subjective axis presentation unit
501 user information management database
601 vowel conversion unit
602 consonant vocal tract information hold unit
603 consonant selection unit
604 consonant transformation unit
605 sound source transformation unit
606 synthesis unit
701, 702 terminal
703 server
704 network

BEST MODE FOR CARRYING OUT THE INVENTION

The following describes preferred embodiments of the present invention with reference to the drawings.

First Embodiment

Figure 4:
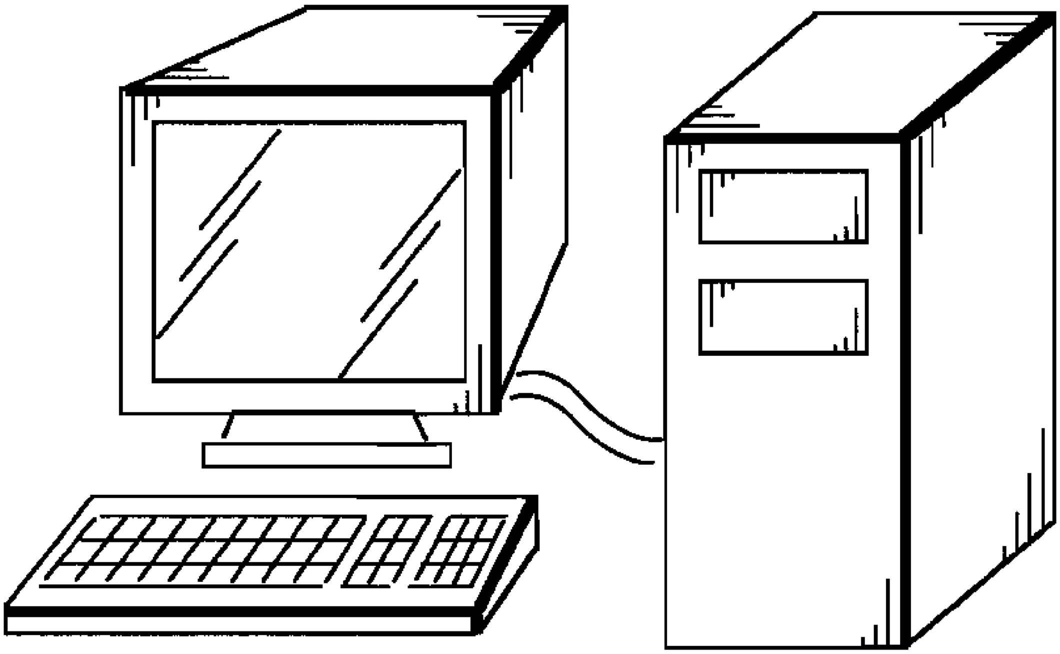
FIG. 4 is an external view of a voice quality edit device according to a first embodiment of the present invention.

FIG. 4 is an external view of a voice quality edit device according to the first embodiment of the present invention. The voice quality edit device is implemented in a common computer such as a personal computer or an engineering workstation (EWS).

Figure 5:
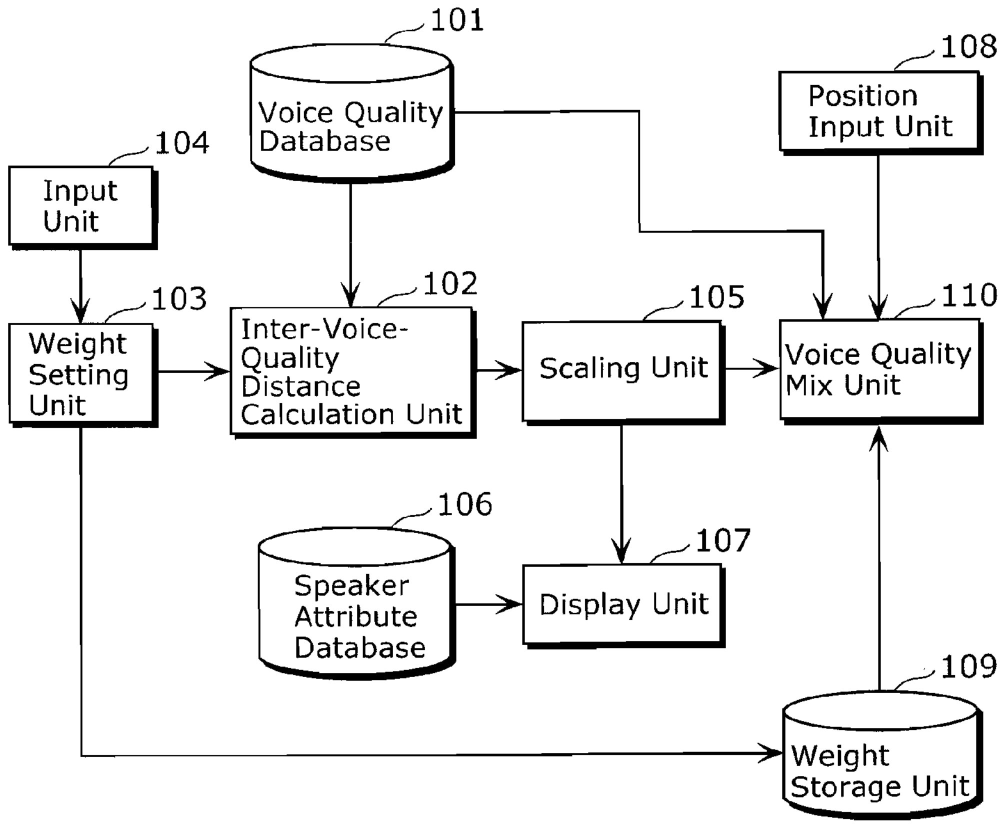
FIG. 5 is a block diagram showing a structure of the voice quality edit device according to a first embodiment of the present invention.

FIG. 5 is a block diagram showing a structure of the voice quality edit device according to the first embodiment of the present invention.

The voice quality edit device is a device that edits a plurality of voice quality features (namely, plural pieces of voice quality feature information) to generate a new voice quality feature. The voice quality edit device includes a voice quality feature database 101, an inter-voice-quality distance calculation unit 102, a weight setting unit 103, an input unit 104, a scaling unit 105, a speaker attribute database 106, a display unit 107, a position input unit 108, a weight storage unit 109, and a voice quality mix unit 110.

The voice quality feature database 101 is a storage device in which a set of acoustic features are stored for each of voice quality features held in the voice quality edit device. The voice quality feature database 101 is implemented as a hard disk, a memory, or the like. Hereinafter, such a set of acoustic features regarding a voice quality is referred to also as a "voice quality", a "voice quality feature", or a piece of "voice quality feature information".

The inter-voice-quality distance calculation unit 102 is a processing unit that calculates a distance (namely, difference) between the voice quality features held in the voice quality feature database 101 (hereinafter, the distance is referred to also as an "inter-voice-quality distance"). The weight setting unit 103 is a processing unit that sets weight information (namely, a set of weights or weighting parameters) indicating which physical parameter (namely, an acoustic feature) is to be emphasized in the distance calculation of the inter-voice-quality distance calculation unit 102. The input unit 104 is an input device that receives an input from a user when the weight information is to be set by the weight setting unit 103. Examples of the input unit 104 are a keyboard, a mouse, and the like. The scaling unit 105 is a processing unit that decides respective coordinates of the voice quality features held in the voice quality feature database 101 on a space, based on the inter-voice-quality distances calculated by the inter-voice-quality distance calculation unit 102 (hereinafter, the coordinates are referred to also as "space coordinates", and the space is referred to also as a "voice quality space").

The speaker attribute database 106 is a storage device that holds pieces of speaker attribute information each of which is associated with a corresponding voice quality feature in the voice quality feature database 101. The speaker attribute database 106 is implemented as a hard disk, a memory, or the like. The display unit 107 is a display device that displays, for each of the voice quality features in the voice quality feature database 101, the associated speaker attribute information at the coordinates decided by the scaling unit 105. Examples of the display unit 107 are a Liquid Crystal Display (LCD) and the like. The position input unit 108 is an input device that receives from the user designation of a position on the voice quality space presented by the display unit 107. Examples of the position input unit 108 are a keyboard, a mouse, and the like.

The weight storage unit 109 is a storage device in which the weight information set by the weight setting unit 103 is stored. The weight storage unit 109 is implemented as a hard disk, a memory, or the like. The voice quality mix unit 110 is a processing unit that mixes the voice quality features (namely, plural pieces of voice quality feature information) held in the voice quality feature database 101 together based on the coordinates designated by the input unit 108 on the voice quality space and the weight information held in the weight storage unit 109, thereby generating a voice quality feature corresponding to the designated coordinates.

The inter-voice-quality distance calculation unit 102, the weight setting unit 103, the scaling unit 105, and the voice quality mix unit 110 are implemented by executing a program by a Central Processing Unit (CPU) in a computer.

Next, the voice quality feature database 101 is described in more detail.

For Japanese language, the voice quality feature database 101 holds, for each voice quality, pieces of vocal tract information derived from shapes of a vocal tract (hereinafter, referred to as "vocal tract shapes") of a target speaker for at least five vowels (/aiueo/). For other language, the voice quality feature database 101 may hold such vocal tract information of each vowel in the same manner as described for Japanese language. It is also possible that the voice quality feature database 101 is designed to further hold sound source information which is described later.

Figure 6:
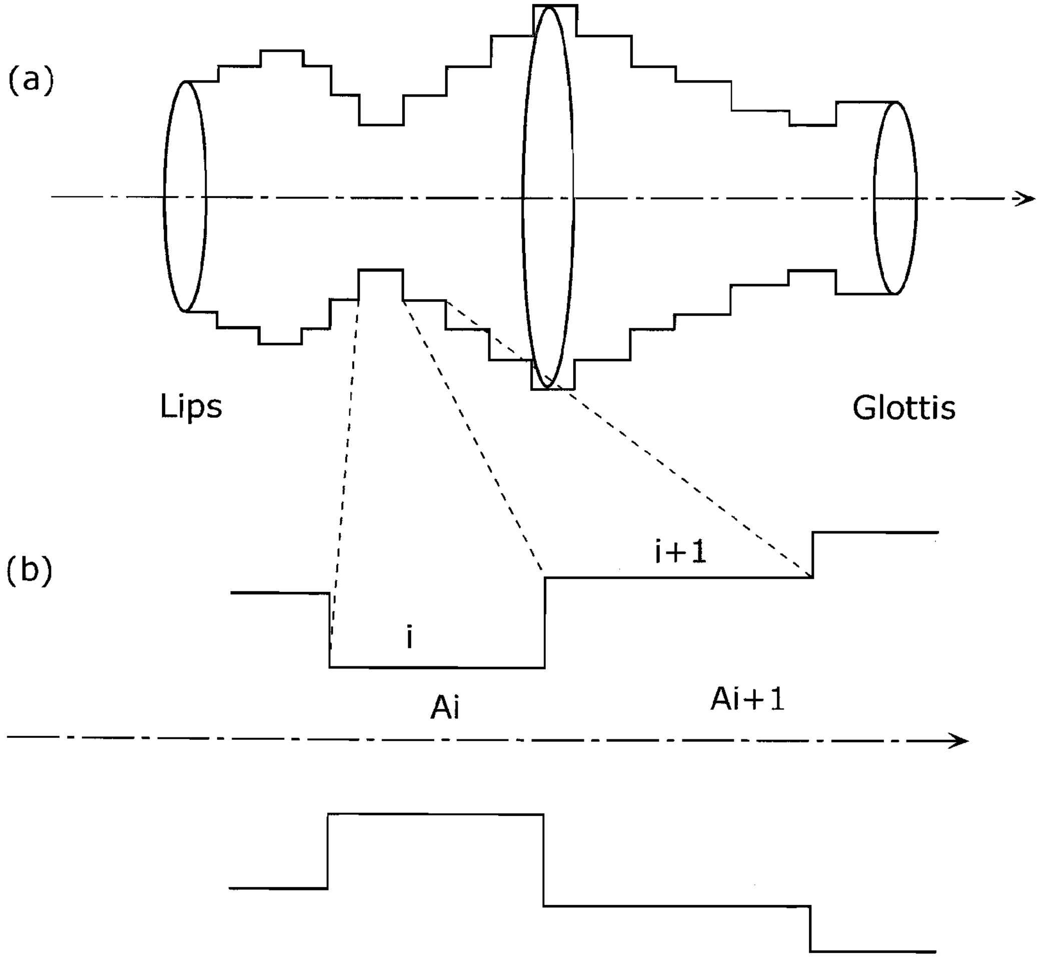
FIG. 6 is a diagram showing a relationship between a vocal tract sectional area function and a PARCOR coefficient.

An example of indication of a piece of vocal tract information is a vocal tract sectional area function. The vocal tract sectional area function represents one of sectional areas in an acoustic tube included in an acoustic tube model. The acoustic tube model simulates a vocal tract by acoustic tubes each having variable circular sectional areas as shown in FIG. 6 (*a*). It is known that such a sectional area uniquely corresponds to a Partial Auto Correlation (PARCOR) coefficient based on Linear Predictive Coding (LPC) analysis. A sectional area can be converted to a PARCOR coefficient according to the below Equation 1. It is assumed in the embodiments that a piece of vocal tract information is represented by a PARCOR coefficient $k_i$. It should be noted that a piece of vocal tract information is hereinafter described as a PARCOR coefficient but is not limited to a PARCOR coefficient and may be Line Spectrum Pairs (LSP) or LPC equivalent to a PARCOR coefficient. It should also be noted that a relationship between (i) a reflection coefficient and (ii) the PARCOR coefficient between acoustic tubes in the acoustic tube model is merely inversion of a sign. Therefore, a piece of vocal tract information may be a represented by the reflection coefficient itself.

[Formula 1]

$$\frac{A_i}{A_{i+1}} = \frac{1-k_i}{1+k_i} \qquad \text{(Equation 1)}$$

where $A_n$ represents a sectional area of an acoustic tube in the i-th section, and $k_i$ represents a PARCOR coefficient (reflection coefficient) at a boundary between the i-th section and all i+1-th section, as shown in FIG. 6 (*b*).

A PARCOR coefficient can be calculated using a linear predictive coefficient analyzed by LPC analysis. More specifically, a PARCOR coefficient can be calculated using Levinson-Durbin-Itakura algorithm.

The PARCOR coefficient can be calculated based on not only the LPC analysis but also ARX analysis (Non-Patent Reference: "Robust ARX-based Speech Analysis Method Taking Voicing Source Pulse Train into Account", Takahiro Ohtsuka et al., The Journal of the Acoustical Society of Japan, vol. 58, No. 7, (2002), pp. 386-397).

The following describes a method of generating a piece of voice quality feature information which consists of acoustic features regarding a voice and is held in the voice quality feature database 101, with reference to an example. The voice quality feature can be generated from isolate utterance vowels uttered by a target speaker.

Figure 7:
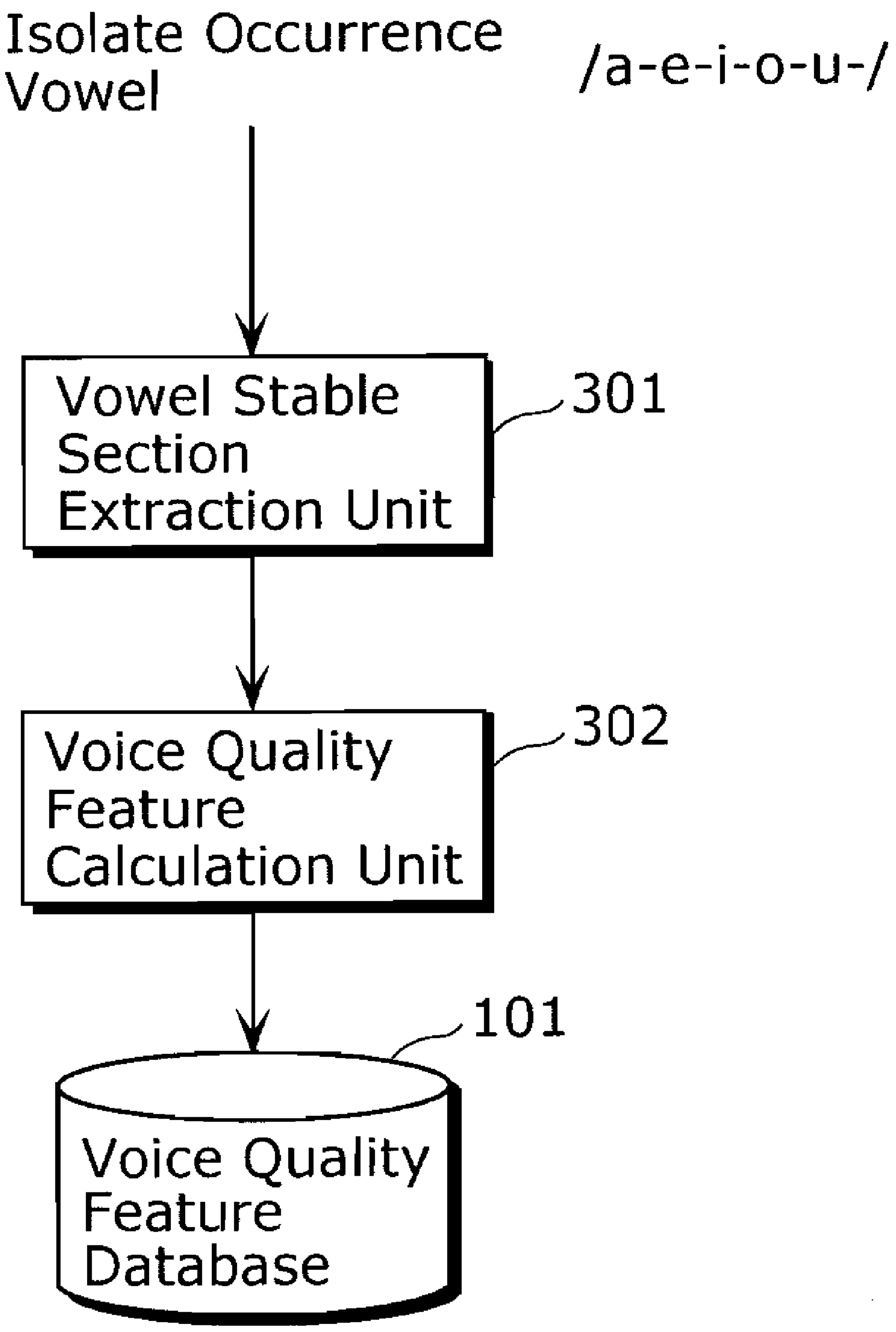
FIG. 7 is a diagram showing a method of extracting a voice quality feature to be stored into a voice quality feature database.
Figures 8A, 8B, 8C, 8D, 8E, 8F, 8G, 8H, 8I, 8J:
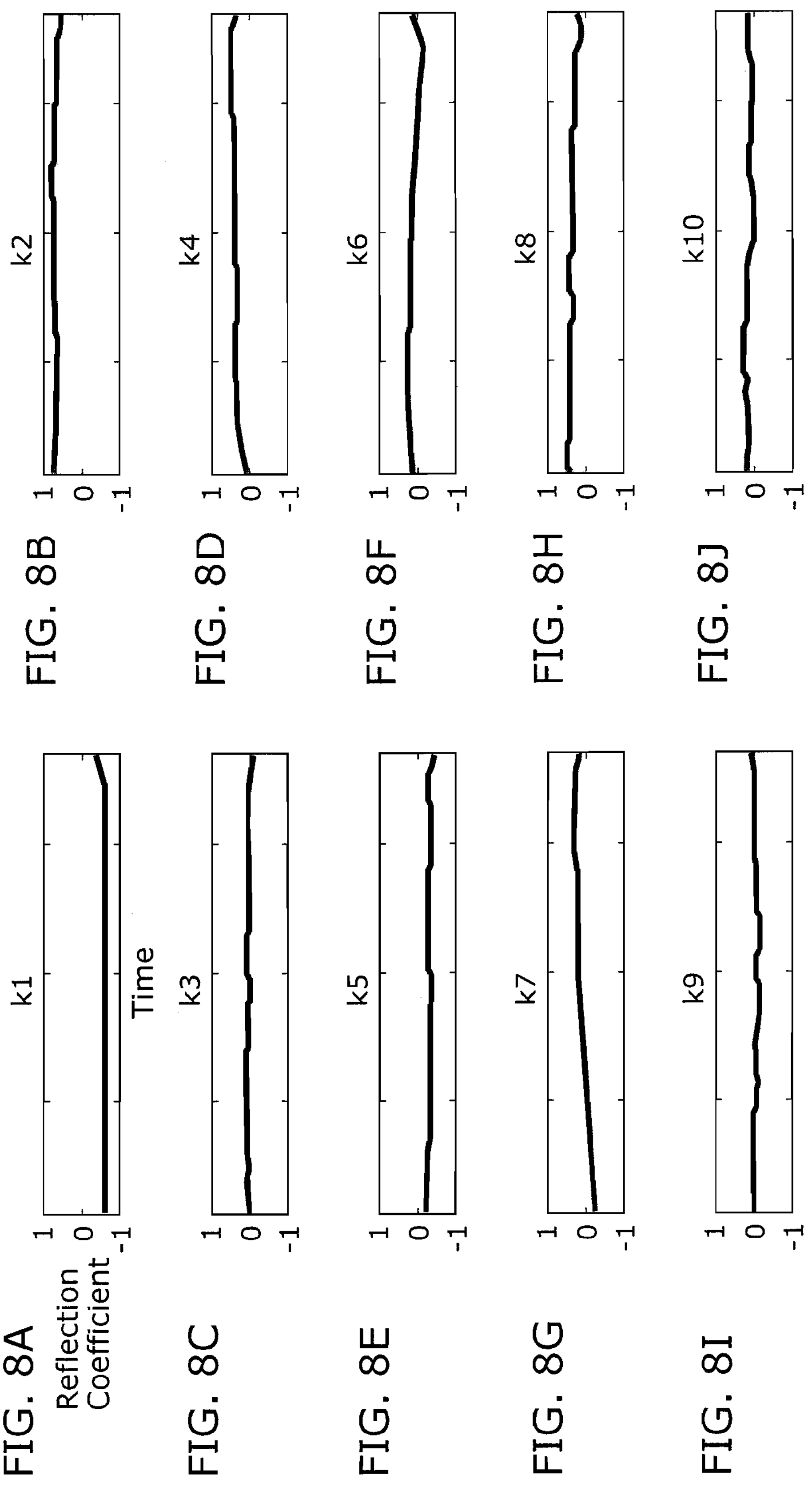
FIG. 8A is a graph showing an example of vocal tract information represented by a first-order coefficient of a vowel /a/.
FIG. 8B is a graph showing an example of vocal tract information represented by a second-order coefficient of a vowel /a/.
FIG. 8C is a graph showing an example of vocal tract information represented by a third-order coefficient of a vowel /a/.
FIG. 8D is a graph showing an example of vocal tract information represented by a fourth-order coefficient of a vowel /a/.
FIG. 8E is a graph showing an example of vocal tract information represented by a fifth-order coefficient of a vowel /a/.
FIG. 8F is a graph showing an example of vocal tract information represented by a sixth-order coefficient of a vowel /a/.
FIG. 8G is a graph showing an example of vocal tract information represented by a seventh-order coefficient of a vowel /a/.
FIG. 8H is a graph showing an example of vocal tract information represented by an eighth-order coefficient of a vowel /a/.
FIG. 8I is a graph showing an example of vocal tract information represented by a ninth-order coefficient of a vowel /a/.
FIG. 8J is a graph showing an example of vocal tract information represented by a tenth-order coefficient of a vowel /a/.

FIG. 7 is a diagram showing a structure of processing units for extracting a voice quality feature from isolate utterance vowels uttered by a certain speaker.

A vowel stable section extraction unit 301 extracts sections of isolate vowels (hereinafter, referred to as "isolate vowel sections" or "vowel sections") from provided isolate utterance vowels. A method of the extraction is not limited. For instance, a section having power at or above a certain level is decided as a stable section, and the stable section is extracted as an isolate vowel section.

For each of the isolate vowel sections extracted by the vowel stable section extraction unit 301, a voice quality feature calculation unit 302 calculates a PARCOR coefficient that has been explained above. By performing the above processing on all voice quality features held in the voice quality edit device, information held in the voice quality feature database 101 is generated.

It should be noted that the voice data from which a voice quality feature is extracted is not limited to the isolate utterance vowels, but may be, in Japanese language, any voice including at least five vowels (/aiueo/). For example, the voice data may be a speech which a target speaker utters freely at present or a speech which has been recorded. Voice of vocal track such as singing data is also possible.

In the above case, in order to extract vowel sections, phoneme recognition is performed on the voice data to detect voice data of the vowels. Then, the vowel stable section extraction unit 301 extracts stable vowel sections from the detected voice data. For example, a section having a high reliability of the phoneme recognition result (in other words, a section having a high likelihood) can be selected as a stable vowel section. The above-described extraction of stable vowel sections can eliminate influence of errors caused in the phoneme recognition.

The voice quality feature calculation unit 302 generates a piece of vocal tract information for each of the extracted stable vowel sections, thereby generating information to be stored in the voice quality feature database 101. The voice quality feature calculation of the voice quality feature calculation unit 302 is achieved by, for example, calculating the above-described PARCOR coefficient.

It should be noted that the method of generating the voice quality features to be held in the voice quality feature database 101 is not limited to the above but may be any methods as far as the voice quality features can be extracted from stable vowel sections.

FIGS. 8A to 8J are graphs showing examples of a piece of vocal tract information of a vowel /a/ represented by PARCOR coefficients of ten orders.

In each of the graphs, a vertical axis represents a reflection coefficient, and a horizontal axis represents time. Each of k1 to k10 represents an order of the reflection coefficient. By using voice data of such isolate utterance stable vowel sections, it is possible to calculate a piece of vocal tract information represented by a reflection coefficient which is a temporally-stable parameter. It should be note that, when the reflection coefficient is registered in the voice quality feature database 101, the reflection coefficient as shown in FIGS. 8A to 8J may be directly registered, or an average value or a medium value of reflection coefficients within a vowel section may be registered as a representative value.

For the sound source information, a Rosenberg-Klatt (RK) model, for example, can be used. If the RK model is used, a voiced sound source amplitude (AV), a fundamental frequency (F0), a ratio (glottis open ratio) of a time period in which glottis is open to a pitch period (an inverse number of the fundamental frequency), and the like may be used as pieces of the sound source information. In addition, aperiodic components (AF) in a sound source can also be used as a piece of the sound source information.

Figure 9:
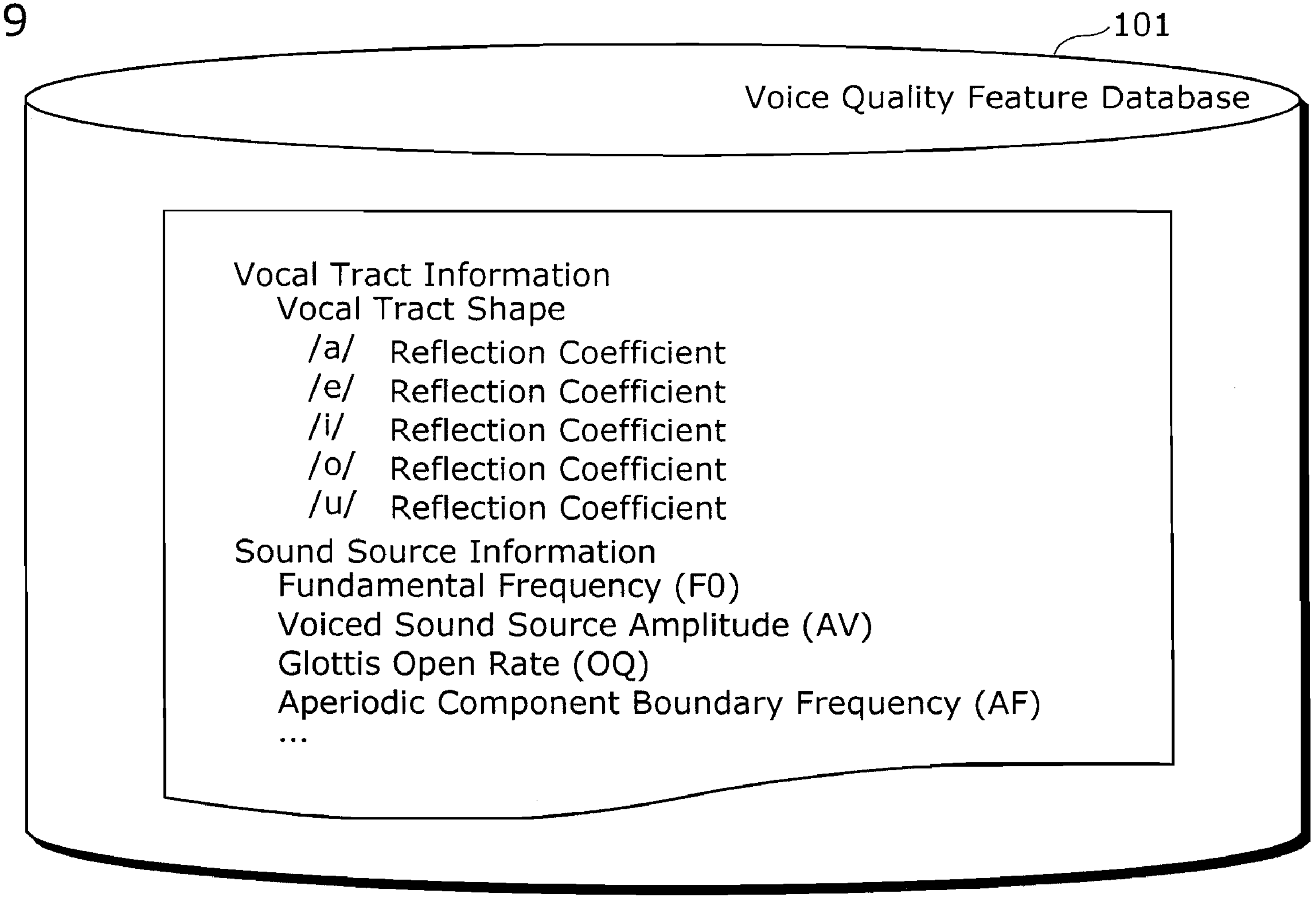
FIG. 9 is a diagram showing an example of a voice quality feature stored in the voice quality feature database.

A voice quality feature (in other words, a piece of voice quality feature information) held in the voice quality feature database 101 is information as shown in FIG. 9. That is, a piece of voice quality feature information consisting of acoustic features that are pieces of vocal tract information and pieces of sound source information is held for each voice quality feature. In the case of Japanese language, for the vocal tract information, pieces of information (reflection coefficients, for example) regarding vocal tract shapes of five vowels are held. On the other hand, for the sound source information, a fundamental frequency (F0), a voiced sound source amplitude (AV), a glottis open rate (OQ), an aperiodic component boundary frequency (AF) of a sound source, and the like are held. It should be noted that acoustic features in a piece of voice quality feature information held in the voice quality feature database 101 are not limited to the above, but may be any data indicating features regarding a corresponding voice quality.

Figure 10:
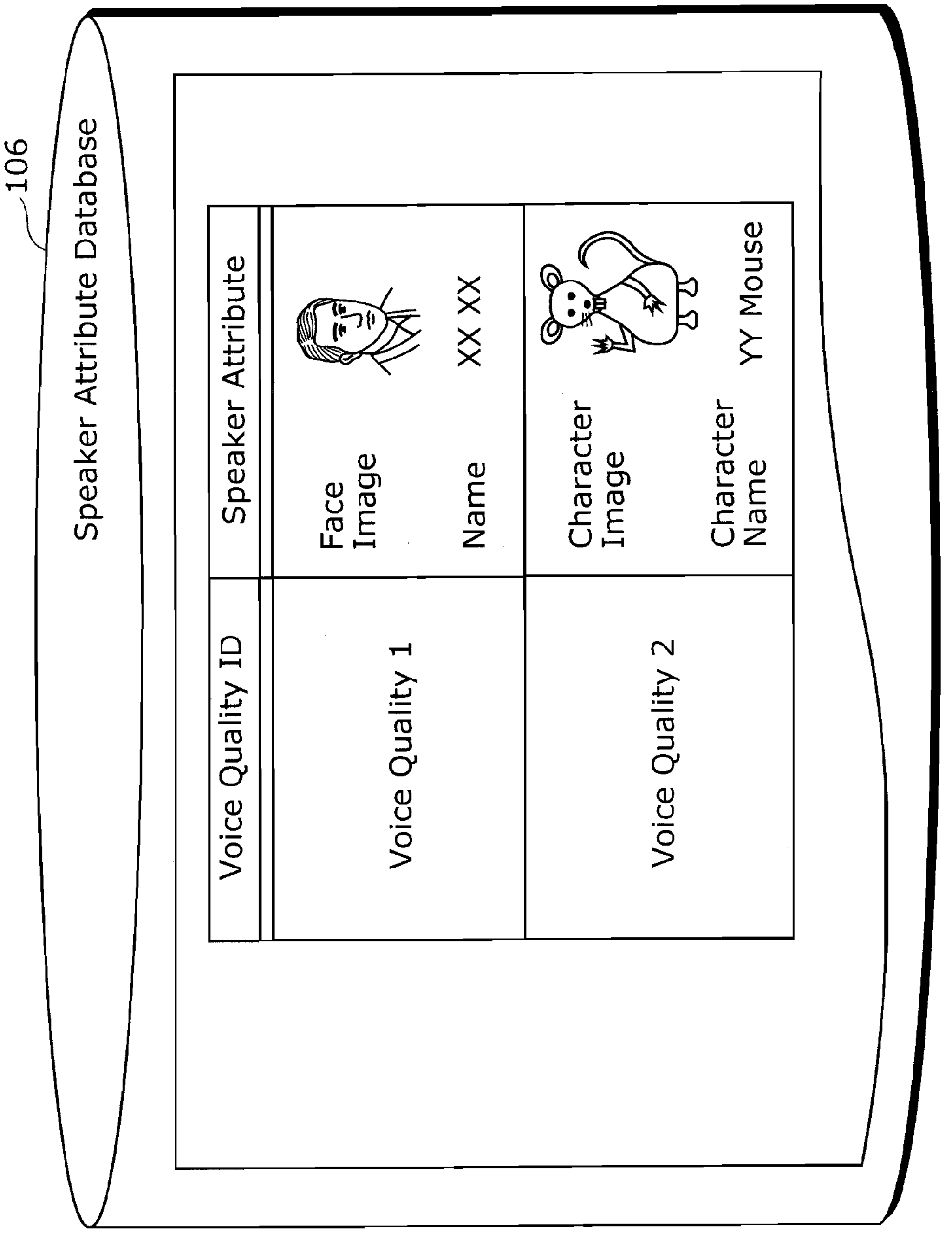
FIG. 10 is a diagram showing an example of speaker attributes stored in a speaker attribute database.

FIG. 10 is a diagram showing an example of speaker attributes held in the speaker attribute database 106. Each speaker attribute held in the speaker attribute database 106 is information by which the user can understand a corresponding voice quality feature held in the voice quality feature database 101 without actually listening to the voice quality feature. In other words, the user can expect a voice quality associated with a speaker attribute only by seeing the speaker attribute. For example, a speaker attribute enables the user to specify a speaker who has uttered the voice from which a voice quality feature of the speaker attribute is extracted and then held in the voice quality feature database 101. The speaker attribute includes, for example, an image of a face (face image), a name, and the like regarding the speaker. Such a speaker attribute, which enables the user to specify a speaker, allows the user to easily expect a voice quality of the speaker whose face image is presented, only by seeing the face image if the user knows the speaker. This means that such a speaker attribute can prevent use of various estimation scales for defining a presented voice quality.

It should be noted that a speaker attribute is not limited to a face image and a name of a speaker, but may be any data enabling the user to directly expect voice of the speaker. For example, if a speaker is a cartoon character or a mascot, it is possible to use not a face image and a name of a voice actor of the cartoon character or a mascot, but an image and a name of the cartoon character or mascot. Further, if a speaker is an actor or the like in foreign movies, it is possible to use not a speaker attribute of a person who dubs voice of the actor, but a speaker attribute of the dubbed actor. Furthermore, if a speaker is a narrator, it is possible to use not only a speaker attribute of the narrator, but also a name or a logo of a program in which the narrator appears, as a speaker attribute.

With the above structure, a voice quality designated by the user can be generated.

Figure 11:
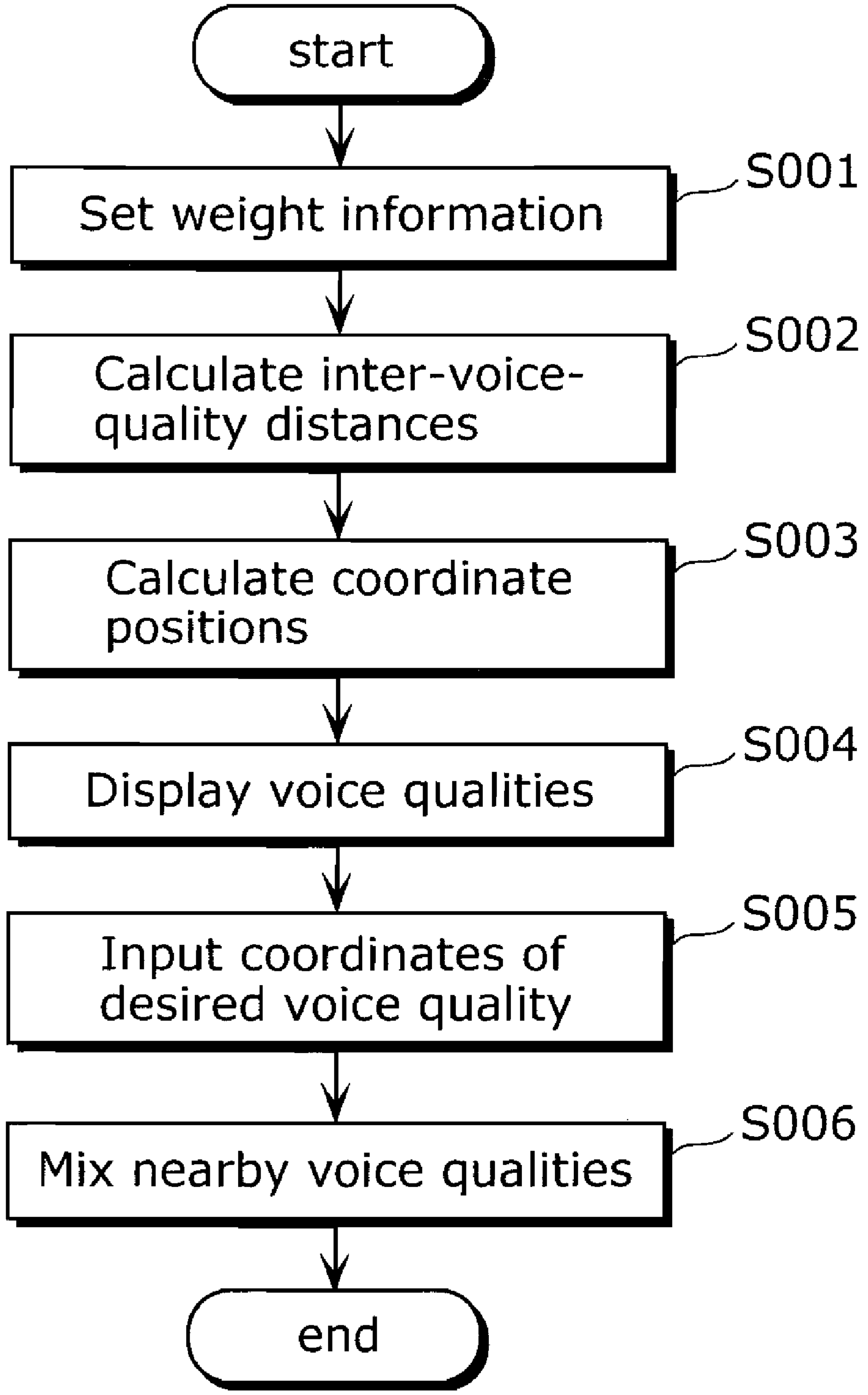
FIG. 11 is a flowchart of basic processing performed by the voice quality edit device according to the first embodiment of the present invention.

Next, the processing performed by the voice quality edit device is described with reference to a flowchart of FIG. 11.

The weight setting unit 103 receives a designation from the input unit 104, and based on the designation, sets weight information (namely, a set of weights) to be used in calculating inter-voice-quality distances (Step S001). The weight setting unit 103 stores the weight information into the weight storage unit 109. A method of setting the weight information is described in detail later.

The inter-voice-quality distance calculation unit 102 calculates inter-voice-quality distances regarding all voice quality features held in the voice quality feature database 101 using the weight information set at Step S001 (Step S002). The inter-voice-quality distance is defined in the following manner. When a voice quality registered in the voice quality feature database 101 is represented by a vector, a distance between two vectors (distance between voice quality features) can be defined as a weighted Euclidean distance as expressed in the below Equation 2. Here, a weight $w_l$ needs to satisfy the conditions expressed in the below Equation 3. It should be noted that the distance calculation method is not limited to the above, but the distance may be calculated using a degree of similarity in cosine. In such a case, the degree of similarity in cosine needs to be converted to a distance. Therefore, an angle between vectors may be defined as the distance, for example. Here, the distance can be calculated applying an arccosine function for the degree of similarity in cosine.

[Formula 2]

$$d_{i,j} = \sum_{l=1}^{n} w_l \times (v_{il} - v_{jl})^2 \quad \text{(Equation 2)}$$

[Formula 3]

$$\sum_{l=1}^{n} w_l = 1 \quad \text{(Equation 3)}$$

where $w_l$ is a weighting parameter representing an importance degree of each of the parameters including a vocal tract shape parameter, a fundamental frequency, and the like held in the voice quality feature database 101, $v_i$ represents the i-th voice quality feature held in the voice quality feature database 101, and $v_{il}$ represents a physical quantity of the l-th parameter of the voice quality feature $v_i$.

By calculating the inter-voice-quality distances regarding the voice quality features held in the voice quality feature database 101, it is possible to generate a distance matrix as shown in FIG. 12. In the distance matrix, an element $d_{i,j}$ in the i-th row and the j-th column represents a distance between a voice quality feature $v_i$ and a voice quality feature $v_j$.

Next, the scaling unit 105 calculates coordinates of each voice quality feature on a voice quality space, using the inter-voice-quality distances regarding all voice quality features held in the voice quality feature database 101 (namely, the distance matrix) which are calculated at Step S002 (Step S003). It should be noted that the method of calculating the coordinates is not limited, but the coordinates may be calculated by associating each voice quality feature with a corresponding position on a two-dimensional or three-dimensional space using, for example, multidimensional scaling (MDS).

Figure 13:
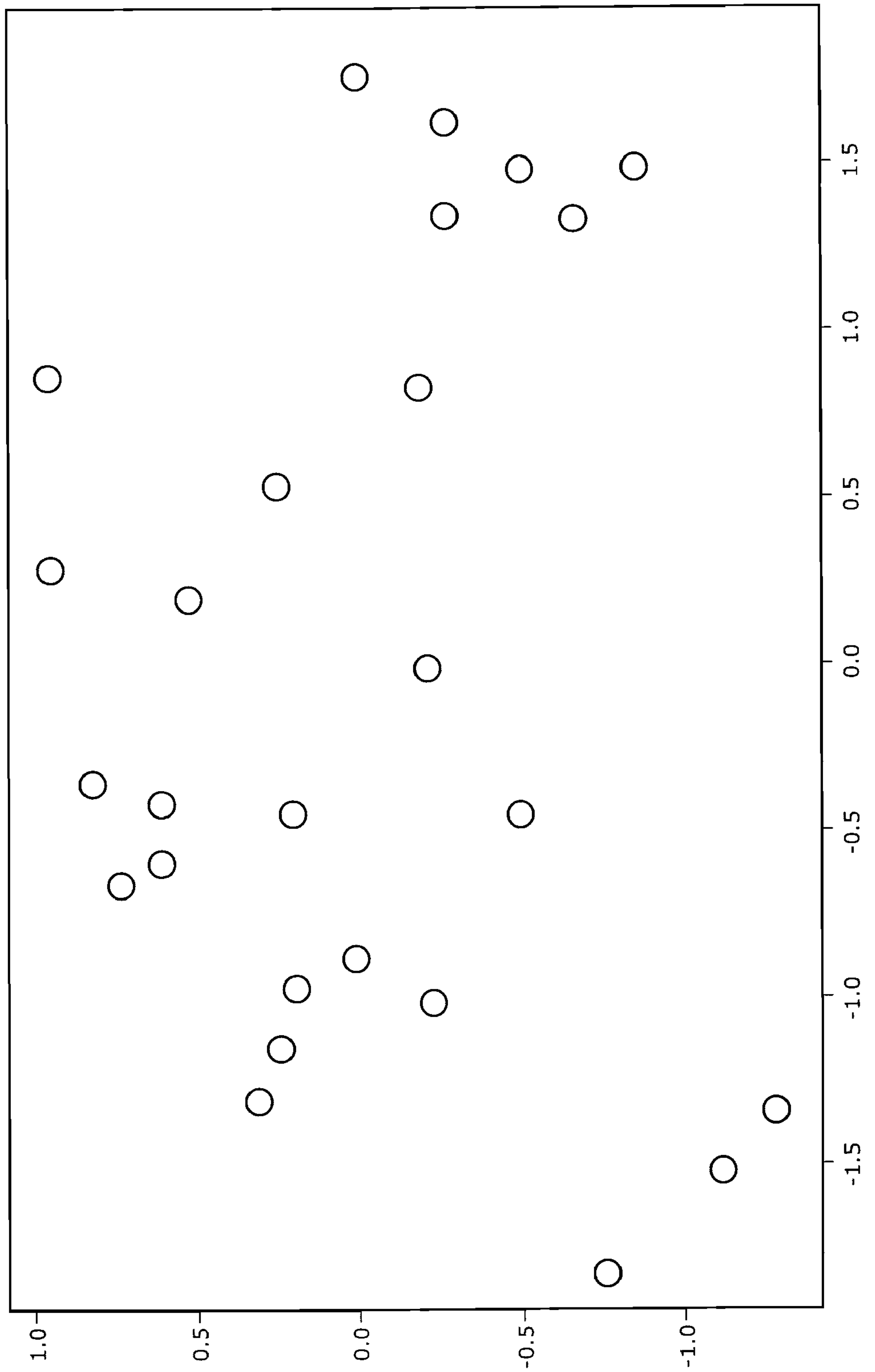
FIG. 13 is a diagram showing an example of coordinate positions of voice quality features calculated by a scaling unit.

FIG. 13 is a diagram showing an example of arranging the voice quality features held in the voice quality feature database 101 on a two-dimensional plane using the MDS.

For example, when the weight setting unit 103 sets a heavy weight for a voice quality parameter (namely, an acoustic feature) that is a fundamental frequency (F0), voice quality features having similar values of the fundamental frequency are arranged close to each other on the two-dimensional plane. On the other hand, voice quality features having significantly different values of the fundamental frequency are arranged far from each other on the two-dimensional plane. In the above-described arrangement of voice quality features, voice quality features having closer values of a voice quality parameter (acoustic feature) emphasized by the user are arranged close to each other on the voice quality space As a result, the user can expect a voice quality feature (voice quality) between the arranged voice quality features.

It should be noted that the coordinates of each voice quality feature can be calculated not only by the MDS, but also by analyzing and extracting principle components of each physical parameter held in the voice quality feature database 101 and structuring a space using a few principle components from among representative principle components having high contribution degrees.

Figure 14:
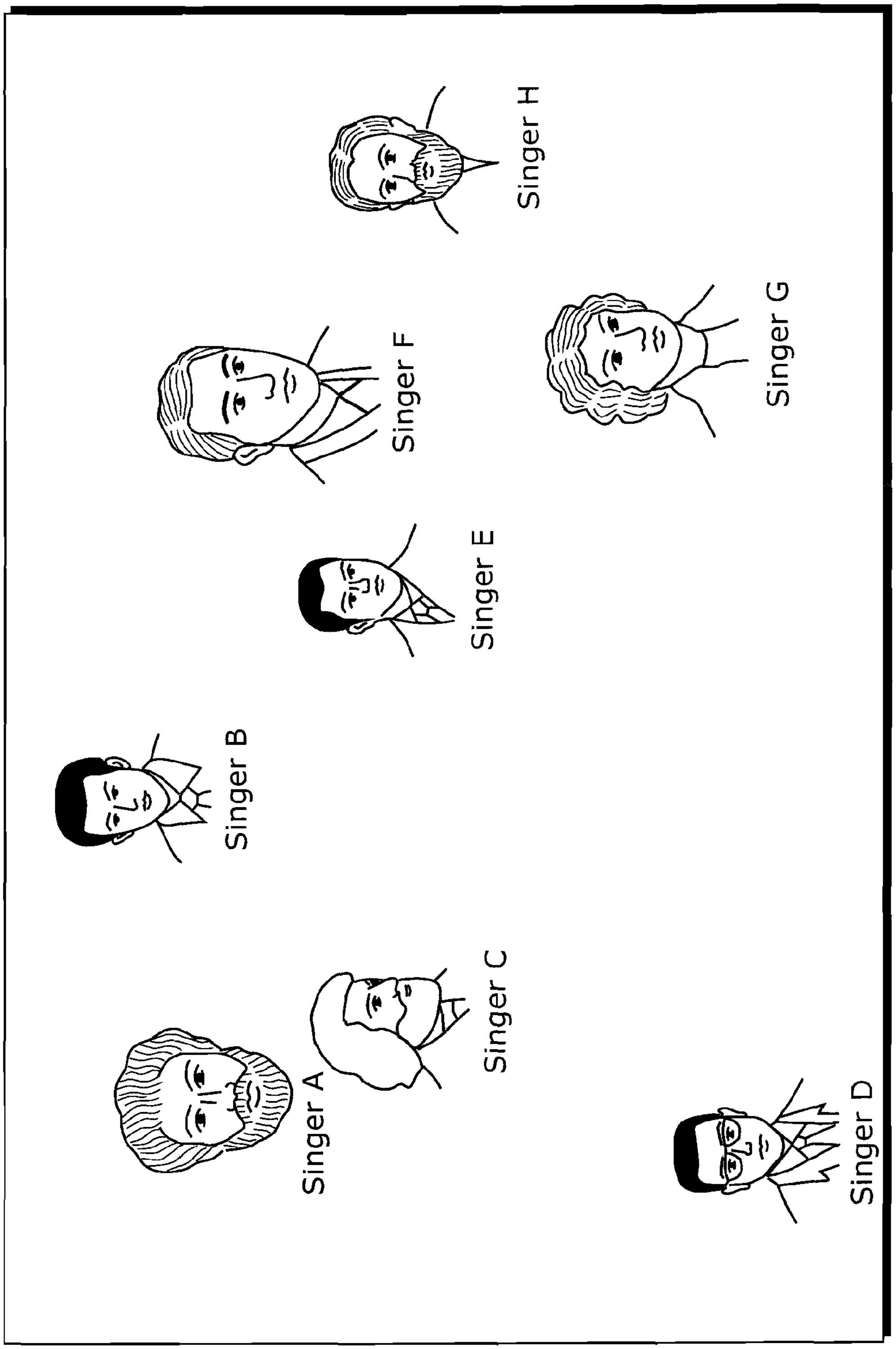
FIG. 14 is a diagram showing an example of speaker attributes displayed by a display unit.

Next, at respective positions represented by the coordinates calculated at Step S003, the display unit 107 displays speaker attributes held in the speaker attribute database 106 each of which is associated with a corresponding voice quality feature in the voice quality feature database 101 (Step S004). An example of the displayed voice quality space is shown in FIG. 14. In FIG. 14, a face image of a speaker having a voice quality is used as a speaker attribute of the voice quality, but any other speaker attribute can be used if it enables the user to expect the voice quality of the speaker. For example, a name of a speaker, an image of a character, a name of a character, or the like may be used as a speaker attribute.

The above-described display of speaker attribute information enables the user to intuitively expect the voice qualities of speakers and also intuitively understand the presented voice quality space, when seeing the displayed speaker attribute information.

It should be note that in FIG. 14 the display unit 107 displays all voice quality features on a single display region, but, of course, it is also possible to display only a part of the voice quality features, or to design to enlarge, reduce, or scroll the display of the voice quality space according to separate designation from the user.

Next, using the position input unit 108, the user designates on the voice quality space a coordinate position (namely, coordinates) of a voice quality feature which the user desires (Step S005). A method of the designation is not limited. For example, the user may designate, using a mouse, a point on the voice quality space displayed by the display unit 107, or inputs a value of the coordinates using a keyboard. Furthermore, the user may input a value of the coordinates using a pointing device except a mouse.

Next, the voice quality mix unit 110 generates a voice quality corresponding to the coordinates designated at Step S005 (Step S006). A method of the generation is described in detail with reference to FIG. 15.

Figure 15:
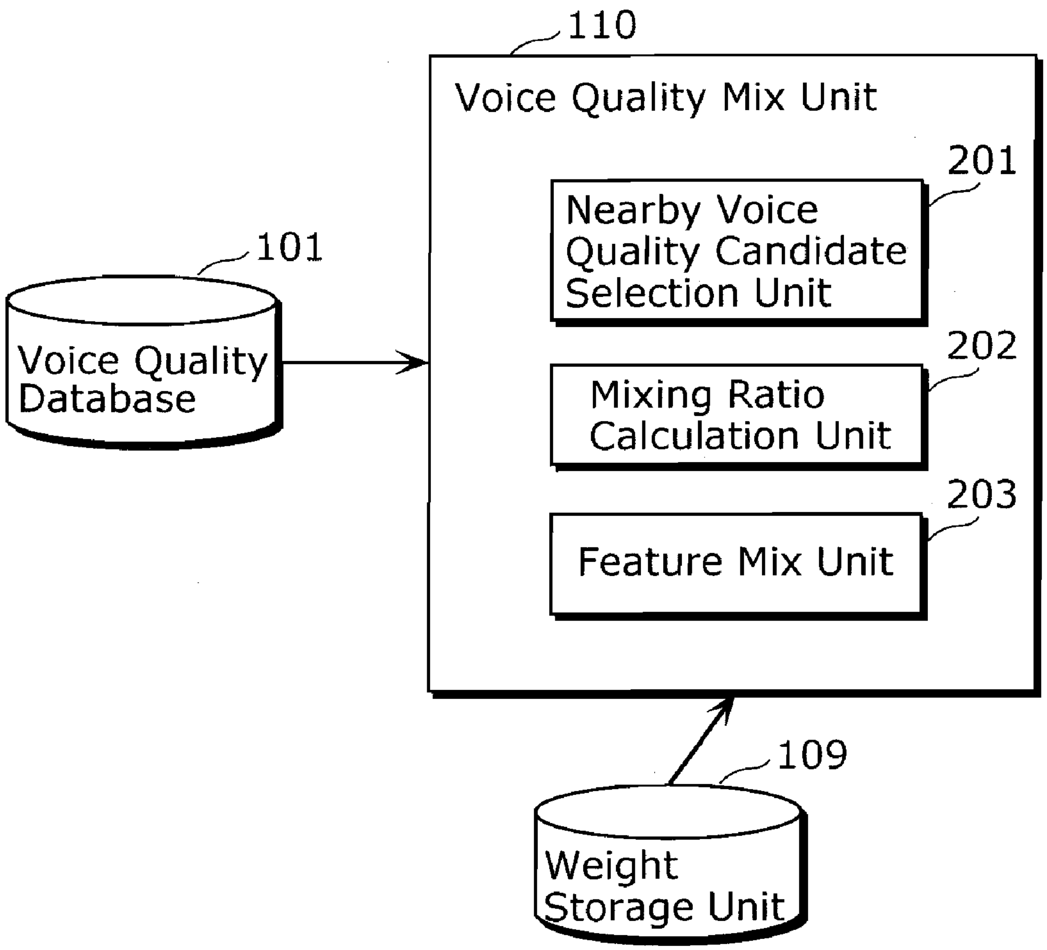
FIG. 15 is a block diagram showing a detailed structure of a voice quality mix unit.

FIG. 15 is a diagram showing a detailed structure of the voice quality mix unit 110. The voice quality mix unit 110 includes a nearby voice quality candidate selection unit 201, a mixing ratio calculation unit 202, and a feature mix unit 203.

Figure 16:
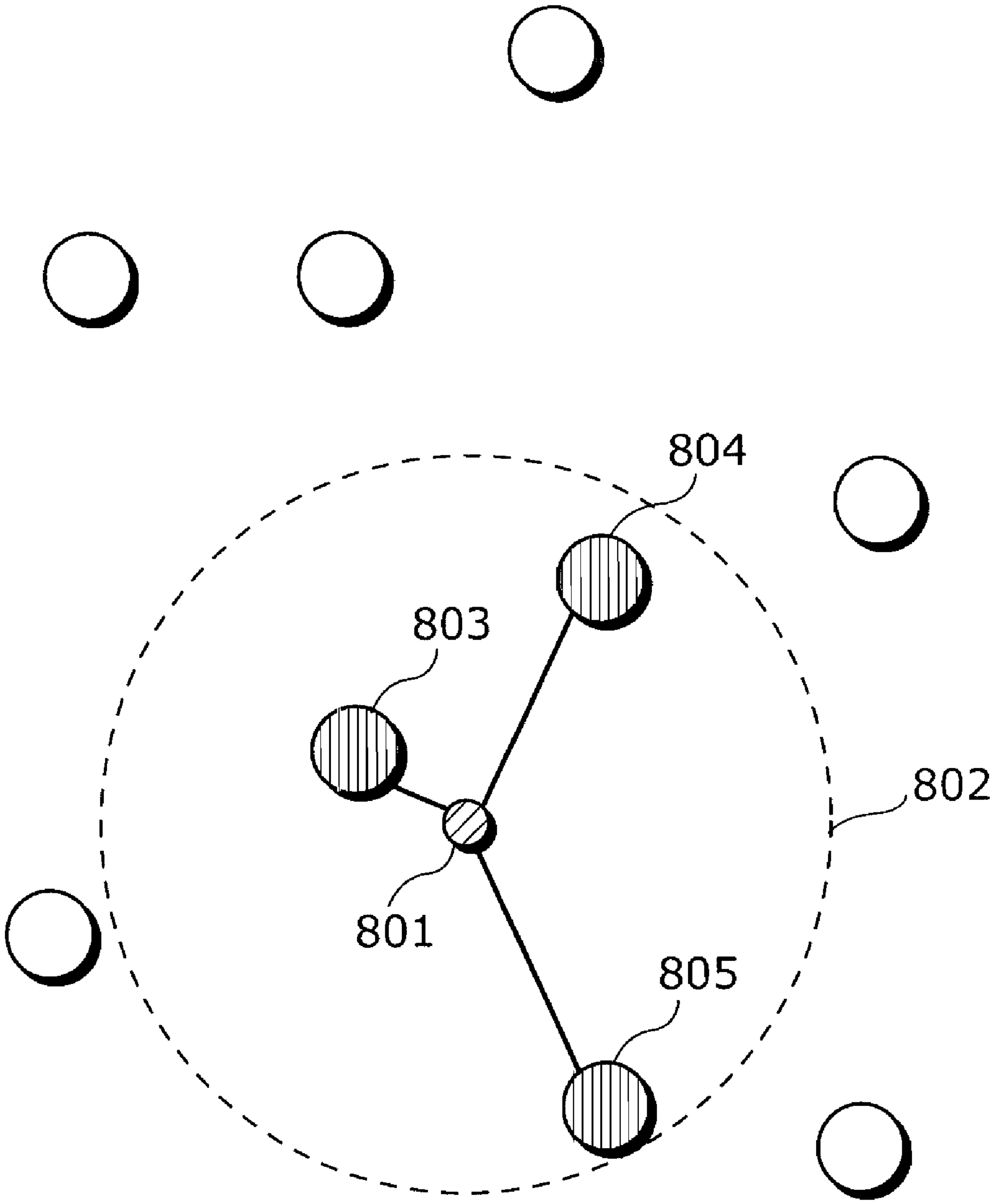
FIG. 16 is a schematic diagram showing voice quality features selected by a nearby voice quality selection unit.

The nearby voice quality candidate selection unit 201 selects voice quality features located close to the coordinates designated at Step S005 (hereinafter, such voice quality features are referred to also as "nearby voice quality features" or "nearby voice quality candidates"). The selecting processing is described in more detail. It is assumed that the voice quality space as shown in FIG. 16 is displayed at Step S004 and that a coordinate position 801 is designated at Step S005. The nearby voice quality candidate selection unit 201 selects voice quality features located within a predetermined distance from the coordinate position 801 on the voice quality space. For example, on the voice quality space shown in FIG. 16, selected are voice quality features 803, 804, and 805 that are located within a predetermined distance range 802 from the coordinate position 801.

Next, the mixing ratio calculation unit 202 calculates a ratio representing how the voice quality features selected by the nearby voice quality candidate selection unit 201 are to be mixed together to generate a desired voice quality feature (hereinafter, the ratio is referred to also as a "mixing ratio"). In the example of FIG. 16, the mixing ratio calculation unit 202 calculates a distance between (i) the coordinate position 801 designated by the user and (ii) each of the voice quality features 803, 804, and 805 selected by the nearby voice quality candidate selection unit 201. The mixing ratio calculation unit 202 sets a mixing ratio using inverse numbers of the calculated distances. In the example of FIG. 16, if a ratio of the distances between the coordinate position 801 and the voice quality features 803, 804, and 805 is, for example, "1:2:2", a mixing ratio is represented by "2:1:1".

Then, the feature mix unit 203 mixes respective acoustic features of the same kind, which are held in the voice quality feature database 101, regarding the voice quality features selected by the nearby voice quality candidate selection unit 201 together at the mixing ratio calculated by the mixing ratio calculation unit 202.

For example, by mixing reflection coefficients representing vocal tract shapes of the nearby voice quality features together at the above-described ratio, a vocal tract shape can be generated for a new voice quality feature. It is also possible to approximate an order of each reflection coefficient applying a corresponding function and mix such approximated functions of the nearby voice quality features together, so as to generate a new vocal tract shape. For example, a polynomial expression can be used as a function. In this case, the mixing of the functions can be achieved by calculating a weighted average of coefficients of the polynomial expressions.

Moreover, new sound source information can be generated by calculating, at the ratio as described above, a weighted average of fundamental frequencies (F0), a weighted average of voiced sound source amplitudes (AV), a weighted average of glottis open rates (OQ), and a weighted average of aperiodic component boundary frequencies (AF) of nearby voice quality features.

In the case of FIG. 16, the feature mix unit 203 mixes the voice quality features 803, 804, and 805 together at a ratio of "2:1:1".

The method of mixing is not limited. For example, the voice quality features can be mixed together by calculating a weighed average of parameters of the voice quality features held in the voice quality feature database 101 based on the mixing ratio.

It should be noted that the nearby voice quality candidate selection unit 201 may select all voice quality features on the voice quality space. In this case, the mixing ratio calculation unit 202 decides a mixing ratio considering all of the voice quality features.

By the above processing, the voice quality mix unit 110 can generate a voice quality feature (voice quality) corresponding to the coordinates designated at Step S005.

(First Weight Setting Method)

Next, the method performed by the weight setting unit 103 for setting a piece of weight information at Step S001 is described in more detail. In setting a piece of weight information, other processing units are also operated with the weight setting unit 103.

Figure 17:
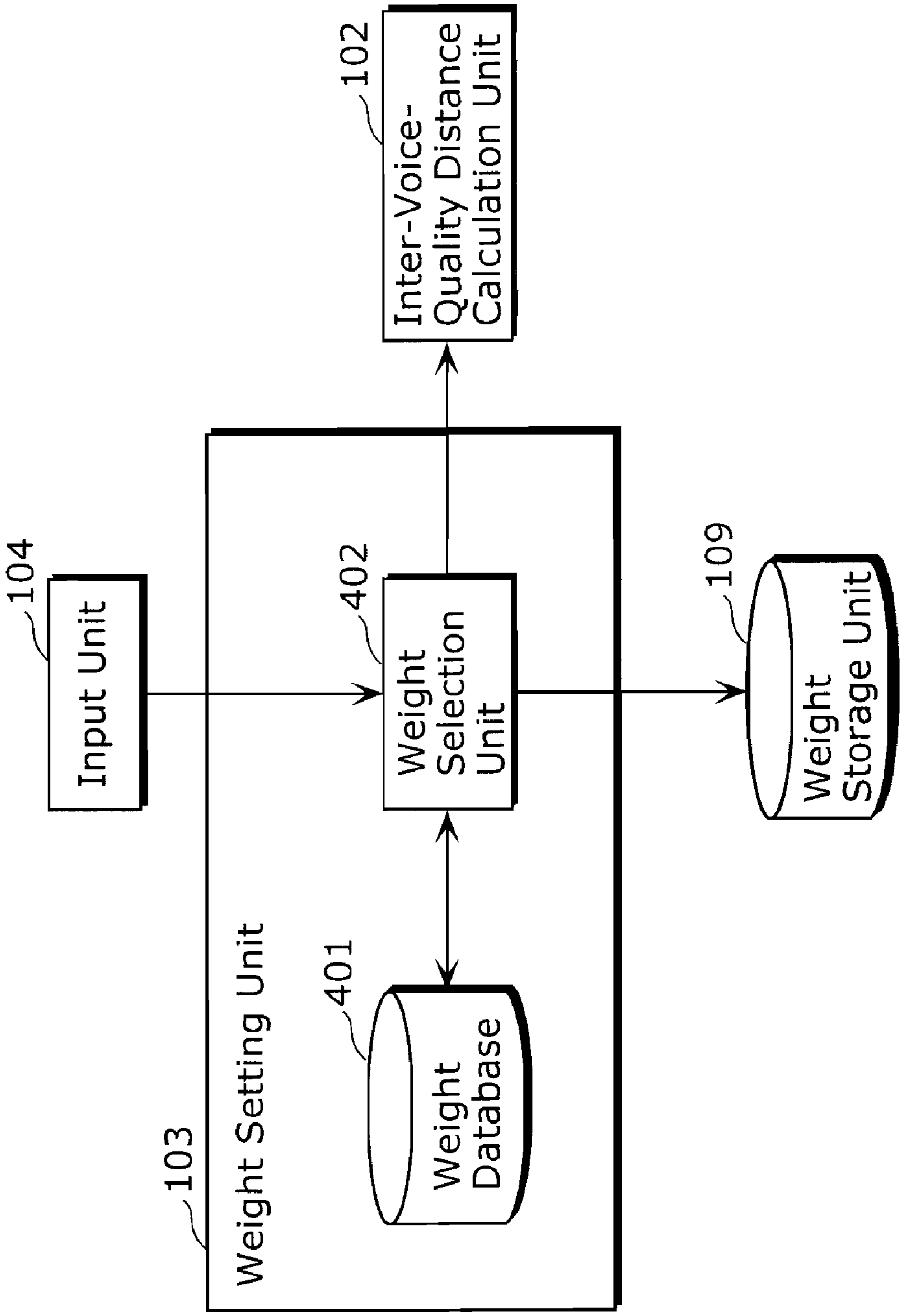
FIG. 17 is a block diagram showing a detailed structure of a weight setting unit.

FIG. 17 is a block diagram showing a detailed structure of the weight setting unit 103. The weight setting unit 103 includes a weight database 401 and a weight selection unit 402.

The weight database 401 is a storage device in which plural pieces of weight information previously designed by a system designer are held. The weight database 401 is implemented as a hard disk, a memory, or the like. The weight selection unit 402 is a processing unit that selects a piece of weight information from the weight database 401 based on designation from the input unit 104, and stores the selected piece of weight information to the weight storage unit 109. The processing performed by these units is described in more detail with reference to a flowchart of FIG. 18.

From the pieces of weight information held in the weight database 401, the weight selection unit 402 selects a piece of weight information designated using the input unit 104 by the user (Step S101).

The inter-voice-quality distance calculation unit 102 calculates distances among the voice quality features held in the voice quality feature database 101 using the piece of weight information selected at Step 101, thereby generating a distance matrix (Step S102).

The scaling unit 105 calculates coordinates of each of the voice quality features held in the voice quality feature database 101 on a voice quality space, using the distance matrix generated at Step S102 (Step S103).

The display unit 107 displays pieces of speaker attribute information which are held in the speaker attribute database 106 and associated with the respective voice quality features held in the voice quality feature database 101, on the coordinates of the respective voice quality features which are calculated at Step S103 on the voice quality space (Step S104)

The user confirms whether or not the voice quality space generated at Step S104 matches the sense of the user, seeing the arrangement of the voice quality features on the voice quality space (Step S105). In other words, the user judges whether or not voice quality features which the user senses similar to each other are arranged close to each other and voice quality features which the user senses different from each other are arranged far from each other. The user inputs the judgment result using the input unit 104.

If the user is not satisfied with the currently displayed voice quality space (No at Step S105), then the processing from Step S101 to Step 105 is repeated until a displayed voice quality space satisfies the user.

Figure 19:
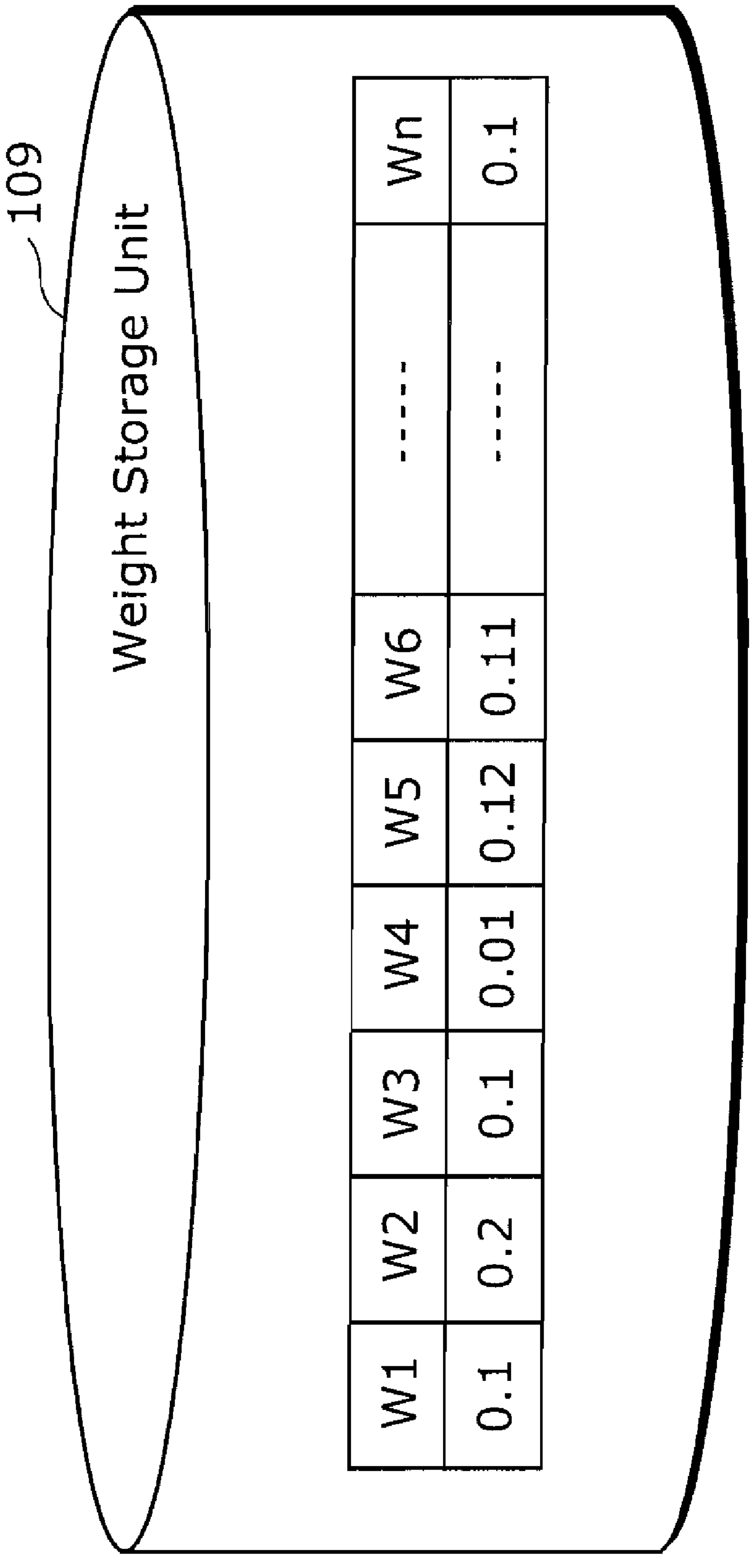
FIG. 19 is a diagram showing a data structure of a piece of weight information set by the weight setting unit.

On the other hand, if the user is satisfied with the currently displayed voice quality space (Yes at Step S105), then the weight selection unit 402 registers the piece of weight information selected at Step S101 to the weight storage unit 109 and the weight setting processing is completed (Step S106). FIG. 19 shows an example of a piece of weight information consisting of weighting parameters stored in the weight storage unit 109. In FIG. 19, each of w1, w2, . . . , wn represents a weighting parameter assigned to a corresponding acoustic feature (for example, a reflection coefficient as vocal tract information, a fundamental frequency, or the like) included in a piece of voice quality feature information stored in the voice quality feature database 101.

By repeating the processing from Step S101 to Step 105 until a displayed voice quality space satisfies the user as described above, it is possible to set a piece of weight information according to the sense of the user regarding voice quality. In addition, by generating a voice quality space based on the piece of weight information set in the above manner, it is possible to structure a voice quality space matching the sense of the user.

Figure 20:
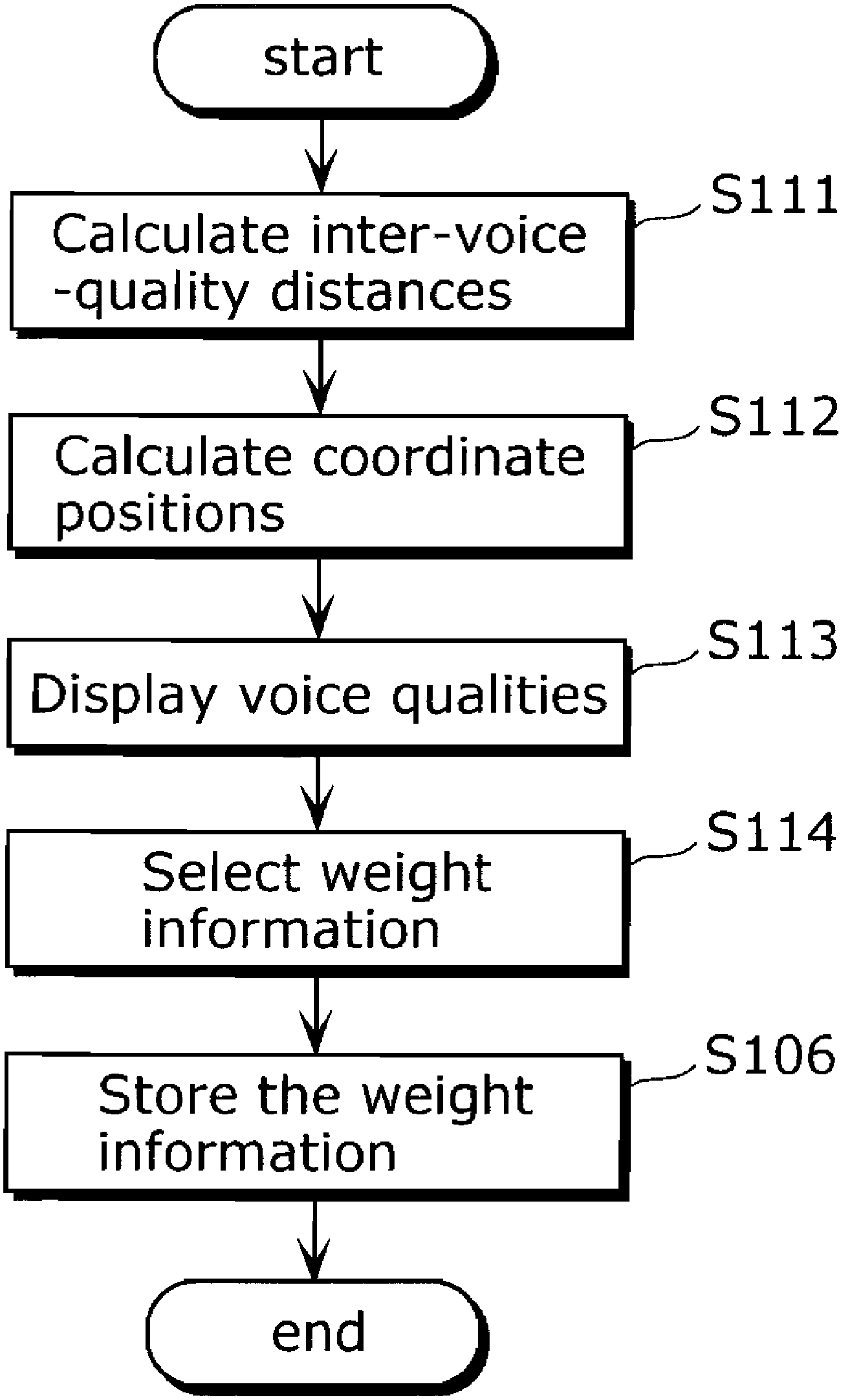
FIG. 20 is a flowchart of another weight setting method.

It should be noted that in the above-described weight setting method a voice quality space is displayed based on the selected piece of weight information after the user selects the piece of weight information, but it is also possible to firstly display plural voice quality spaces based on plural pieces of weight information registered in the weight database 401 and then allow the user to select one of the voice quality spaces matching the sense of the user most. FIG. 20 is a flowchart of such a weight setting method.

The inter-voice-quality distance calculation unit 102 calculates plural sets of inter-voice-quality distances among the voice quality features held in the voice quality feature database 101 using plural pieces of weight information held in the weight database 401, thereby generating a plurality of distance matrixes (Step S111).

Using each of the plurality of distance matrixes generated at Step S111, the scaling unit 105 calculates a set of coordinates of each of the voice quality features held in the voice quality feature database 101 on a corresponding voice quality space (Step S112).

Figure 21:
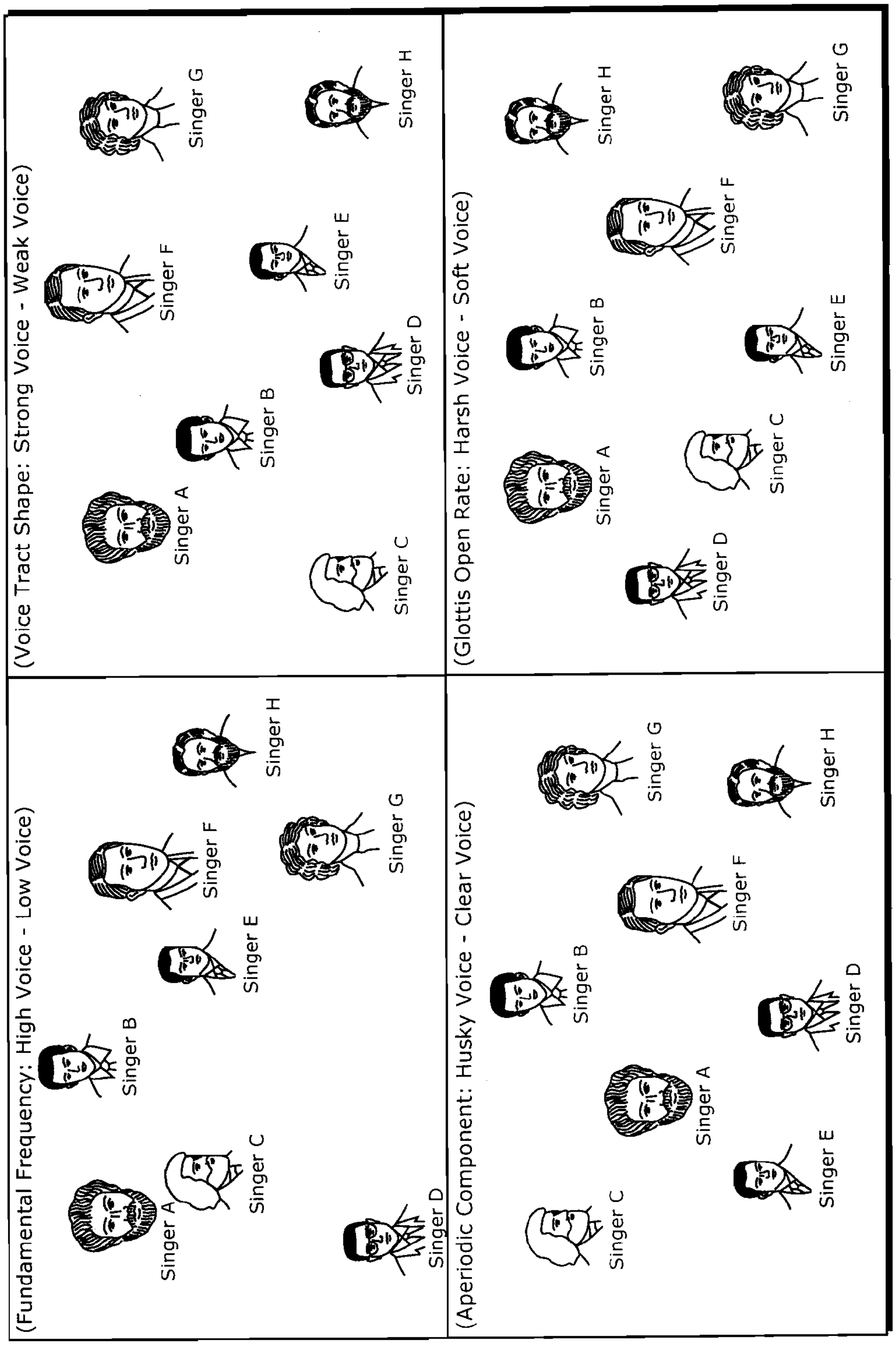
FIG. 21 is a diagram showing an example of a plurality of voice quality spaces displayed by the display unit.

On each of the voice quality spaces, the display unit 107 displays pieces of speaker attribute information held in the speaker attribute database 106 in association with the respective voice quality features held in the voice quality feature database 101 at the respective coordinates calculated at Step S112 (Step S113). FIG. 21 is a diagram showing an example of the display at Step S113. In FIG. 21, plural sets of pieces of speaker attribute information are displayed based on respective four pieces of weight information. The four pieces of weight information are: a piece of weight information in which a fundamental frequency (namely, an acoustic feature indicating whether a corresponding voice quality is a high voice or a low voice) is weighted heavily; a piece of weight information in which a vocal tract shape (namely, an acoustic feature indicating whether a corresponding voice quality is a strong voice or a weak voice) is weighted heavily; a piece of weight information in which aperiodic components (namely, an acoustic feature indicating whether a corresponding voice quality is a husky voice or a clear voice) are weighted heavily; and a piece of weight information in which a glottis open rate (namely, an acoustic feature indicating whether a corresponding voice quality is a harsh voice or a soft voice) is weighted heavily. In other words, FIG. 21 shows four voice quality spaces each of which is associated with a corresponding one of the four pieces of weight information and displays pieces of speaker attribute information.

The user selects one of the voice quality spaces which matches the sense of the user most, seeing the respective arrangements of the voice quality features held in the voice quality feature database 101 on the four voice quality spaces displayed at Step 113 (Step S114). From the weight database 401, the weight selection unit 402 selects a piece of the weight information associated with the selected voice quality space. The weight selection unit 402 stores the selected piece of weight information to the weight storage unit 109 (Step S106).

It should be noted that the weight storage unit 109 may stores such a selected piece of weight information for each user. By storing a piece of weight information for each user, it is possible that when a user edits voice quality the piece of weight information associated with the user is obtained from the weight storage unit 109, and the obtained piece of weight information is used by the inter-voice-quality distance calculation unit 102 and the voice quality mix unit 110 in order to present the user with a voice quality space matching to sense of the user.

The above-described first weight setting method enables a user to selectively decide a piece of weight information from predetermined candidates, so that the user can set an appropriate piece of weight information even if the user does not have special knowledge. In addition, the first weight setting method can reduce a load on the user to decide the piece of weight information.

(Second Weight Setting Method)

Next, another weight setting method is described.

Figure 22:
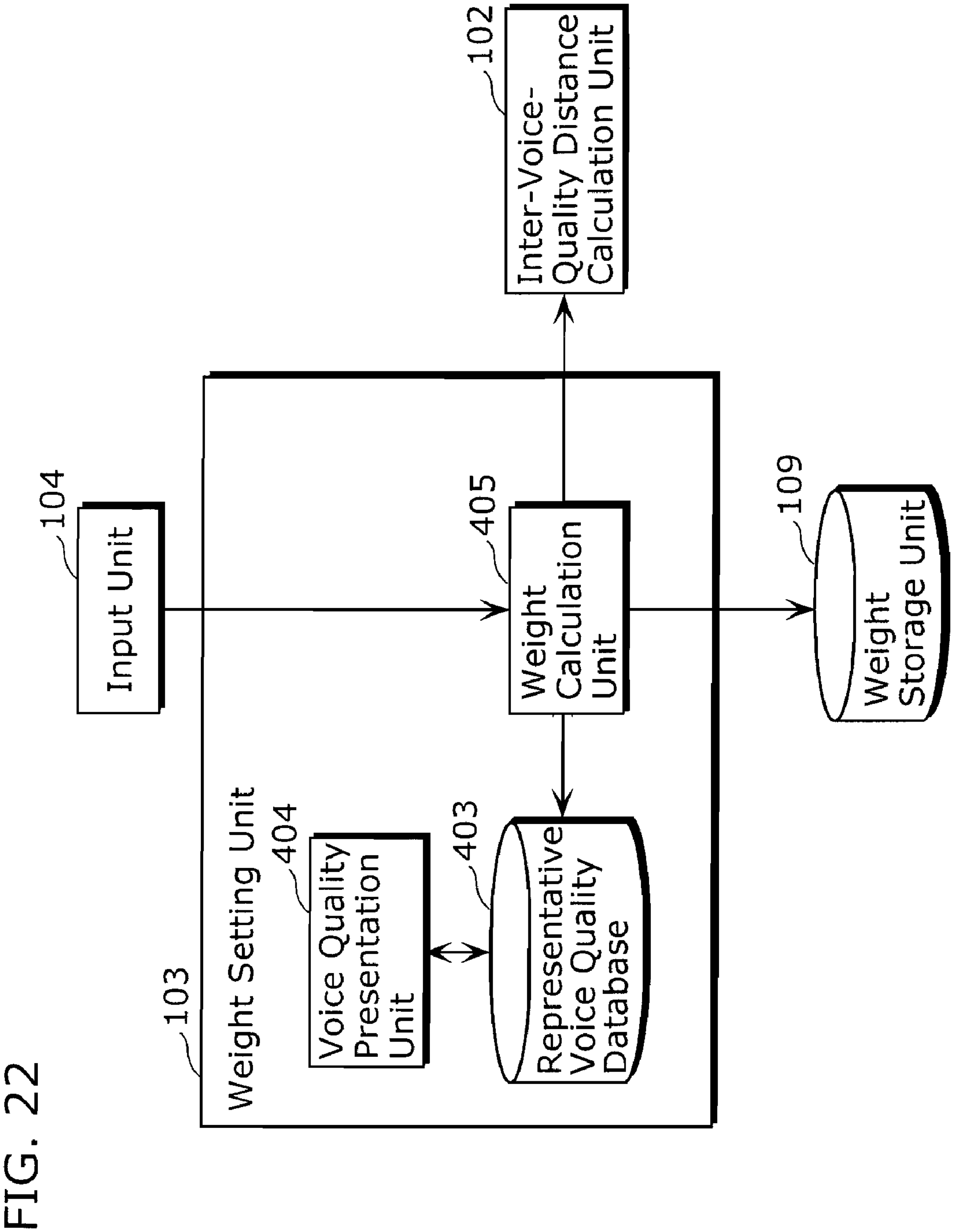
FIG. 22 is a block diagram showing another detailed structure of the weight setting unit.

The weight setting unit 103 may set a piece of weight information using the following method. FIG. 22 is a block diagram of another structure implementing the weight setting unit 103. The weight setting unit 103 performing the second weight setting method includes a representative voice quality database 403, a voice quality presentation unit 404, and a weight calculation unit 405.

The representative voice quality database 403 is a database holding representative voice quality features which are previously extracted from the voice quality features held in the voice quality features database 101. Here, it is not necessary to further provide a new storage unit for storing the representative voice quality features, but the voice quality feature database 101 may also hold identifiers of the representative voice quality features. The voice quality presentation unit 404 presents a user with the voice quality features held in the representative voice quality database 403. A method of the presentation is not limited. It is possible to reproduce speeches used to generate the information in the voice quality feature database 101. It is also possible to select speaker attributes of the representative voice quality features held in the representative voice quality database 403 from the speaker attribute database 106, and present the selected speaker attributes using the display unit 107.

The input unit 104 receives designation of a pair of voice quality features which are judged by the user from among the representative voice quality features presented by the voice quality presentation unit 404 to be voice quality features which are similar to each other. A method of the designation is not limited. For example, if the input unit 104 is a mouse, the user can use the mouse to designate two voice quality features which the user senses similar to each other, and thereby the input unit 104 receives the designation of the pair of voice quality features. The input unit 104 is not limited to a mouse but may be another pointing device.

The weight calculation unit 405 calculates a piece of weight information based on the pair of voice quality features judged by the user to be similar to each other and designated by the input unit 104.

Figure 23:
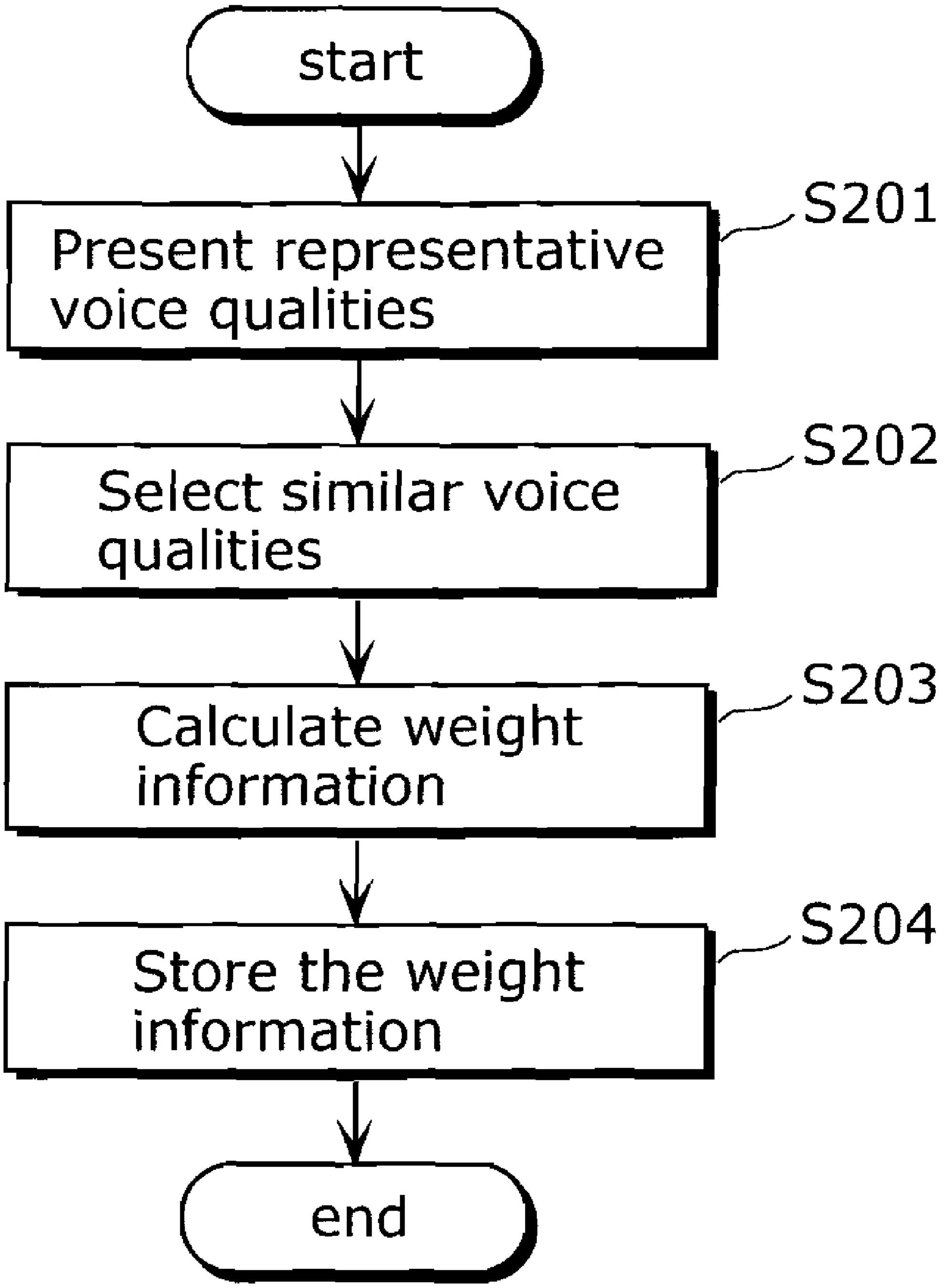
FIG. 23 is a flowchart of still another weight setting method.

Next, processing of the second weight setting method is described with reference to a flowchart of FIG. 23.

Figure 24:
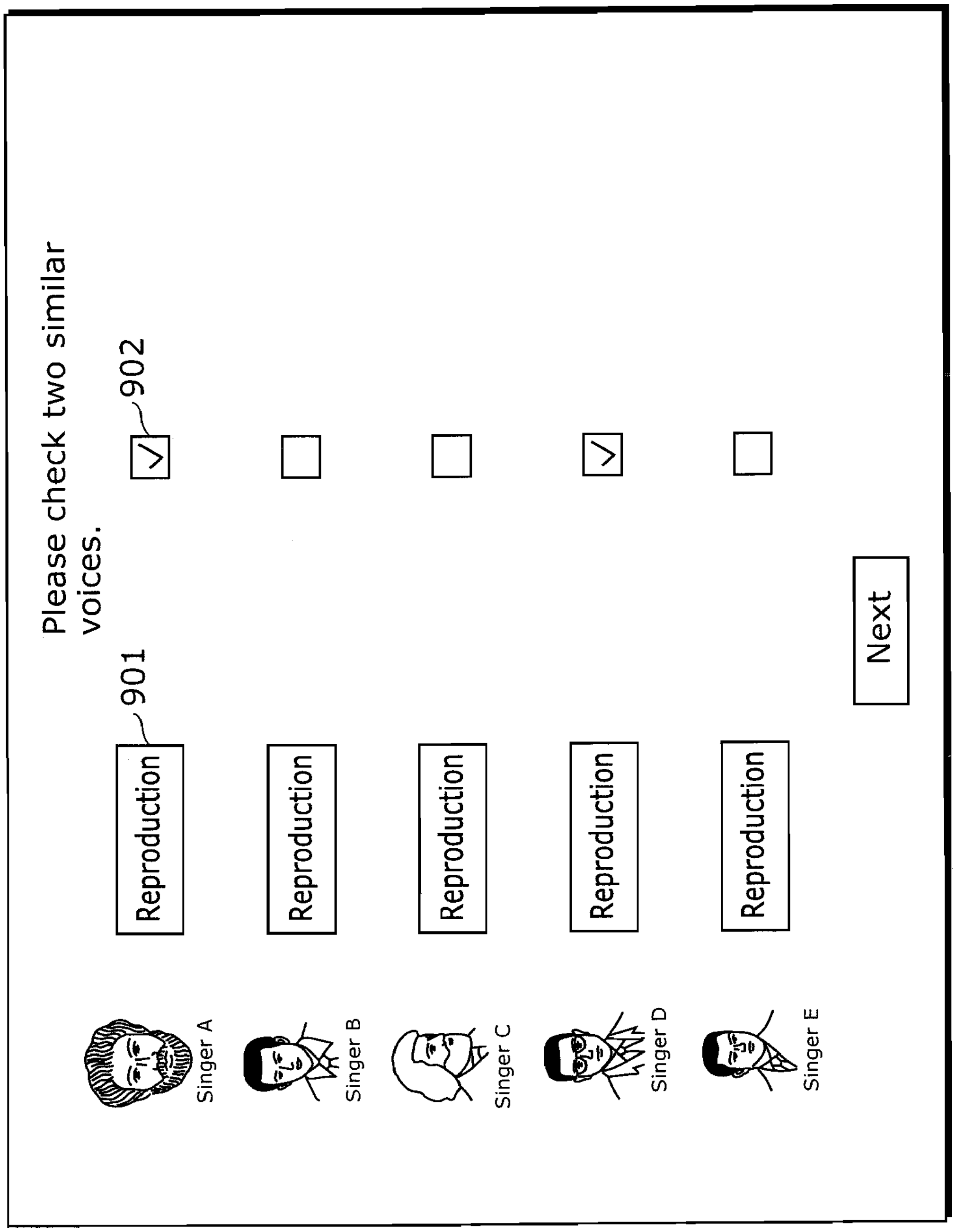
FIG. 24 is a diagram for explaining presentation of voice quality features by the voice quality presentation unit.

The voice quality presentation unit 404 presents a user with representative voice quality features registered in the representative voice quality database 403 (Step S201). For example, the voice quality presentation unit 404 may display a screen as shown in FIG. 24 on the display unit 107. On the screen shown in FIG. 24, five speaker attributes (face images) are displayed together with five play buttons 901 each positioned next to a corresponding speaker attribute. Using the input unit 104, the user presses the play buttons 901 corresponding to speakers whose voices the user desires to play. The voice quality presentation unit 404 plays (reproduces) the voices of the speakers for which the corresponding play buttons 901 are pressed.

Next, using the input unit 104, the user designates a pair of voice quality features which the user senses similar to each other (Step S202). In the example of FIG. 24, the user designates two similar voice quality features by checking check boxes 902.

Next, the weight calculation unit 405 sets a piece of weight information based on the designation of the pair made at Step S202 (Step S203). More specifically, for each voice quality i held in the voice quality feature database 101, a weight $w_i$ in the piece of weight information is set to minimize an inter-voice-quality distance between the designated pair calculated using the above Equation 2 under the restriction of the above Equation 3.

An example of the above second weight setting method is described below in more detail. In the second weight setting method, further restriction expressed in the following Equation 4 is added to minimize the Equation 2.

[Formula 4]

$$w_i > \Delta w \quad \text{(Equation 4)}$$

More specifically, an element $I_{min}$ is determined using the following Equation 5 to minimize a square of a difference between the pair in each order.

[Formula 5]

$$l_{min} = \underset{l}{\operatorname{argmin}}(v_{il} - v_{jl})^2 \quad \text{(Equation 5)}$$

Then, $w_i$ is decided for each voice quality i held in the voice quality feature database 101 using the following Equation 6.

[Formula 6]

$$w_i = \begin{cases} 1 - n \times \Delta w & ; i = l_{min} \\ \Delta w & ; \text{otherelse} \end{cases} \quad \text{(Equation 6)}$$

The weight calculation unit 405 stores the piece of weigh information having the weight $w_i$ set at Step S203 to the weight storage unit 109 (Step S204).

The method of setting a piece of weight information is not limited to the above. For example, it is possible to decide not only one element but a plurality of elements in order to minimize a square of a difference between the pair in each order using the Equation 5.

Moreover, the second weight setting method may be any methods if a piece of weight information can be set to shorten an inter-voice-quality distance between the selected two voice quality features.

If a plurality of such pairs are designated, a piece of weight information is set to minimize a sum of respective inter-voice-quality distances.

By the above-described weight setting method, a piece of weight information can be set according to the sense of the user regarding voice quality. In addition, by generating a voice quality space based on a piece of weight information set in the above manner, it is possible to structure a voice quality space matching the sense of the user.

The above-described second weight setting method can set a piece of weight information to match the sense of the user regarding voice quality more finely than the first weight setting method. In other words, since the user selects not one of predetermined pieces of weight information but voice quality features which the user senses similar to each other, acoustic features having similar values between the selected voice quality features are weighted heavier. Thereby, it is possible to determine, in the voice quality feature information, an acoustic feature which is important to allow the user to sense that voice quality features are similar to each other if they have similar values of the acoustic feature.

(Third Weight Setting Method)

Next, still another weight setting method is described.

Figure 25:
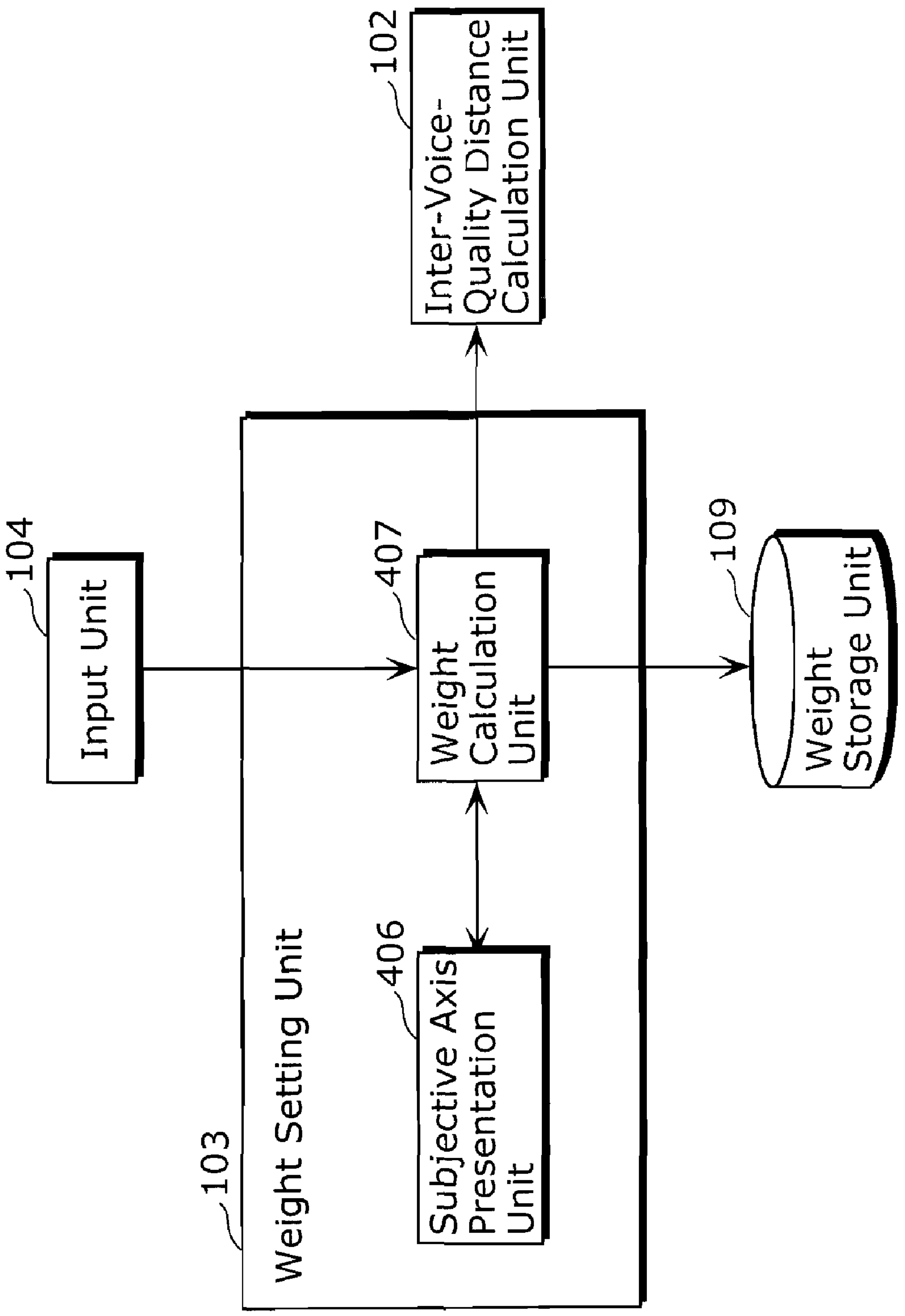
FIG. 25 is a block diagram showing still another detailed structure of the weight setting unit.

The weight setting unit 103 may set a piece of weight information using the following method. FIG. 25 is a block diagram of still another structure implementing the weight setting unit 103. The weight setting unit 103 performing the third weight setting method includes a subjective axis presentation unit 406 and a weight calculation unit 407.

Figure 26:
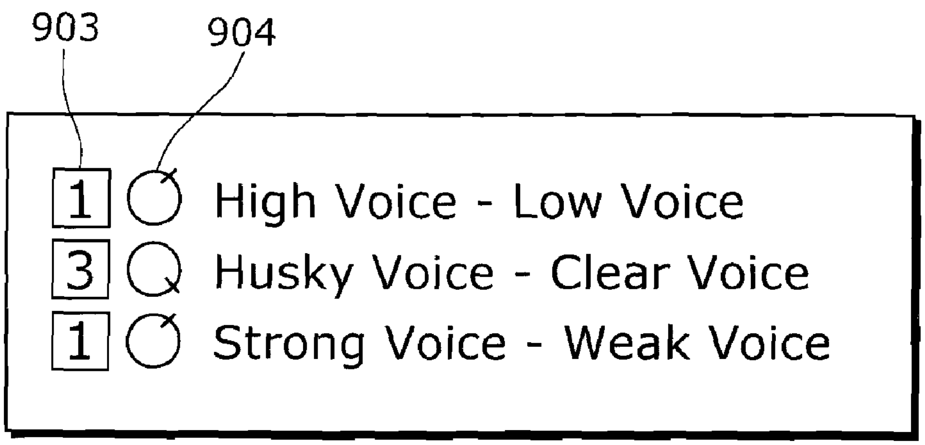
FIG. 26 is a diagram showing an example of subjective axes presented by a subjective axis presentation unit.

The subjective axis presentation unit 406 presents a user with subjective axes each indicating a subjective scale such as "high voice-low voice", as shown in FIG. 26. The input unit 104 receives designation of an importance degree of each of time axes presented by the subjective axis presentation unit 406. In the example of FIG. 26, the user inputs numeral values in entry fields 903 or operates dials 904 in order to input "1" as an importance degree of a subjective axis of "high voice-low voice", "3" as an importance degree of a subjective axis of "husky voice-clear voice", and "1" as an importance degree of a subjective axis of "strong voice-weak voice", for example. In the above example, the user assigns importance to the subjective axis of "husky voice-clear voice". The weight calculation unit 407 sets a piece of weight information, based on the importance degrees of the subjective axes received by the input unit 104.

Figure 27:
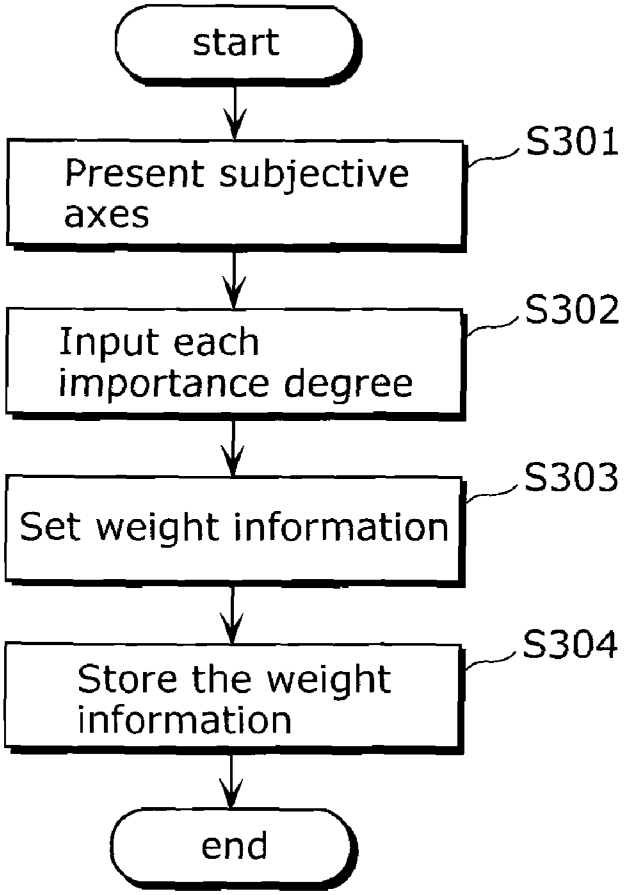
FIG. 27 is a flowchart of still another weight setting method.

Next, the third weight setting processing is described with reference to a flowchart of FIG. 27.

The subjective axis presentation unit 406 presents a user with subjective axes which the voice quality edit device can deal with (Step S301). A method of the presentation is not limited. For example, the subjective axes can be presented by presenting names of the respective subjective axes together with the entry fields 903 or the dials 904 by which importance degrees of the respective subjective axes can be inputted, as shown in FIG. 26. The method of the presentation is not limited to the above and may use icons expressing the respective subjective axes.

The user designates an importance degree of each of the subjective axes presented at Step S301 (Step S302). A method of the designation is not limited. It is possible to input numeral values in the entry fields 903 or turn the dials 904. It is also possible that the dials 904 are replaced by sliders each of which is adjusted to input an importance degree.

Based on the importance degrees designated for the subjective axes at Step S302, the weight calculation unit 407 calculates a piece of weight information to be used by the inter-voice-quality distance calculation unit 102 to calculate inter-voice-quality distances (Step S303).

In more detail, a subjective axis presented by the subjective axis presentation unit 406 is associated with a physical parameter (namely, an acoustic feature) stored in the voice quality feature database 101, and a piece of weight information is set so that an importance degree of each subjective axis is associated with an importance degree of a corresponding physical parameter (acoustic feature).

For example, the subjective axis "high voice-low voce" is associated with a "fundamental frequency" in voice quality feature information held in the voice quality feature database 101. Therefore, if the user designates the subjective axis "high voice-low voce" to be important, then in the voice quality feature information an importance degree of the physical parameter "fundamental frequency" is increased.

If the subjective axis "husky voice-clear voce" is designated to be important, then in the voice quality feature information an importance degree of the physical parameter "aperiodical components (AF)" is increased. Likewise, if the subjective axis "strong voice-weak voce" is designated to be important, then in the voice quality feature information an importance degree of the physical parameter "vocal tract shape (k)" is increased.

A piece of weight information is set based on a ratio of the importance degrees of the respective subjective axes under the conditions where a sum of weights expressed in the Equation 3 is 1.

The above-described third weight setting method can set a piece of weight information based on subjective axes. Therefore, a piece of weight information can be set easier than the second weight setting method. That is, when the user can understand the respective subjective axes, the user can set weights in a piece of weight information only by deciding an important subjective axis without listening to representative voice quality features one by one It should be noted that the first to third weight setting methods may be selectively switched to be used, depending on knowledge of the user regarding phonetics or a time period available for the weight setting. For example, if the user does not have knowledge of phonetics, the first weight setting method may be used. If the user has the knowledge but desires to set a piece of weight information quickly, the third setting method may be used. If the user has the knowledge and desires to set a piece of weight information finely, the second setting method can be used. The method of selecting the weight setting method is not limited to the above.

By the above-described methods, the user can set a piece of weight information to be used to generate a voice quality space matching the sense of the user. It should be noted that the weight setting method is not limited to the above but may be any methods if information of the sense of the user is inputted to adjust a piece of weight information.

The following describes a method of converting a voice quality to another voice quality having a piece of the voice quality feature information generated by the voice quality edit device according to the present invention.

Figure 28:
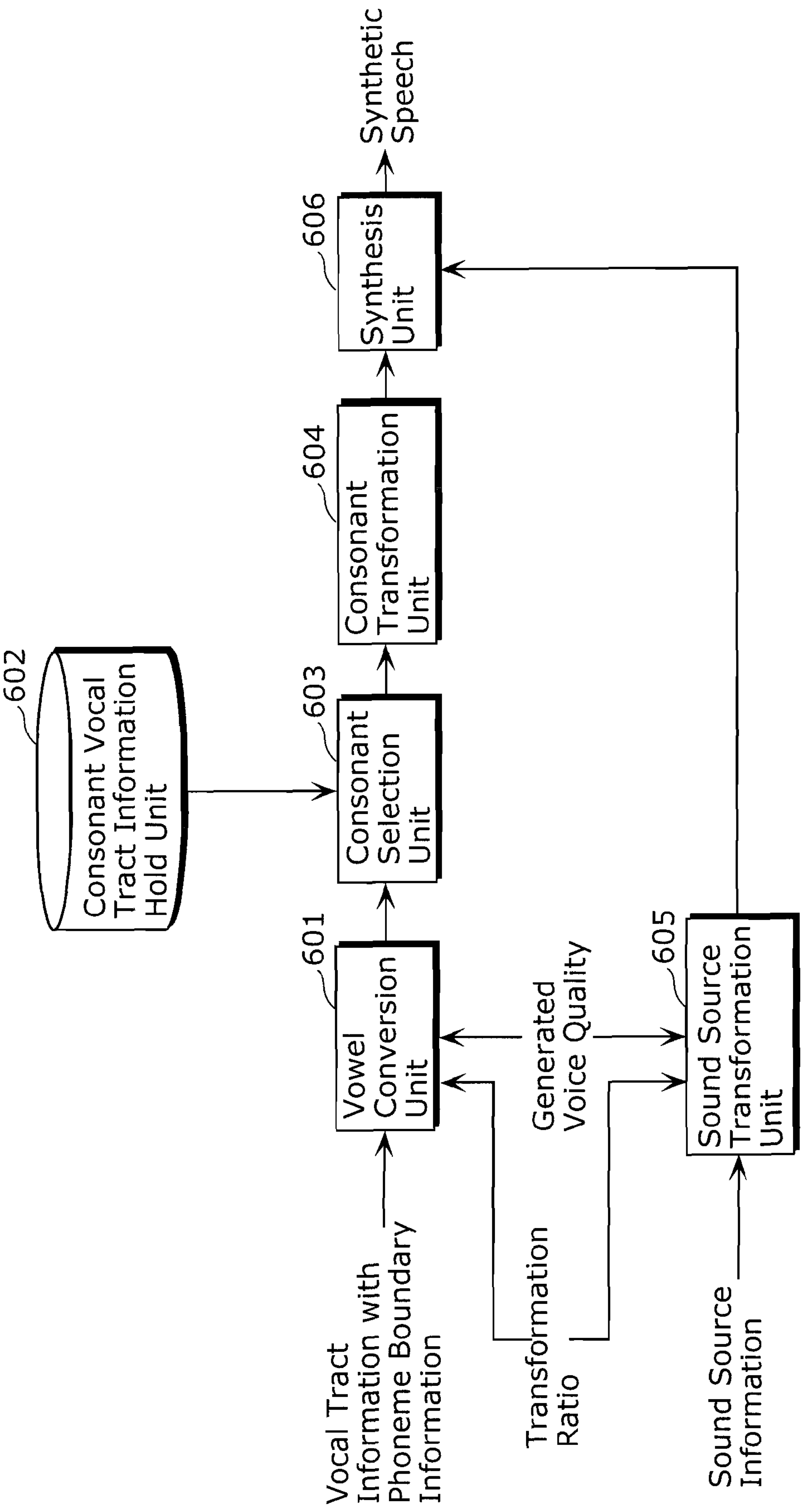
FIG. 28 is a block diagram showing a structure of a voice quality conversion device that performs voice quality conversion using voice quality features generated by the voice quality edit device.
Figure 29B:
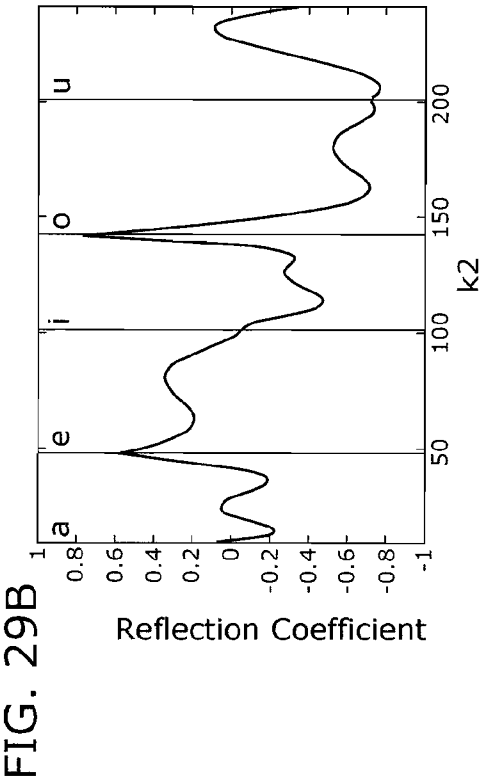
FIG. 29B is a graph showing an example of vocal tract shapes of vowels applied with polynomial approximation.
Figure 29D:
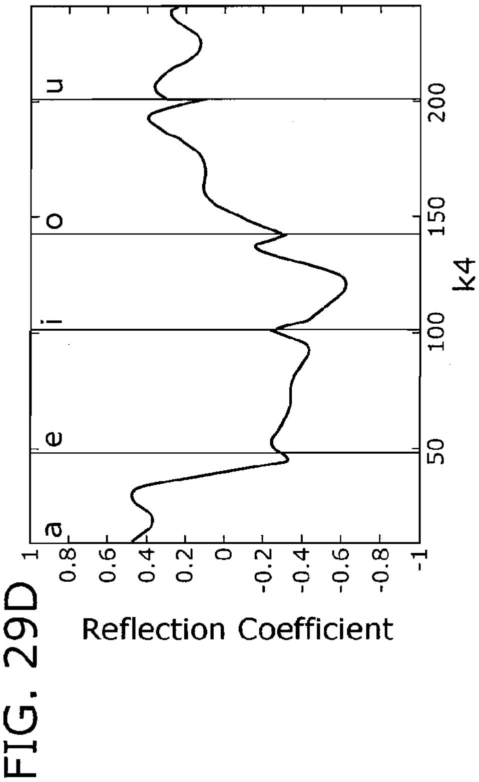
FIG. 29D is a graph showing an example of vocal tract shapes of vowels applied with polynomial approximation.
Figure 29A:
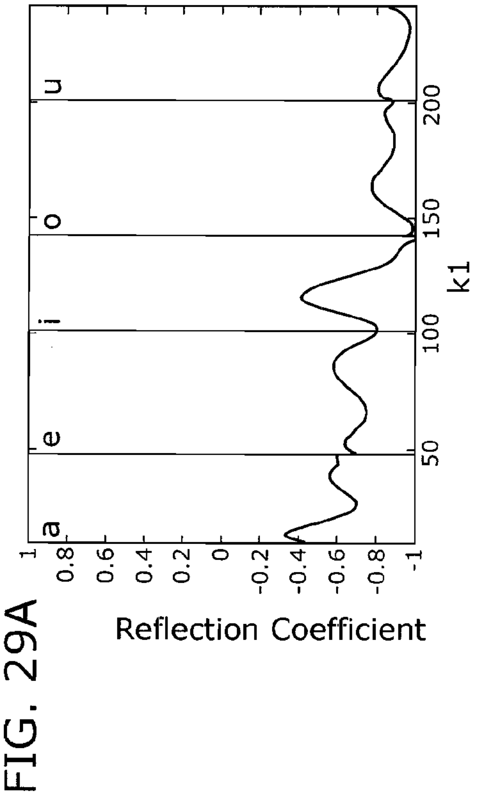
FIG. 29A is a graph showing an example of vocal tract shapes of vowels applied with polynomial approximation.
Figure 29C:
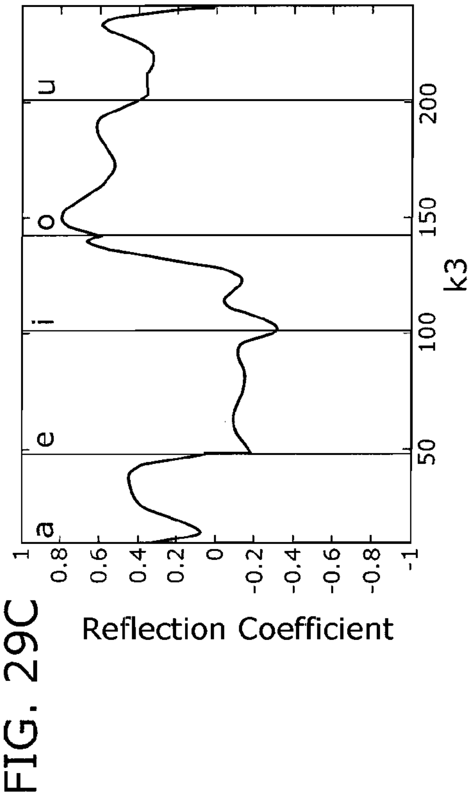
FIG. 29C is a graph showing an example of vocal tract shapes of vowels applied with polynomial approximation.

FIG. 28 is a block diagram showing a structure of a voice quality conversion device that performs voice quality conversion using the voice quality feature information generated by the voice quality edit device according to the present invention. The voice quality conversion device can be implemented in a common computer.

The voice quality conversion device includes a vowel conversion unit 601, a consonant vocal tract information hold unit 602, a consonant selection unit 603, a consonant transformation unit 604, a sound source transformation unit 605, and a synthesis unit 606.

The vowel conversion unit 601 is a processing unit that receives (i) vocal tract information with phoneme boundary information regarding an input speech and (ii) the voice quality feature information generated by the voice quality edit device of the present invention, and based on the voice quality feature information, converts pieces of vocal tract information of vowels included in the received vocal tract information with phoneme boundary information. Here, the vocal tract information with phoneme boundary information is vocal tract information regarding an input speech added with a phoneme label. The phoneme label includes (i) information regarding each phoneme in the input speech (hereinafter, referred to as "phoneme information") and (ii) information of a duration of the phoneme.

The consonant vocal tract information hold unit 602 is a storage device that previously holds pieces of vocal tract information of consonants uttered by speakers who are not a speaker of an input speech. The consonant vocal tract information hold unit 602 is implemented as a hard disk, a memory, or the like.

The consonant selection unit 603 is a processing unit that selects, from the consonant vocal tract information hold unit 602, a piece of vocal tract information of a consonant suitable for pieces of vocal tract information of vowel sections prior and subsequent to the consonant, for the vocal tract information with phoneme boundary information in which pieces of vocal tract information of vowel sections have been converted by the vowel conversion unit 601.

The consonant transformation unit 604 is a processing unit that transforms the vocal tract information of the consonant selected by the consonant selection unit 603 in order to reduce a connection distortion between the vocal tract information of the consonant and the vocal tract information of each of the vowels prior and subsequent to the consonant.

The sound source transformation unit 605 is a processing unit that transforms sound source information of an input speech, using sound source information in the voice quality feature information generated by the voice quality edit device according to the present invention.

The synthesis unit 606 is a processing unit that synthesizes a speech using (i) the vocal tract information transformed by the consonant transformation unit 604 and (ii) the sound source information transformed by the sound source transformation unit 605.

The vowel conversion unit 601, the consonant vocal tract information hold unit 602, the consonant selection unit 603, the consonant transformation unit 604, the sound source transformation unit 605, and the synthesis unit 606 are implemented by executing a program by a CPU in a computer.

The above structure can convert a voice quality of an input speech to another voice quality using the voice quality feature information generated by the voice quality edit device according to the present invention.

The vowel conversion unit 601 converts received vocal tract information of a vowel section in the vocal tract information with phoneme boundary information to another vocal tract information, by mixing (i) a piece of vocal tract information for a vowel section in the received vocal tract information with phoneme boundary information and (ii) a piece of vocal tract information for the vowel section in the voice quality feature information generated by the voice quality edit device of the present invention together at an input transformation ratio. The details of the conversion method are explained below.

Firstly, the vocal tract information with phoneme boundary information is generated by generating, from an original speech, pieces of vocal tract information represented by PARCOR coefficients that have been explained above, and adding phoneme labels to the pieces of vocal tract information.

Here, if the input speech is synthesized from a text by a text-to-speech device, the phoneme labels can be obtained from the text-to-speech device. The PARCOR coefficients can be easily calculated from the synthesized speech. If the voice quality conversion device is used off-line, phoneme boundary information may be previously added to vocal tract information by a person, of course.

FIGS. 8A to 8J are graphs showing examples of a piece of vocal tract information of a vowel /a/ represented by PARCOR coefficients of ten orders. In each of the figures, a vertical axis represents a reflection coefficient, and a horizontal axis represents time. These figures show that a PARCOR coefficient moves relatively smoothly as time passes.

The vowel conversion unit 601 converts vocal tract information of each vowel included in the vocal tract information with phoneme boundary information provided in the above-described manner.

Firstly, from the voice quality feature information generated by the voice quality edit device of the present invention, the vowel conversion unit 601 receives target vocal tract information of a vowel to be converted (hereinafter, referred to as "target vowel vocal tract information"). If there are plural pieces of target vowel vocal tract information corresponding to the vowel to be converted, the vowel conversion unit 601 selects an optimum target vowel vocal tract information depending on a state of phoneme environments (for example, kinds of prior and subsequent phonemes) of the vowel to be converted.

The vowel conversion unit 601 converts vocal tract information of the vowel to be converted to target vowel vocal tract information based on a provided conversion ratio.

In the provided vocal tract information with phoneme boundary information, a time series of each order regarding the vocal tract information that is regarding a section of the vowel to be converted and represented by a PARCOR coefficient is approximated applying a polynomial expression shown in the below Equation 7. For example, when the vocal tract information is represented by a PARCOR coefficient having ten orders, a PARCOR coefficient of each order is approximated applying the polynomial expression shown in the Equation 7.

[Formula 7]

$$\hat{y}_a = \sum_{i=0}^{p} a_i x^i \quad \text{(Equation 7)}$$

where $\hat{y}_a$ [Formula 8]

is an approximated PARCOR coefficient of an input original speech, and $a_i$ is a coefficient of a polynomial expression of the approximated PARCOR coefficient.

As a result, ten kinds of polynomial expressions can be generated. An order of the polynomial expression is not limited and an appropriate order can be set.

Regarding a unit on which the polynomial approximation is to be applied, a section of a single phoneme (phoneme section), for example, is set as a unit of approximation. The unit of approximation may be not the above phoneme section but a duration from a phoneme center to another phoneme center. In the following description, the unit of approximation is assumed to be a phoneme section.

Each of FIGS. 29A to 29D is a graph showing first to fourth order PARCOR coefficients, when the PARCOR coefficients are approximated by a fifth-order polynomial expression and smoothed on a phoneme section basis in a time direction. In each of the graphs, a vertical axis represents a reflection coefficient, and a horizontal axis represents time.

It is assumed in the first embodiment that an order of the polynomial expression is fifth order, but may be other order. It should be noted that a PARCOR coefficient may be approximated not only applying the polynomial expression but also using a regression line for each phoneme-based time period.

Like a PARCOR coefficient of a vowel section to be converted, target vowel vocal tract information represented by a PARCOR coefficient included in the voice quality feature information generated by the voice quality edit device of the present invention is approximated applying a polynomial expression in the following Equation 8, thereby calculating a coefficient $b_i$ of a polynomial expression.

[Formula 9]

$$\hat{y}_b = \sum_{i=0}^{p} b_i x^i \qquad \text{(Equation 8)}$$

Next, using an original speech parameter ($a_1$), a target vowel vocal tract information ($b_i$), and a conversion ratio (r), the vowel conversion unit 601 determines a coefficient $c_i$ of a polynomial expression of converted vocal tract information (PARCOR coefficients) using the following Equation 9.

[Formula 10]

$$c_i = a_i + (b_i - a_i) \times r \qquad \text{(Equation 9)}$$

The vowel conversion unit 601 determines converted vocal tract information $$\hat{y}_c \qquad \text{[Formula 11]}$$

using the determined and converted coefficient $c_i$ of the polynomial expression using the following Equation 10.

[Formula 12]

$$\hat{y}_c = \sum_{i=0}^{p} c_i x^i \qquad \text{(Equation 10)}$$

The vowel conversion unit 601 performs the above-described conversion on a PARCOR coefficient of each order. As a result, the PARCOR coefficient representing vocal tract information of a vowel to be converted can be converted to a PARCOR coefficient representing target vowel vocal tract information at the designated conversion ratio.

Figure 30:
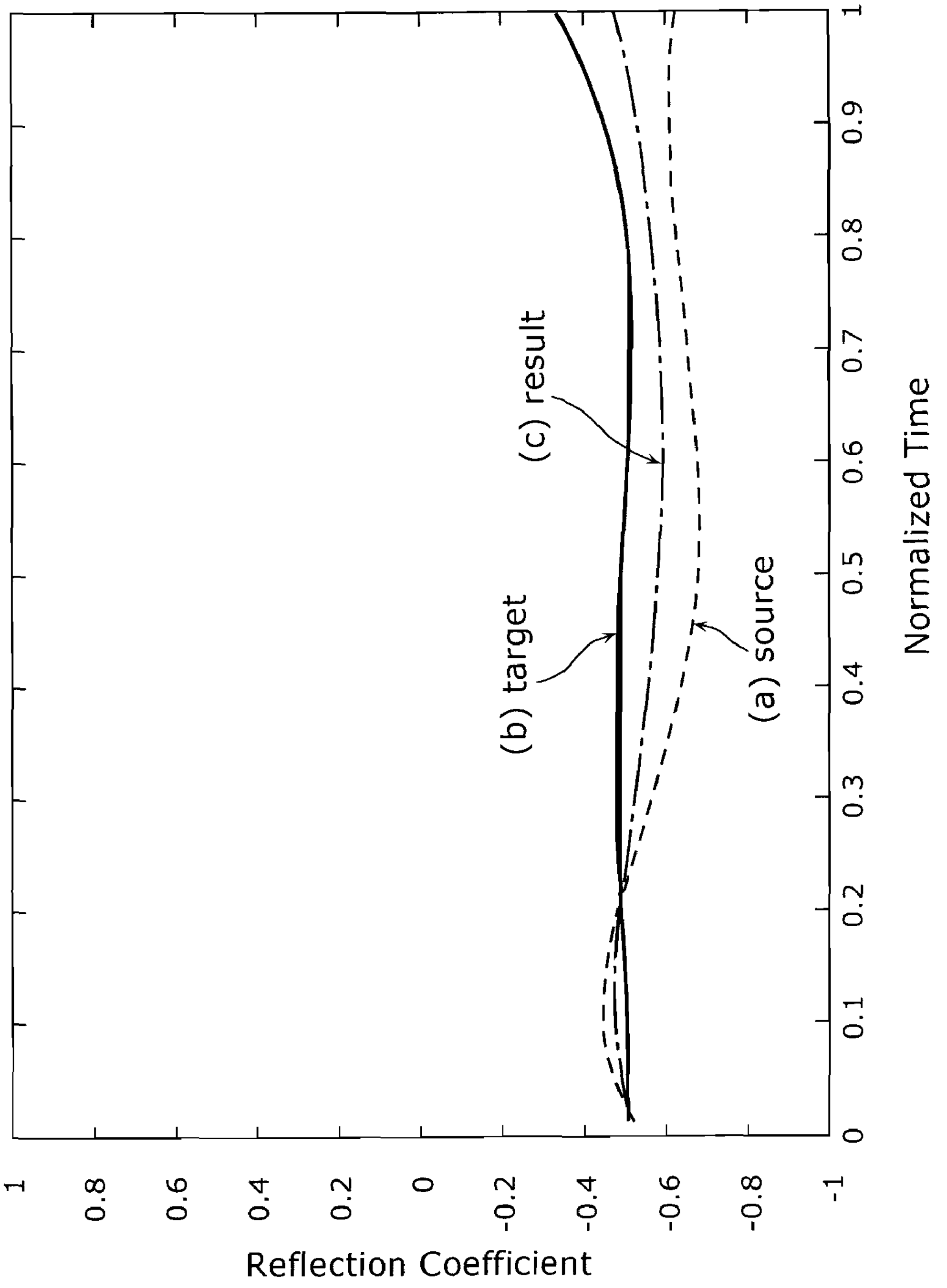
FIG. 30 is a graph for explaining conversion processing of a PARCOR coefficient in a vowel section performed by a vowel conversion unit.

An example of the above-described conversion performed on a vowel /a/ is shown in FIG. 30. In FIG. 30, a horizontal axis represents a normalized time, and a vertical axis represents a first-order PARCOR coefficient. (a) in FIG. 30 shows transition of a coefficient of an utterance /a/ of a male speaker uttering an original speech (source speech). On the other hand, (b) in FIG. 30 shows transition of a coefficient of an utterance /a/ of a female speaker uttering a target vowel. (c) shows transition of a coefficient generated by converting the coefficient of the male speaker to the coefficient of the female speaker at a conversion ratio of 0.5 using the above-described conversion method. As shown in FIG. 30, the conversion method can achieve interpolation of PARCOR coefficients between the speakers.

Figure 31A:
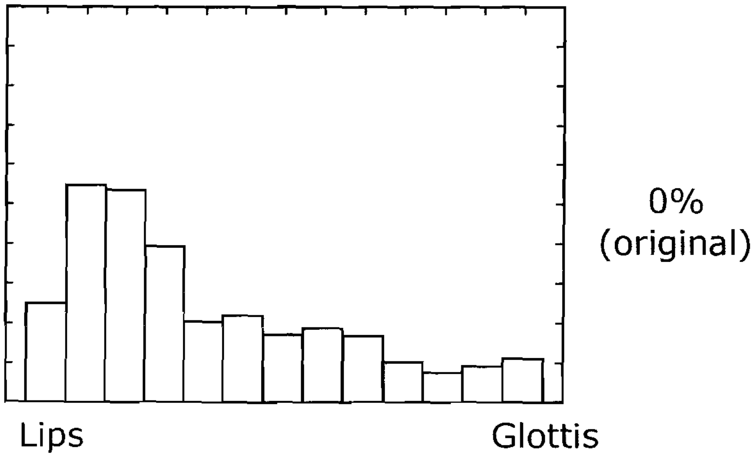
FIG. 31A is a graph showing vocal tract sectional areas of a male speaker uttering an original speech.
Figure 31B:
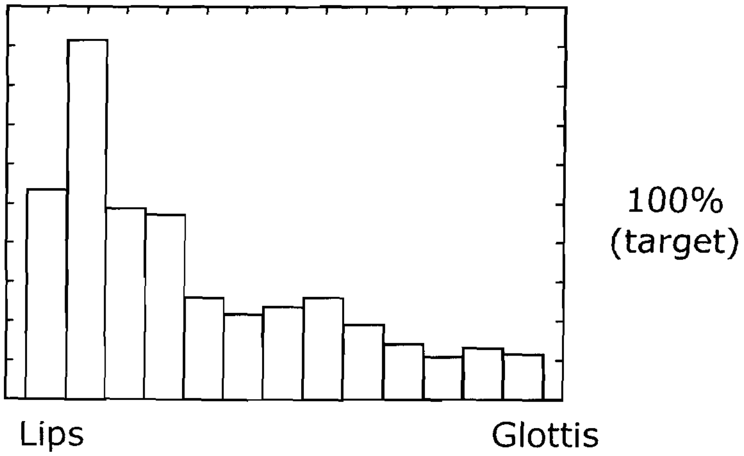
FIG. 31B is a graph showing vocal tract sectional areas of a female speaker uttering a target speech.
Figure 31C:
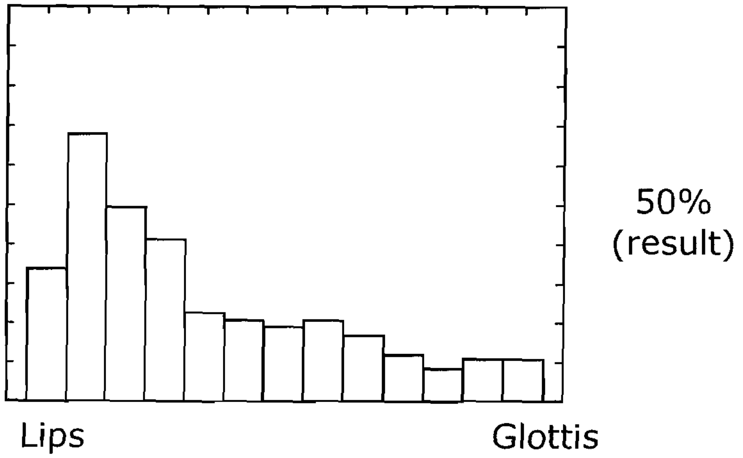
FIG. 31C is a graph showing vocal tract sectional areas corresponding to a PARCOR coefficient generated by converting a PARCOR coefficient of the original speech at a conversion ratio of 50%.

Each of FIGS. 31A to 31C is a graph showing vocal tract sectional areas regarding a temporal center of a converted vowel section. In these figures, a PARCOR coefficient at a temporal center point of the PARCOR coefficient shown in FIG. 30 is converted to vocal tract sectional areas using the equation 1. In each of FIGS. 31A to 31C, a horizontal axis represents a location of an acoustic tube and a vertical axis represents a vocal tract sectional area. FIG. 31A shows vocal tract sectional areas of a male speaker uttering an original speech, FIG. 31B shows vocal tract sectional areas of a female speaker uttering a target speech, and FIG. 31C shows vocal tract sectional areas corresponding to a PARCOR coefficient generated by converting a PARCOR coefficient of the original speech at a conversion ratio 50%. These figures also show that the vocal tract sectional areas shown in FIG. 31C are average between the original speech and the target speech.

It has been described that an original voice quality is converted to a voice quality of a target speaker by converting provided vowel vocal tract information included in vocal tract information with phoneme boundary information to vowel vocal tract information of the target speaker using the vowel conversion unit 601. However, the conversion results in discontinuity of pieces of vocal tract information at a connection boundary between a consonant and a vowel.

Figure 32:
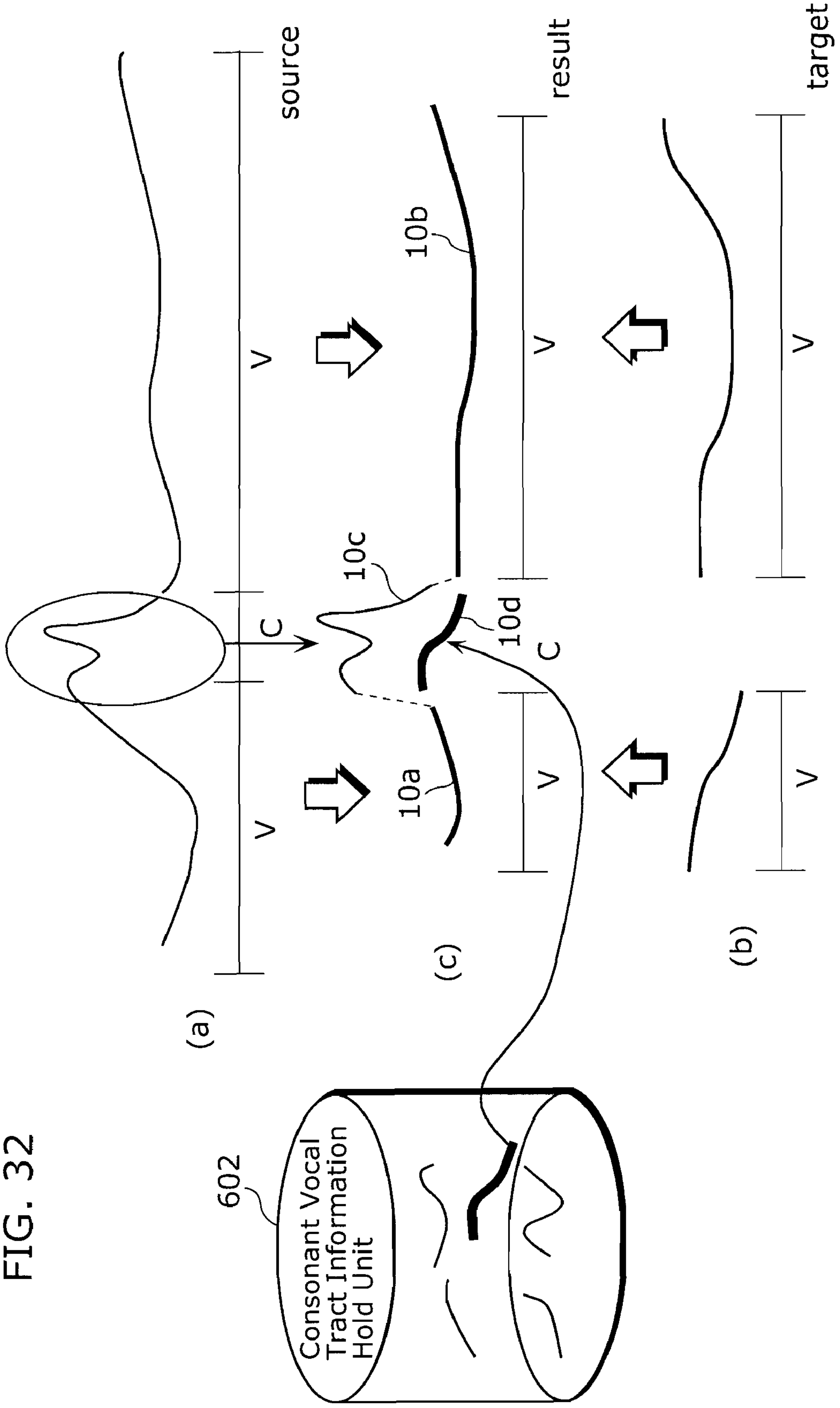
FIG. 32 is a schematic diagram for explaining processing performed by a consonant selection unit to select a consonant vocal tract shape.

FIG. 32 is a diagram for explaining an example of PARCOR coefficients after vowel conversion of the vowel conversion unit 601 in a VCV (where V represents a vowel and C represents a consonant) phoneme sequence.

In FIG. 32, a horizontal axis represents a time axis, and a vertical axis represents a PARCOR coefficient. FIG. 32 (*a*) shows vocal tract information of voices of an input speech (in other words, source speech). PARCOR coefficients of vowel parts in the vocal tract information are converted by the vowel conversion unit 601 using vocal tract information of a target speaker as shown in FIG. 32 (*b*). As a result, pieces of vocal tract information 10*a* and 10*b* of the vowel parts as shown in FIG. 32 (*c*) are generated. However, a piece of vocal tract information 10*c* of a consonant is not converted and still indicates vocal tract information of the input speech. This causes discontinuity at a boundary between the vocal tract information of the vowel parts and the vocal tract information of the consonant part. Therefore, the vocal tract information of the consonant part is also to be converted.

A method of converting the consonant section is described below. It is considered that individuality of a speech is expressed mainly by vowels in consideration of durations and stability of vowels and consonants.

Therefore, regarding consonants, vocal tract information of a target speaker is not used, but from predetermined plural pieces of vocal tract information of each consonant, vocal tract information of a consonant suitable for vocal tract information of vowels converted by the vowel conversion unit 601 is selected. As a result, the discontinuity at the connection boundary between the consonant and the converted vowels can be reduced. In FIG. 32 (*c*), from among plural pieces of vocal tract information of a consonant held in the consonant vocal tract information hold unit 602, vocal tract information 10*d* of the consonant which has a good connection to the vocal tract information 10_a_ and 10_b_ of vowels prior and subsequent to the consonant is selected to reduce the discontinuity at the phoneme boundaries.

In order to achieve the above processing, consonant sections are previously cut out from a plurality of utterances of a plurality of speakers, and pieces of consonant vocal tract information to be held in the consonant vocal tract information hold unit 602 are generated by calculating a PARCOR coefficient using vocal tract information of each of the consonant sections.

From the consonant vocal tract information hold unit 602, the consonant selection unit 603 selects a piece of consonant vocal tract information suitable for vowel vocal tract information converted by the vowel conversion unit 601. Which consonant vocal tract information is to be selected is determined based on a kind of a consonant (phoneme) and continuity of pieces of vocal tract information at connection points of a beginning and an end of the consonant. In other words, it is possible to determined, based on continuity of piece of vocal tract information at connection points of PARCOR coefficients, which consonant vocal tract information is to be selected. More specifically, the consonant selection unit 603 searches for consonant vocal tract information $C_i$ satisfying the following Equation 11.

[Formula 13]

$$C_i = \underset{C_k}{\operatorname{argmin}} \begin{bmatrix} (\text{weight} \times Cc(U_{i-1}, C_k) + \\ (1 - \text{weight})Cc(C_k, U_{i+1}) \end{bmatrix} \quad \text{(Equation 11)}$$

where $U_{i-1}$ represents vocal tract information of a phoneme prior to a consonant to be selected, $U_{i+1}$ represents vocal tract information of a phoneme subsequent to the consonant to be selected, and weight represents a weight of (i) continuity between the prior phoneme and the consonant to be selected or a weight of (ii) continuity between the consonant to be selected and the subsequent phoneme. The weight w is appropriately set to emphasize the connection between the consonant to be selected and the subsequent phoneme. The connection between the consonant to be selected and the subsequent phoneme is emphasized because a consonant generally has a stronger connection to a vowel subsequent to the consonant than a vowel prior to the consonant.

A function Cc is a function representing a continuity between pieces of vocal tract information of two phonemes. For example, a value of the function can be represented by an absolute value of a difference between PARCOR coefficients at a boundary between two phonemes. It should be noted that a lower-order PARCOR coefficient may have a more weight.

As described above, the consonant selection unit 603 selects a piece of vocal tract information of a consonant suitable for pieces of vocal tract information of vowels which are converted to a target desired voice quality. As a result, smooth connection between pieces of vocal tract information can be achieved to improve naturalness of a synthetic speech.

It should be noted that the consonant selection unit 603 may select vocal tract information for only voiced consonants and use received vocal tract information for unvoiced consonants. This is because unvoiced consonants are utterances without vibration of vocal cord and processes of generating unvoiced consonants are therefore different from the case of generating vowels and voiced consonants.

It has been described that the consonant selection unit 603 can obtain consonant vocal tract information suitable for vowel vocal tract information converted by the vowel conversion unit 601. However, continuity at a connection point of the pieces of information is not always sufficient. Therefore, the consonant transformation unit 604 transforms the consonant vocal tract information selected by the consonant selection unit 603 to be continuously connected to vocal tract information of a vowel subsequent to the consonant at the connection point.

In more detail, the consonant transformation unit 604 shifts a PARCOR coefficient of the consonant at the connection point connected to the subsequent vowel so that the PARCOR coefficient matches a PARCOR coefficient of the subsequent vowel. Here, the PARCOR coefficient needs to be within a range [−1, 1] for assurance of stability. Therefore, the PARCOR coefficient is mapped on a space of [−∞, ∞] applying a function of $\tan h^{-1}$, for example, and then shifted to be linear on the mapped space. Then, the resulting PARCOR coefficient is set again within the range of [−1, 1] applying a function of tan h. As a result, while assuring stability, continuity between a vocal tract shape of a section of the consonant and a vocal tract shape of a section of the subsequent vowel can be improved.

The sound source transformation unit 605 transforms sound source information of the original speech (input speech) using the sound source information included in the voice quality feature information generated by the voice quality edit device of the present invention. In general, LPC analytic-synthesis often uses an impulse sequence as an excitation sound source. Therefore, it is also possible to generate a synthetic speech after transforming sound source information (fundamental frequency (F0), power, and the like) based on predetermined information such as a fundamental frequency. Thereby, the voice quality conversion device can convert not only feigned voices represented by vocal tract information, but also (i) prosody represented by a fundamental frequency or (ii) sound source information.

It should be noted that the synthesis unit 606 may use glottis source models such as Rosenberg-Klatt model. With such a structure, it is also possible to use a method using a value generated by shifting a parameter (OQ, TL, AV, F0, or the like) of the Rosenberg-Klatt model from a parameter of an original speech to a target speech.

The synthesis unit 606 synthesizes a speech using (i) the vocal tract information for which voice quality conversion has been performed and (ii) the sound source information transformed by the sound source transformation unit 605. A method of the synthesis is not limited, but when PARCOR coefficients are used as vocal tract information, PARCOR synthesis can be used. It is also possible that LPC coefficients are synthesized after converting PARCOR coefficients to LPC coefficients, or that formant synthesis is performed by extracting formant from PARCOR coefficients. It is further possible that LSP synthesis is performed by calculating LSP coefficients from PARCOR coefficients.

Using the above-described voice quality conversion device, it is possible to generate a synthetic speech having voice quality feature information generated by the voice quality edit device according to the present invention. It should be noted that the voice quality conversion method is not limited to the above, but may be any other methods if an original voice quality is converted to another voice quality using voice quality feature information generated by the voice quality edit device according to the present invention.

(Advantages)

The weight adjustment of the weight setting unit 103 allows the inter-voice-quality distance calculation unit 102 to calculate inter-voice-quality distances to reflect sense of a distance (in other words, a difference) between voice quality features which a user perceives. Based on the user's sense of a distance, the scaling unit 105 calculates a coordinate position of each voice quality feature. Thereby, the display unit 107 can display a voice quality space matching the user's sense. This voice quality space is a distance space matching the user's sense. Therefore, the user can expect a voice quality feature positioned between displayed voice quality features more easily than when the user expects the voice quality feature using a predetermined distance scale. This makes it easy for the user to designate coordinates of a desired voice quality feature using the position input unit 108.

Furthermore, when the voice quality mix unit 110 mixes voice quality features together, a ratio for mixing voice quality candidates is decided in the following method. Firstly, nearby voice quality candidates are selected on a voice quality space generated using a piece of weight information set by the user. Then, based on distances among the voice quality features on the voice quality space, a mixing ratio for the selected voice quality candidates is determined. Therefore, the mixing ratio can be determined as the user expects in order to mix these candidates. In addition, when a voice quality feature corresponding to the coordinates designated by the user using the position input unit 108 is generated, a piece of weight information which is stored in the weight storage unit 109 and set by the user is used. Thereby, it is possible to synthesize a voice quality feature corresponding to a position on the voice quality space generated by the voice quality edit device to match expectation of the user.

In other words, the weight information held in the weight storage unit 109 serves as intermediary to match the voice quality space generated by the voice quality edit device with the voice quality space expected by the user. Therefore, the user can designate and generate a desired voice quality (a desired voice quality feature) only by designating coordinates on the voice quality space presented by the voice quality edit device.

In general, it is quite difficult for the user to expect a voice quality of a speech without actually listening to the speech. According to the first embodiment of the present invention, however, the display unit 107 presents the user with the voice quality space by displaying pieces of speaker attribute information, such as face images, held in the speaker attribute database 106. Therefore, seeing the face images, the user can easily expect a voice quality of a person of each face image. This enables the user who does not have technical knowledge of phonetics to easily edit voice quality.

Moreover, the voice quality edit device according to the present invention performs only the voice quality edit processing in order to generate a piece of voice quality feature information (namely, a voice quality feature) which the user desires using pieces of voice quality feature information (namely, voice quality features) held in the voice quality feature database 101. This means that the voice quality edit device is independent from a voice quality conversion device that converts a voice quality of a speech to another voice quality having the voice quality feature information. Therefore, it is possible to previously decide a piece of voice quality feature information (namely, a voice quality) using the voice quality edit device according to the present invention and then stores only the decided piece of voice quality feature information. This has advantages that a voice quality of a speech can be converted to another voice quality using the stored voice quality feature information, without newly editing a piece of voice quality feature information (namely, a new voice quality) for every voice quality conversion.

Figure 33:
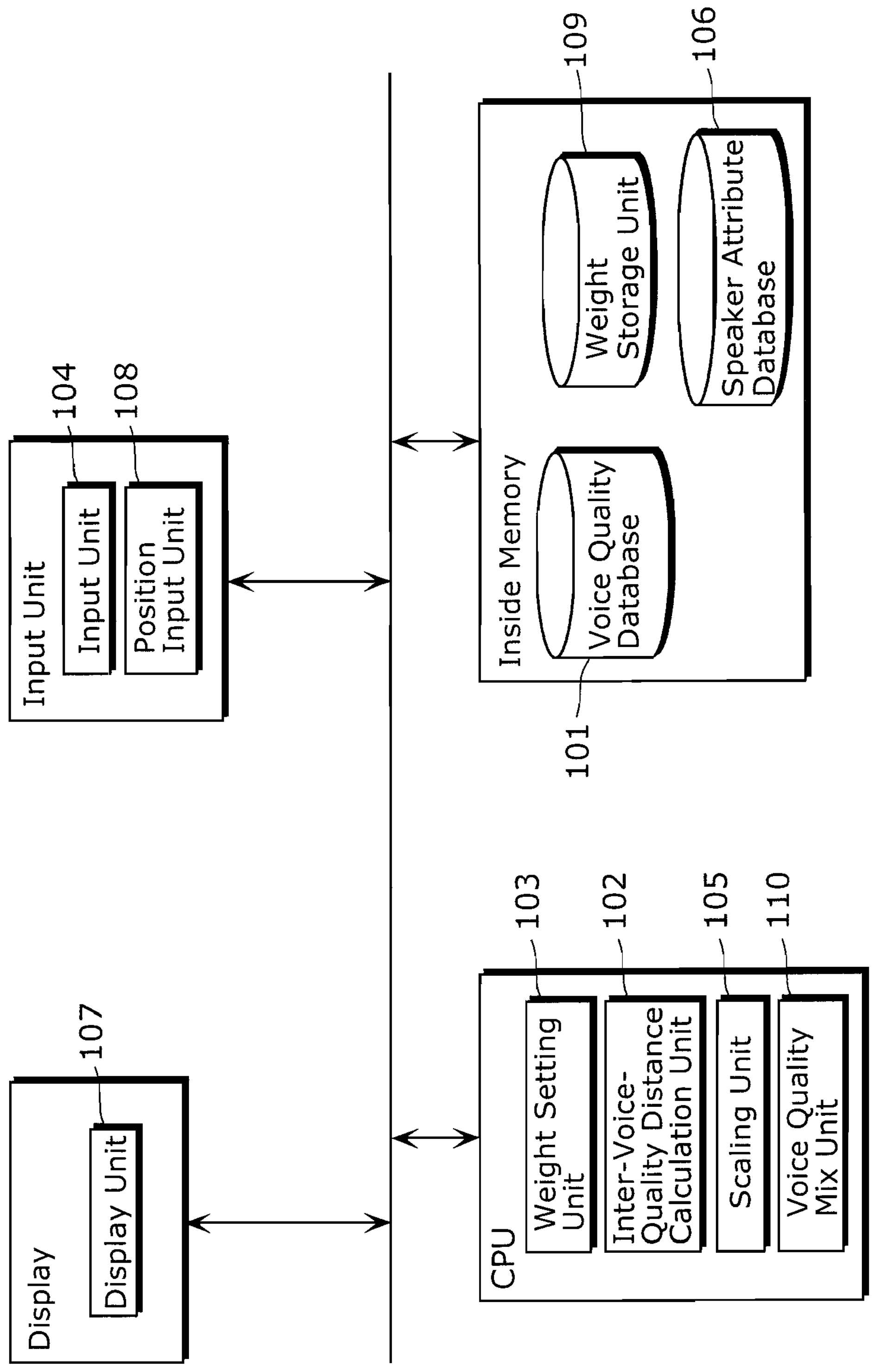
FIG. 33 is a diagram showing a structure of the voice quality edit device according to the first embodiment of the present invention on a computer.

In the meanwhile, the elements in the voice quality edit device according to the present invention are implemented in a computer as shown in FIG. 33, for example. In more detail, the display unit 107 is implemented as a display, and the input unit 104 and the position input unit 108 are implemented as an input device such as a keyboard and a mouse. The weight setting unit 103, the inter-voice-quality distance calculation unit 102, the scaling unit 105, and the voice quality mix unit 110 are implemented by executing a program by a CPU. The voice quality feature database 101, the speaker attribute database 106, the weight storage unit 109 are implemented as internal memories in the computer.

It should be noted that it has been described that the voice quality features are arranged on a two-dimensional plane which is a display example of the voice quality space generated by the voice quality edit device of the present invention, but the display method is not limited to the above. For example, the voice quality features may be designed to be arranged on a pseudo three-dimensional space or on a surface of a sphere.

(Modification)

In the first embodiment, a voice quality feature which a user desires is edited using all of the voice quality features held in the voice quality feature database 101. In this modification of the first embodiment, however, only a part of the voice quality features held in the voice quality feature database 101 are used by the user to edit a desired voice quality feature.

In the first embodiment of the present invention, the display unit 107 displays speaker attributes associated with the respective voice quality features held in the voice quality feature database 101. However, there is a problem that, when the user does not know a speaker attribute presented by the voice quality edit device, the user cannot expect a voice quality of such an unknown speaker attribute. This modification solves the problem.

Figure 34:
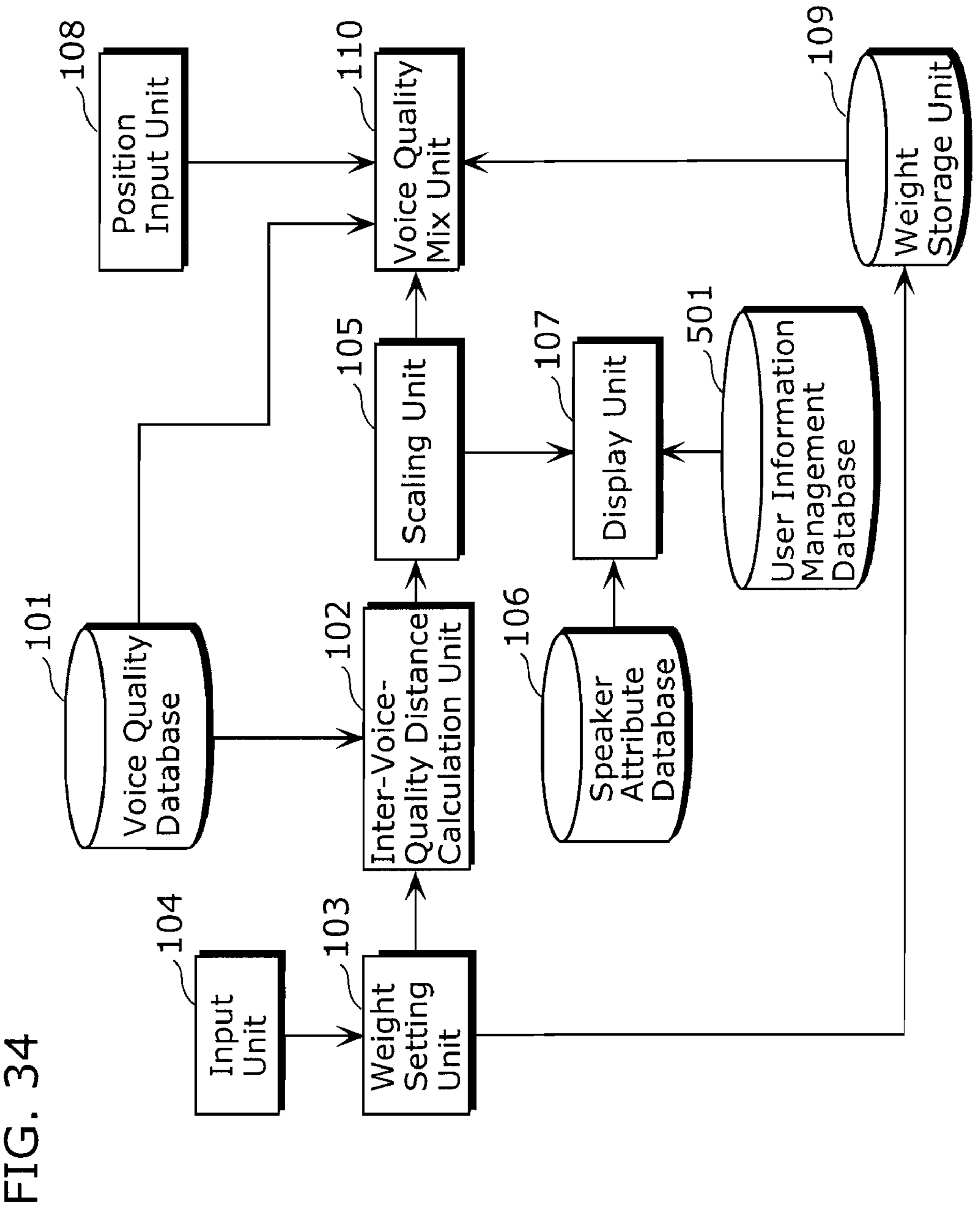
FIG. 34 is a block diagram showing a structure of a voice quality edit device according to a modification of the first embodiment of the present invention.

FIG. 34 is a block diagram showing a structure of a voice quality edit device according to the modification of the first embodiment. The same reference numerals of FIG. 5 are assigned to the identical units of FIG. 34, so that the identical units are not explained again below. The voice quality edit device shown in FIG. 34 differs from the voice quality edit device of FIG. 5 in further including a user information management database 501.

The user information management database 501 is a database for managing information indicating which voice quality features a user already knows. FIG. 35 is a table showing an example of the information managed by the user information management database 501. The user information management database 501 holds, for each user of the voice quality edit device, at least: a user identification (ID) of the user; and known voice quality IDs assigned to voice quality features which the user already knows. The example of FIG. 35 shows that a user 1 knows a person having a voice quality 1 and a person having a voice quality 2. It is also shown that a user 2 knows the person having the voice quality 1, a person having a voice quality 3, and a person having a voice quality 5. Such information enables the display unit 107 to present a user with only voice quality features which the user knows.

It should be noted that it has been described that a user knows a few voice quality features, but a user may designate more voice quality features as known voice quality features.

It should also be note that a method of generating the information held in the user information management database 501 is not limited. For example, the information may be generated by letting a user select known voice quality features and their speaker attributes from the voice quality feature database 101 and the speaker attribute database 106.

It is also possible that the voice quality edit device previously decides voice quality features and their speaker attributes in association with each user attribute. For example, instead of user IDs, user groups are defined according to sexes or ages. Then, for each of the user groups, the voice quality edit device previously sets voice quality features and their speaker attributes, which are supposed to be known by people of a sex or an age belonging to the corresponding user group. The voice quality edit device lets a user input a sex or an age of the user and thereby decides voice quality features to be presented to the user based on the user information management database 501. With the above structure, the voice quality edit device can specify voice quality features which are supposed to be known by a user, without letting the user designate voice quality features which the user knows.

Besides letting a user designate known voice quality IDs, it is also possible to (i) obtain pieces of speaker identification information from an external database used by the user and then (ii) manage, as known voice quality features, only voice quality features of speakers corresponding to the obtained pieces of speaker identification information. An example of the external database is information regarding singers of music contents which the user has. It is also possible to generate such an external database using information regarding actors/actresses appearing in movie contents which a user has. It should be noted that the method of generating the speaker identification information is not limited to the above, but may be any methods if a voice quality feature known by a user can be specified from the voice quality features held in the voice quality feature database 101.

Thereby, what a user needs to do is merely providing data of possessed audio contents, in order to allow the voice quality edit device to automatically obtain information regarding user's known voice quality features to generate the user information management database 501. This can reduce processing load on the user.

(Advantages)

With the above-described structure of the voice quality edit device according to the modification of the first embodiment, the voice quality space presented by the display unit 107 has only voice quality features which a user knows. Thereby, the voice quality space can be structured to match the sense of the user more finely. Since the presented voice quality space matches the sense of the user, the user can easily designate desired coordinates.

It should be noted that, when the voice quality mix unit 110 mixes voice quality features registered in the voice quality feature database 101 together to generate a voice quality feature corresponding to a coordinate position designated by a user, not only user's known voice quality features managed by the user information management database 501 but also all voice quality features registered in the voice quality feature database 101 can be used.

In the above case, it is possible to shorten a distance between (i) the coordinate position designated by the user and (ii) a coordinate position of each nearby voice quality feature selected by the nearby voice quality candidate selection unit 201, more than when using only voice quality features managed in the user information management database. As a result, a desired voice quality feature corresponding to the coordinate position designated by the user can be generated by mixing the nearby voice quality features which are not significantly different from the desired voice quality feature. Therefore, a less amount required for voice quality conversion results in less deterioration of sound quality, which can achieve generation of a desired voice quality feature of higher sound quality.

It should also be noted that it is also possible that the weight setting unit 103 sorts the voice quality features held in the voice quality feature database 101 to classes according to their weight information set by the weight setting unit 103, and that the user information management database 501 holds a voice quality feature representing each of the classes.

This can reduce the number of voice quality features displayed on a voice quality space while maintaining the voice quality space to match the sense of the user. Thereby, the user can easily understand the presented voice quality space.

Second Embodiment

The voice quality edit device according to the first embodiment edits voice quality in a single computer. However, it is common that a person uses a plurality of computers at once. Moreover, at present, various serves are provided not only for computers but also for mobile phones and mobile terminals. Therefore, it is likely that environments created by a certain computer are used also in another computer, a mobile phone, or a mobile terminal. Taking the above into consideration, described in the second embodiment is a voice quality edit system in which the same edit environments can be shared among a plurality of terminals.

Figure 36:
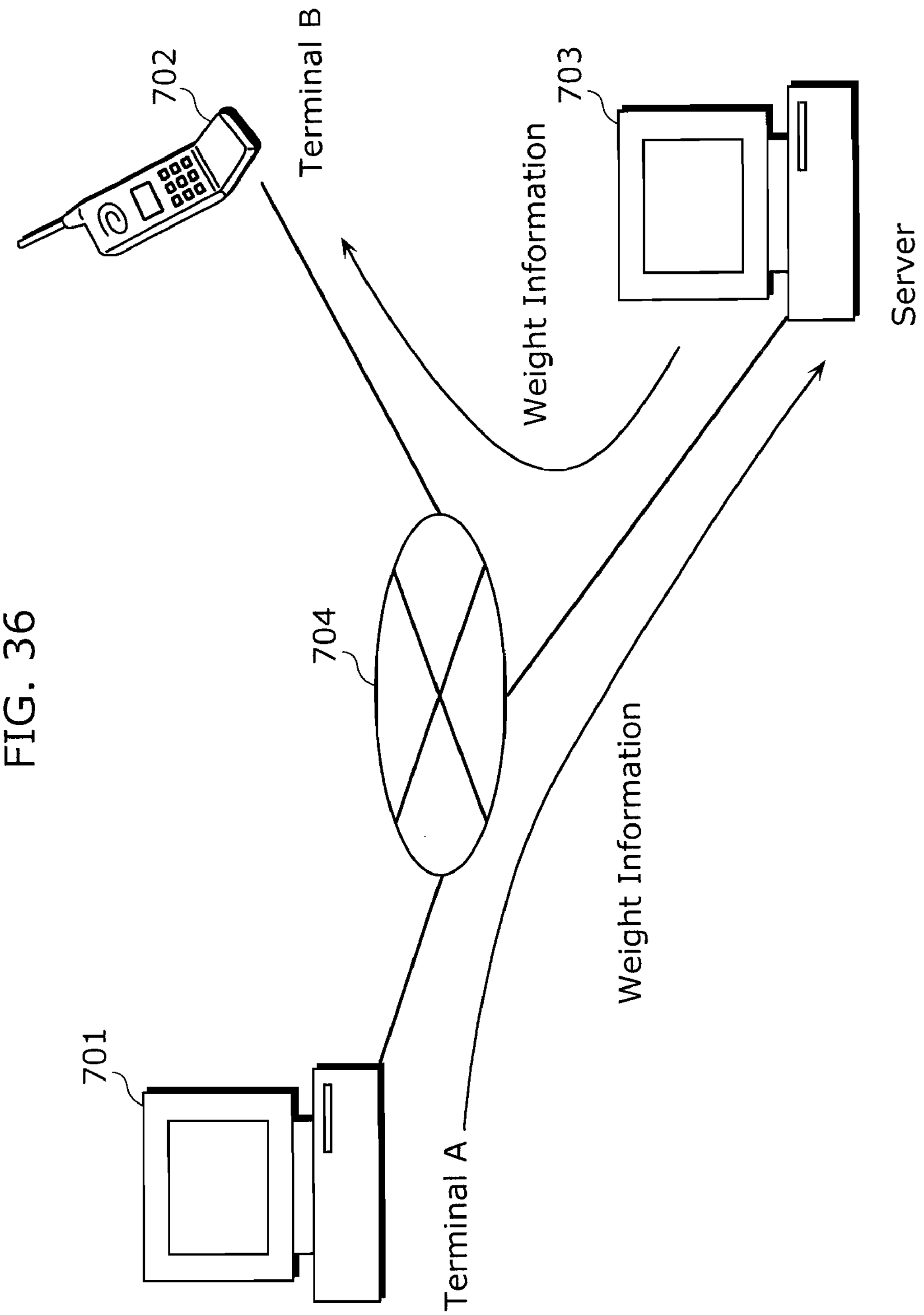
FIG. 36 is a diagram showing a configuration n of a voice quality edit system according to a second embodiment of the present invention.

FIG. 36 is a diagram showing a configuration of the voice quality edit system according to the second embodiment of the present invention. The voice quality edit system includes a terminal 701, a terminal 702, and a server 703, all of which are connected to one another via a network 704. The terminal 701 is an apparatus that edits voice quality features. The terminal 702 is another apparatus that edits voice quality features. The server 703 is an apparatus that manages the voice quality features edited by the terminals 701 and 702. It should be noted that the number of the terminals is not limited to two.

Each of the terminals 701 and 702 includes the voice quality feature database 101, the inter-voice-quality distance calculation unit 102, the weight setting unit 103, the input unit 104, the scaling unit 105, the speaker attribute database 106, the display unit 107, the position input unit 108, and the voice quality mix unit 110.

The server 703 includes the weight storage unit 109.

When a user sets weight information by the weight setting unit 103 in the terminal 701, the terminal 701 sends the weight information to the server 703 via the network.

The weight storage unit 109 in the server 703 stores and manages the weight information in association with the user.

When the user attempts to edit voice quality using the terminal 702, which is not the terminal setting the weight information, the terminal 702 obtains the weight information associated with the user from the server 703 via the network.

Then, the inter-voice-quality distance calculation unit 102 in the terminal 702 calculates inter-voice-quality distances based on the obtained weight information. Thereby, the terminal 702 can reproduce a voice quality space identical to a voice quality space set by the other terminal 701.

The following describes an example of processing in which the terminal 701 sets weight information and the terminal 702 edits voice quality using the weight information set by the terminal 702.

Figure 18:
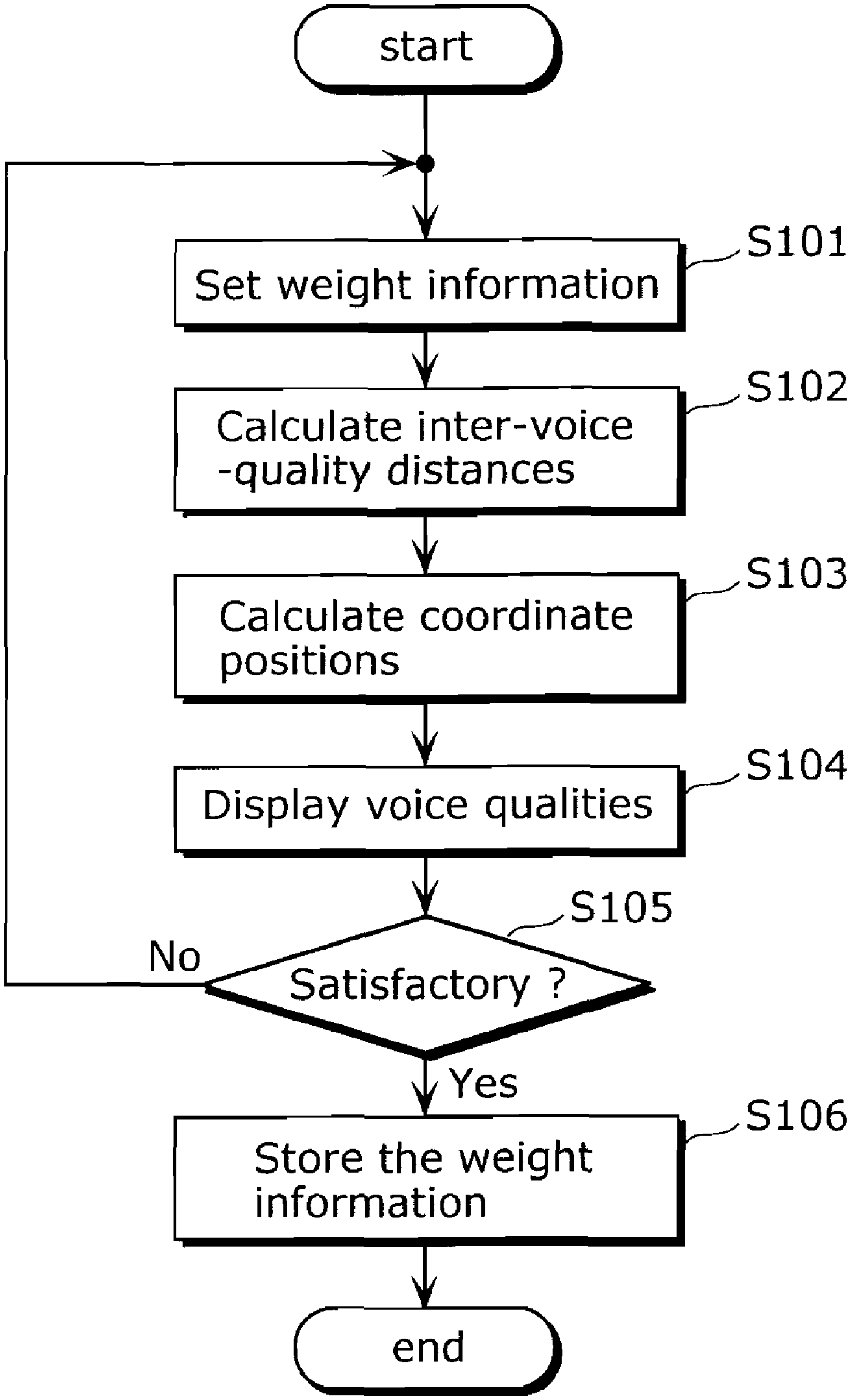
FIG. 18 is a flowchart of a weight setting method.

Firstly, the weight setting unit 103 in the terminal 701 sets weight information. For example, the weight setting unit 103 having the structure as shown in FIG. 17 performs the processing as shown in the flowchart of FIG. 18.

More specifically, the weight selection unit 103 selects a piece of weight information designated by the user using the input unit 104 from the plural pieces of weight information held in the weight database 401 (Step S101).

Using the piece of weight information selected at Step S101, the inter-voice-quality distance calculation unit 102 calculates inter-voice-quality distances regarding the voice quality features held in the voice quality feature database 101 and thereby generates a distance matrix (Step S102).

Using the distance matrix generated at Step S101, the scaling unit 105 calculates coordinates of each voice quality held in the voice quality feature database 101 on a voice quality space (Step S103).

The display unit 107 displays pieces of speaker attribute information which are held in the speaker attribute database 106 and associated with the respective voice quality features held in the voice quality feature database 101 on the respective coordinates calculated at Step S103 on the voice quality space (Step S104).

The user confirms whether or not the voice quality space generated at Step S104 matches the sense of the user, seeing the arrangement of the voice quality features on the voice quality space (Step S105). In other words, the user judges whether or not voice quality features which the user senses similar to each other are arranged close to each other and voice quality features which the user senses different from each other are arranged far from each other.

If the user is not satisfied with the currently displayed voice quality space (No at Step S105), then the processing from Step S101 to Step 105 is repeated until a displayed voice quality space satisfies the user.

On the other hand, if the user is satisfied with the currently displayed voice quality space (Yes at Step S105), then the weight selection unit 402 sends the piece of weight information selected at Step S101 to the server 703 via a network 704 and the server 703 receives the piece of weight information and registers the piece of weight information to the weight storage unit 109, and the weight setting processing is completed (Step S106).

By repeating the processing from Step S101 to Step 105 until a displayed voice quality space satisfies the user as described above, it is possible to set a piece of weight information matching the sense of the user regarding voice quality. In addition, by generating a voice quality space based on the piece of weight information, it is possible to structure a voice quality space matching the sense of the user.

It should be noted that it has described in the above example that the weight setting unit 103 has the structure as shown in FIG. 17 but the weight setting unit 103 may have the structure as shown in FIG. 22 or 25.

Figure 37:
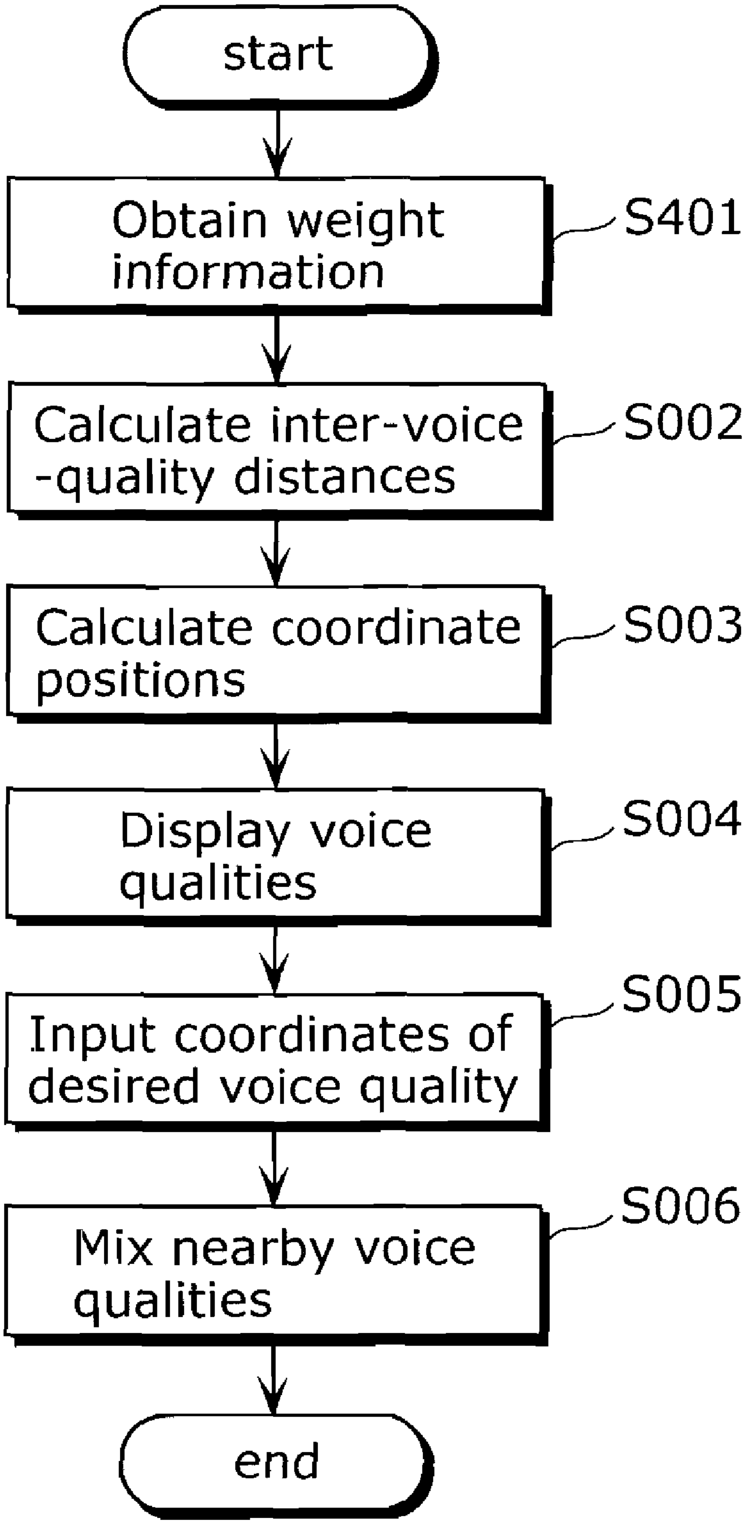
FIG. 37 is a flowchart of processing performed by a terminal included in the voice quality edit system according to the second embodiment of the present invention.

Next, the processing performed by the other terminal 702 for editing voice quality is described with reference to a flowchart of FIG. 37.

The inter-voice-quality distance calculation unit 102 obtains the weight information from the server 703 via the network 704 (Step S401). The inter-voice-quality distance calculation unit 102 calculates inter-voice-quality distances regarding all voice quality features held in the voice quality feature database 101 using the weight information obtained at Step S401 (Step S002).

Next, the scaling unit 105 calculates coordinates of each voice quality feature on a voice quality space, using the inter-voice-quality distances regarding the voice quality features held in the voice quality feature database 101 (namely, a distance matrix) which are calculated at Step S002 (Step S003).

Next, at respective positions represented by the coordinates calculated at Step S003, the display unit 107 displays speaker attributes held in the speaker attribute database 106 each of which is associated with a corresponding voice quality feature in the voice quality feature database 101 (Step S004).

Next, using the position input unit 108, the user designates on the voice quality space a coordinate position (namely, coordinates) of a voice quality which the user desires (Step S005).

Next, the voice quality mix unit 110 generates a voice quality corresponding to the coordinates designated at Step S005 (Step S006).

By the above processing, it is possible to perform the voice quality edit processing by the terminal 702 using the weight information set by the terminal 701.

(Advantages)

With the above configuration, the voice quality edit system according to the second embodiment enables the voice quality edit processing to be performed on a voice quality space shared by a plurality of terminals. For example, when the voice quality edit device according to the first embodiment attempts to decide voice quality features to be displayed using a plurality of terminals such as computers and mobile terminals, each of the terminals needs to set a piece of weight information. In the voice quality edit system according to the second embodiment, however, a piece of weight information can be set by one of terminals and then stored to a server. Thereby, the other terminals do not need to set the piece of weight information. This means that the other terminals do not need to perform the weight setting processing but merely obtain the piece of weight information. Therefore, the voice quality edit system according to the second embodiment has advantages that a load on the user editing voice quality features on a voice quality space can be reduced much more than when the weight setting processing required to structure the voice quality space needs to be performed by each of the terminals for the voice quality edit processing.

The above-described embodiments and modification are merely examples for all aspects and do not limit the present invention. A scope of the present invention is recited by Claims not by the above description, and all modifications are intended to be included within the scope of the present invention, with meanings equivalent to the claims and without departing from the claims.

INDUSTRIAL APPLICABILITY

The voice quality edit device according to the present invention generates a voice quality space matching the sense of a user and thereby presents the user with the voice quality space which the user can intuitively and easily understand. In addition, this voice quality edit device has a function of generating a voice quality desired by the user when the user inputs a coordinate position of the desired voice quality on the presented voice quality space. Therefore, the voice quality edit device is usable in user interfaces and entertainment employing various voice qualities. Furthermore, the voice quality conversion device can be applied to a voice quality designation function such as a voice changer or the like in speech communication using mobile telephones.

The invention claimed is:

1. A voice quality edit device that generates a new voice quality feature by editing a part or all of voice quality features each consisting of acoustic features regarding a corresponding voice quality, said voice quality edit device comprising:

a voice quality feature database holding the voice quality features;

a speaker attribute database holding, for each of the voice quality features held in said voice quality feature database, an identifier enabling a user to expect a voice quality of a corresponding voice quality feature;

a weight setting unit configured to set a weight for each of the acoustic features of a corresponding voice quality;

a display coordinate calculation unit configured to calculate display coordinates of each of the voice quality features held in said voice quality feature database, based on (i) the acoustic features of a corresponding voice quality feature and (ii) the weights set for the acoustic features by said weight setting unit;

a display unit configured to display, for each of the voice quality features held in said voice quality feature database, the identifier held in said speaker attribute database on the display coordinates calculated by said display coordinate calculation unit;

a position input unit configured to receive designated coordinates; and a voice quality mix unit configured to (i) calculate a distance between (1) the designated coordinates received by said position input unit and (2) the display coordinates of each of a part or all of the voice quality features held in said voice quality feature database, and (ii) mix the acoustic features of the part or all of the voice quality features together based on a ratio between the calculated distances in order to generate a new voice quality feature.

2. The voice quality edit device according to claim 1, wherein said speaker attribute database holds, for each of the voice quality features held in said voice quality feature database, (i) at least one of a face image, a portrait, and a name of a speaker of a voice having the voice quality of the corresponding voice quality feature, or (ii) at least one of an image and a name of a character uttering a voice having the voice quality of the corresponding voice quality feature, and said display unit is configured to display on the display coordinates calculated by said display coordinate calculation unit, for each of the voice quality features held in said voice quality feature database, (i) the at least one of the face image, the portrait, and the name of the speaker or (ii) the at least one of the image and the name of the character, which are held in said speaker attribute database.

3. The voice quality edit device according to claim 1, wherein said display coordinate calculation unit includes:

an inter-voice-quality distance calculation unit configured to (i) extract an arbitrary pair of voice quality features from the voice quality features held in said voice quality feature database, (ii) weight the acoustic features of each of the voice quality features in the extracted arbitrary pair, using the respective weights set by said weight setting unit, and (iii) calculate a distance between the voice quality features in the extracted arbitrary pair after the weighting; and a scaling unit configured to calculate plural sets of the display coordinates of the voice quality features held in said voice quality feature database based on the distances calculated by said inter-voice-quality distance calculation unit using a plurality of the arbitrary pairs, and said display unit is configured to display, for each of the voice quality features held in said voice quality feature database, the identifier held in said speaker attribute database on a corresponding set of the display coordinates in the plural sets calculated by said scaling unit.

4. The voice quality edit device according to claim 1, wherein said weight setting unit includes:

a weight storage unit configured to hold pieces of weight information each consisting of a plurality of the weights each set for a corresponding acoustic feature in the acoustic features regarding a corresponding voice quality;

a weight designation unit configured to designate a piece of weight information; and a weight selection unit configured to select from said weight storage unit the piece of weight information designated by said weight designation unit, in order to set the weights each set for the corresponding acoustic feature.

5. The voice quality edit device according to claim 1, wherein said weight setting unit includes:

a representative voice quality storage unit configured to hold at least two voice quality features which are previously selected from the voice quality features held in said voice quality feature database;

a voice quality presentation unit configured to present the user with the at least two voice quality features held in said representative voice quality storage unit;

a voice quality feature pair input unit configured to receive a designated pair of voice quality features chosen from the at least two voice quality features presented by said voice quality presentation unit; and a weight calculation unit configured to calculate the weights for the acoustic features so that a distance regarding the display coordinates between the designated pair received by said voice quality feature pair input unit is minimized.

6. The voice quality edit device according to claim 1, wherein said weight setting unit includes:

a subjective expression presentation unit configured to present a subjective expression for each of the acoustic features of a corresponding voice quality;

an importance degree input unit configured to receive an important degree designated for each of the subjective expressions presented by said subjective expression presentation unit; and a weight calculation unit configured to calculate the weight for each of the acoustic features by deciding the weight based on the designated important degree received by said importance degree input unit so that the weight is decided heavier when the importance degree is higher.

7. The voice quality edit device according to claim 1, further comprising a user information management database holding identification information of a voice quality feature of a voice quality which the user knows, wherein said display unit is configured to display, for each of the voice quality features which are held in said voice quality feature database and have respective pieces of the identification information held in said user information management database, the identifier held in said speaker attribute database on the display coordinates calculated by said display coordinate calculation unit.

8. The voice quality edit device according to claim 1, further comprising:

an individual characteristic input unit configured to receive a designated sex or age of the user; and a user information management database holding, for each sex or age of users, identification information of a voice quality feature of a voice quality which is supposed to be known by the users, wherein said display unit is configured to display, for each of the voice quality features which are held in said voice quality feature database and have respective pieces of identification information held in said user information management database and associated with the designated sex or age received by said individual characteristic input unit, the identifier held in said speaker attribute database on the display coordinates calculated by said display coordinate calculation unit.

9. The voice quality edit device according to claim 1, wherein said display coordinate calculation unit is configured to calculate the display coordinates of each of the voice quality features held in said voice quality feature database, so that a plurality of the voice quality features which are more similar having the acoustic features set with the weights heavier by said weight setting unit are displayed to be arranged closer to each other.

10. A voice quality edit method of generating a new voice quality feature by editing a part or all of voice quality features each consisting of acoustic features regarding a corresponding voice quality using a voice quality edit device, the voice quality edit device including:

a voice quality feature database holding the voice quality features; and a speaker attribute database holding, for each of the voice quality features held in the voice quality feature database, an identifier enabling a user to expect a voice quality of a corresponding voice quality feature, said voice quality edit method comprising:

setting a weight for each of the acoustic features of a corresponding voice quality;

calculating display coordinates of each of the voice quality features held in the voice quality feature database, based on (i) the acoustic features of a corresponding voice quality feature and (ii) the weights set for the acoustic features in said setting;

displaying, for each of the voice quality features held in the voice quality feature database, the identifier held in the speaker attribute database on a corresponding set of the display coordinates in the plural sets generated in said calculating in a display device;

receiving designated coordinates; and (i) calculating a distance between (1) the designated coordinates received in said receiving and (2) the display coordinates of each of a part or all of the voice quality features held in the voice quality feature database, and (ii) mixing the acoustic features of the part or all of the voice quality features together based on a ratio between the calculated distances in order to generate a new voice quality feature.

11. The voice quality conversion method according to claim 10, wherein in said calculating of the display coordinates, the display coordinates of each of the voice quality features held in the voice quality feature database are calculated so that a plurality of the voice quality features which are more similar having the acoustic features set with the weights heavier in said setting are displayed to be arranged closer to each other.

12. A non-transitory computer-readable medium having a program stored thereon for generating a new voice quality feature by editing a part or all of voice quality features each consisting of acoustic features regarding a corresponding voice quality, the program causing a computer including:

a voice quality feature database holding the voice quality features; and a speaker attribute database holding, for each of the voice quality features held in the voice quality feature database, an identifier enabling a user to expect a voice quality of a corresponding voice quality feature, to execute:

setting a weight for each of the acoustic features of a corresponding voice quality;

calculating display coordinates of each of the voice quality features held in the voice quality feature database, based on (i) the acoustic features of a corresponding voice quality feature and (ii) the weights set for the acoustic features in said setting;

displaying, for each of the voice quality features held in the voice quality feature database, the identifier held in the speaker attribute database on a corresponding set of the display coordinates in the plural sets generated in said calculating in a display device;

receiving designated coordinates; and (i) calculating a distance between (1) the designated coordinates received in said receiving and (2) the display coordinates of each of a part or all of the voice quality features held in the voice quality feature database, and (ii) mixing the acoustic features of the part or all of the voice quality features together based on a ratio between the calculated distances in order to generate a new voice quality feature.

13. The non-transitory computer-readable medium according to claim 12, wherein in said calculating of the display coordinates, the display coordinates of each of the voice quality features held in the voice quality feature database are calculated so that a plurality of the voice quality features which are more similar having the acoustic features set with the weights heavier in said setting are displayed to be arranged closer to each other.

14. A voice quality edit system that generates a new voice quality feature by editing a part or all of voice quality features each consisting of acoustic features regarding a corresponding voice quality, said voice quality edit system comprising a first terminal, a second terminal, and a server, which are connected to one another via a network, each of said first terminal and said second terminal includes:

a voice quality feature database holding the voice quality features;

a speaker attribute database holding, for each of the voice quality features held in said voice quality feature database, an identifier enabling a user to expect a voice quality of a corresponding voice quality feature;

a weight setting unit configured to set a weight for each of the acoustic features of a corresponding voice quality and send the weight to said server;

an inter-voice-quality distance calculation unit configured to (i) extract an arbitrary pair of voice quality features from the voice quality features held in said voice quality feature database, (ii) weight the acoustic features of each of the voice quality features in the extracted arbitrary pair, using the respective weights held in said server, and (iii) calculate a distance between the voice quality features in the extracted arbitrary pair after the weighting;

a scaling unit configured to calculate plural sets of the display coordinates of the voice quality features held in said voice quality feature database based on the distances calculated by said inter-voice-quality distance calculation unit using a plurality of the arbitrary pairs;

a display unit configured to display, for each of the voice quality features held in said voice quality feature database, the identifier held in said speaker attribute database on a corresponding set of the display coordinates in the plural sets calculated by said scaling unit;

a position input unit configured to receive designated coordinates; and a voice quality mix unit configured to (i) calculate a distance between (1) the designated coordinates received by said position input unit and (2) the display coordinates of each of a part or all of the voice quality features held in said voice quality feature database, and (ii) mix the acoustic features of the part or all of the voice quality features together based on a ratio between the calculated distances in order to generate a new voice quality feature, and said server includes a weight storage unit configured to hold the weight sent from any of said first terminal and said second terminal.

* * * * *